United States Patent [19]
Okanoya et al.

[11] Patent Number: 6,128,657
[45] Date of Patent: *Oct. 3, 2000

[54] LOAD SHARING SYSTEM

[75] Inventors: Katsutoshi Okanoya; Susumu Matsumoto; Kazuhiko Shoji, all of Kawasaki; Yutaka Konishi, Kobe; Akira Takahashi; Masamitsu Kimura, both of Kawasaki; Mitsuru Kusakawa; Takahito Sakai, both of Kobe; Minoru Kyoya; Masakazu Watanabe, both of Kawasaki, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/699,562

[22] Filed: Aug. 19, 1996

[30] Foreign Application Priority Data

Feb. 14, 1996 [JP] Japan .................................. 8-026351
Mar. 25, 1996 [JP] Japan .................................. 8-067892

[51] Int. Cl.$^7$ .................................................. G06F 15/173
[52] U.S. Cl. .......................... 709/224; 709/226; 709/245
[58] Field of Search ........................ 395/200.53, 200.56, 395/675, 674, 650, 200.59, 200.75, 670, 200.33, 822, 200.01, 200.03, 200.12, 200, 200.06, 200.43, 200.54; 709/223, 226, 229, 203, 213, 245, 224, 100, 104, 105; 710/2

[56] References Cited

U.S. PATENT DOCUMENTS

| | | |
|---|---|---|
| 5,283,897 | 2/1994 | Georgiadis et al. ..................... 395/650 |
| 5,329,619 | 7/1994 | Page et al. ............................... 395/200 |
| 5,341,477 | 8/1994 | Pitkin et al. ............................. 395/200 |
| 5,369,570 | 11/1994 | Parad ...................................... 364/401 |
| 5,371,852 | 12/1994 | Attanasio et al. ....................... 395/200 |
| 5,473,773 | 12/1995 | Aman et al. ............................. 395/650 |
| 5,475,819 | 12/1995 | Miller et al. ........................ 395/200.03 |
| 5,522,042 | 5/1996 | Fee et al. ............................ 395/200.01 |
| 5,522,070 | 5/1996 | Sumimoto ................................ 709/104 |
| 5,548,724 | 8/1996 | Akizawa et al. .................... 395/200.03 |
| 5,553,239 | 9/1996 | Heath et al. .............................. 709/229 |
| 5,581,544 | 12/1996 | Hamada et al. .......................... 370/253 |
| 5,603,029 | 2/1997 | Aman et al. ............................. 395/675 |
| 5,642,515 | 6/1997 | Jones et al. .............................. 710/220 |
| 5,644,720 | 7/1997 | Boll et al. ........................... 395/200.12 |
| 5,646,676 | 7/1997 | Dewkett et al. ......................... 709/219 |
| 5,682,478 | 10/1997 | Watson et al. ...................... 395/200.12 |
| 5,696,701 | 12/1997 | Burgess et al. ..................... 395/183.01 |
| 5,754,781 | 5/1998 | Kitta ................................... 395/200.43 |
| 5,761,507 | 6/1998 | Govett ..................................... 395/684 |
| 5,774,656 | 6/1998 | Hattori et al. ...................... 395/200.06 |
| 5,774,668 | 6/1998 | Choquier et al. ................... 395/200.53 |
| 5,862,348 | 1/1999 | Pedersen ................................. 709/226 |

FOREIGN PATENT DOCUMENTS

| | | |
|---|---|---|
| 6-266643 | 9/1989 | Japan . |
| 5-274261 | 10/1989 | Japan . |
| 6-214962 | 8/1995 | Japan . |

*Primary Examiner*—Mark H. Rinehart
*Assistant Examiner*—Marc D. Thompson
*Attorney, Agent, or Firm*—Staas & Halsey, LLP

[57] ABSTRACT

A load sharing system composed of a plurality of servers that are interconnected over a network for providing optimum and efficient operations at high reliability. The system employs a plurality of servers and a communication controller. A state manager in the communication controller first establishes connection paths on the network to reach the state management agents. The state manager then performs a centralized management of activity status of the servers based on status information collected from the state management agents via the established connection paths. A distribution processor disposed in the communication controller receives service requests from user terminals via a network and determines their respective destinations according to management data provided by the state manager. The distribution processor then forwards the service requests to the servers over the communication medium to direct their execution. An operation controller activates or deactivates a plurality of parameters which will define how to distribute the service requests to the applications.

14 Claims, 42 Drawing Sheets

| SERVICE NAME | OPERATION STATUS INFORMATION | APPLICATION STATE MANAGEMENT INFORMATION ||| LOAD DISTRIBUTION DATA ||
|---|---|---|---|---|---|---|
| | | SERVER IN CONNECTION | APPLICATION ON SERVER | ID | APPLICATION STATUS | NUMBER OF ASSIGNED REQUESTS | DISTRIBUTION RATIO |
| A | IN SERVICE | SERVER #1 | APL1 | 01 | READY | 50 | 10 |
| | | SERVER #2 | APL1 | 02 | READY | 50 | 10 |
| B | IN SERVICE | SERVER #1 | APL2 | 03 | READY | 100 | |
| C | STOPPED (DISABLED) | SERVER #2 | APL3 | 04 | NOT READY | 0 | |

FIG. 9

LOAD SHARING SYSTEM

BACKGROUND OF THE INVENTION

1. Field of the Invention

The present invention relates to a load sharing system which performs distributed data processing with a plurality of processors, and more specifically, to a load sharing system which is structed on networks.

2. Description of the Related Art

When a server system is required to provide various services to many users, one of the possible solutions is to distribute server tasks to a plurality of computers to share their workloads. Such a distributed system is referred to as a "load sharing system." The load sharing system may be constructed with a plurality of servers interconnected via a local area network (LAN). The servers provide the users with data processing services by executing specific application programs (hereafter "applications"). The term "service" means a unit of such work requested by users and processed by the servers.

In conventional load sharing systems, the workload to be imposed on each server is substantially fixed at a constant ratio predefined in a network, and it is not possible to have complete control of the load distribution within the system.

To switch the operation mode to another mode in such a conventional load sharing system, it is necessary to change operating conditions for applications in the individual servers or to manipulate network resources that belong to each server. In the former method, each server will start and stop the applications or change the number of acceptable service requests, while in the latter method the network resources in each server must be activated or deactivated individually.

The users should make access to each server when trying to get a service from the system. In order to do so, the users must be knowledgeable about what address should be used to communicate with the servers and how the system is configured to provide services to them.

Moreover, the load sharing system may provide its services not only to the requesting user but also to a third party that is not requesting any services to the system. This will happen in system maintenance, for example, where some system functions must be temporarily stopped. In such a case, the system has to make an announcement to the users in need of the functions, so as to notify them when the system will terminate that service.

To accomplish such a forced message delivery to the user terminals in an active manner, the applications must learn in advance which terminals are connected to the system and which route of the network they should use to reach the server. For this reason, the conventional load sharing systems force the individual applications to manage information about the configuration of user terminals. This simply means that each application should be knowledgeable about which terminals are connected thereto and which communication controller is responsible for them, etc.

However, the above-described conventional load sharing systems have some problems in the distribution of workload among the servers.

First, the conventional load sharing system fails to centralize the load distribution control, and thus it is not adaptive enough to suit itself to the changing system state, resulting in low system utilization and insufficient reliability in operations. For example, when an unacceptable task concentration has happened to a specific server or an unscheduled job batch is issued to the system, the users may be frustrated by slow response from the system. Also, a problem in applications running on a server or failure of the server itself can cause rejection of user requests.

Although system administrators can adjust the load distribution by changing allocation of system resources for each server, they must investigate which server is overloaded and for which services the user requests are concentrating, each time they encounter the trouble, the administrators must then make a proper decision based on the understanding of that critical situation. Since the server load changes so frequently during the operation, it is hard for the system administrators to make a correct decision constantly for providing the load sharing system with an optimum load distribution.

Second, the users are responsible for setting up communications functions of their respective terminals by entering complicated parameters to make access to each server, thus causing a serious burden to the users.

In addition, the conventional load sharing system has another problem when an active application tries to initiate a service to the users. Since a number of user terminals are involved in a network, the extra tasks for managing terminal status information will overwhelm the execution of inherent services that the applications should provide to the users. Moreover, a plurality of applications on a server do similar tasks in parallel, thereby charging the server with an unnecessarily heavy burden.

SUMMARY OF THE INVENTION

Taking the above into consideration, an object of the present invention is to provide a network-based load sharing system which operates with high reliability and optimized utilization of resources.

Another object of the present invention is to provide a load sharing system which saves the servers from excessive loads for managing their subordinate terminals.

To accomplish the above objects, according to the present invention, there is provided a load sharing system which performs functionally-distributed processing with a plurality of processors. The system comprises a plurality of servers for processing a service request received over a first network, and a communication controller coupled to the first network and a second network that involves a user terminal. The communication controller receives a user request sent from the user terminal over the second network, and sends the service request that is produced from the received user request to a server selected out of the plurality of servers over the first network.

There is also provided another load sharing system comprising a plurality of servers and a communication controller. Each server comprises service providing means for processing a service request received over a network, and state management agent means for managing activity status of the individual servers. The communication controller establishes a connection path on the network to reach the state management agent means, receives management information indicative of state of the plurality of servers from state management agent means in each of the plurality of servers, and performs a centralized management of the state of the plurality of servers.

To accomplish the above objects, there is provided still another load sharing system which employs a plurality of servers and a communication controller for providing active services from the servers to terminals that are connected to the communication controller via a network. The system comprises service providing means for providing the active services to the terminals; terminal information reporting means, disposed in the communication controller, for sending up-to-date terminal information to the servers over state management paths when conditions of communication with the terminals have changed; and terminal state management means, disposed in the servers, for storing the terminal information sent through the state management paths in a terminal management table, and supplying the terminal information in the terminal management table in response to a query from the service providing means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a diagram illustrating a state management file;

DESCRIPTION OF THE PREFERRED EMBODIMENTS

Several embodiments of the present invention will be described below with reference to the accompanying drawings.

The description will first present an embodiment that solves various problems concerning distribution of workload among a plurality of servers.

Figure 1:
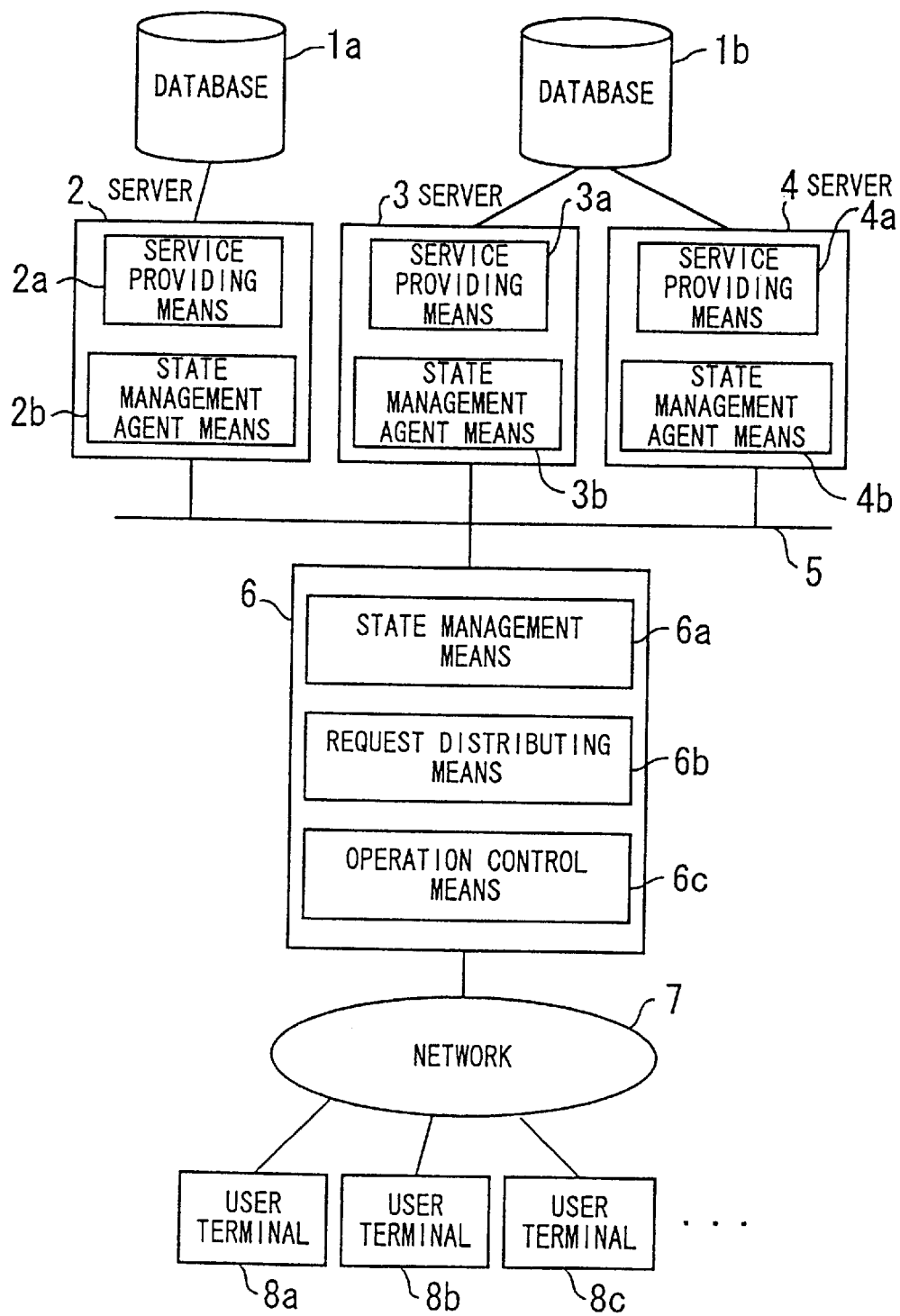
FIG. 1 is a conceptual view of the present invention.

FIG. 1 is a conceptual view of a load sharing system that operates with high reliability and optimized utilization of resources. A server 2 has a dedicated database (DB) 1a, while other servers 3 and 4 share a common database 1b. Those servers 2, 3, and 4 have service providing means 2a, 3a, and 4a for executing service requests received via a communication medium 5 and state management agent means 2b, 3b, and 4b for managing their own operating status, respectively.

In a communication controller 6, state management means 6a first establishes connection paths on the communication medium 5 to reach the state management agent means 2b, 3b, communication controller 6 4b and performs a centralized management of activity status of the servers 2, 3, and 4 based on status information reported from the state management agent means 2b, 3b, and 4b via the established connection paths. Request distributing means 6b receives requests from user terminals 8a, 8b, and 8c via a network 7 and determines their respective destinations according to data under the management of the state management means 6a. The request distributing means 6b then delivers those user requests to the servers 2, 3, and 4 over the communication medium 5 as service requests that direct execution. Operation control means 6c activates or deactivates a plurality of parameters to define how to distribute the requests to the service providing means 2a, 3a, and 4a.

In the above-described structural arrangement, the state management agent means 2b, 3b, and 4b send the activity status of the servers 2, 3, and 4 to the state management means 6a, which serves as a central station to manage the status information of all servers. Requests issued by the user terminals 8a, 8b, and 8c are sent to the communication controller 6 via the network 7. In the communication controller 6, the request distributing means 6b determines the destination of each user request based on the parameters that are currently activated. The request distributing means 6b then delivers the accepted user requests to the relevant servers as the service requests that should be processed by the respective service providing means. Upon reception of the service requests, each service providing means manipulates its database according to the contents of the requests. If it becomes necessary to readjust the load distribution conditions due to a change of operating status in any of the servers 2, 3, and 4, the operation control means 6c will modify some parameters descriptive of load distribution ratios and other conditions.

As such, although the system is actually constructed with a plurality of servers to form a load sharing system, the users need not to be concerned with its detailed inner structure. The communication controller 6 collects the internal status information of the servers 2–4 through their respective state management agent means 2b, 3b, and 4b, thus allowing an optimum load distribution to be provided. Further, the operation control means 6c manages activation and deactivation of parameters for load distribution control. This means allows the system to take necessary measures promptly to adapt itself to the widely-changing operating conditions, thus making it possible to maintain an optimum load distribution.

Concerning the hardware structure for the above-described load sharing system, especially with regard to the communication controller, there may be two options: a single controller configuration and a dual controller configuration. The following description will first present the former configuration and then explain the latter one.

Figure 2:
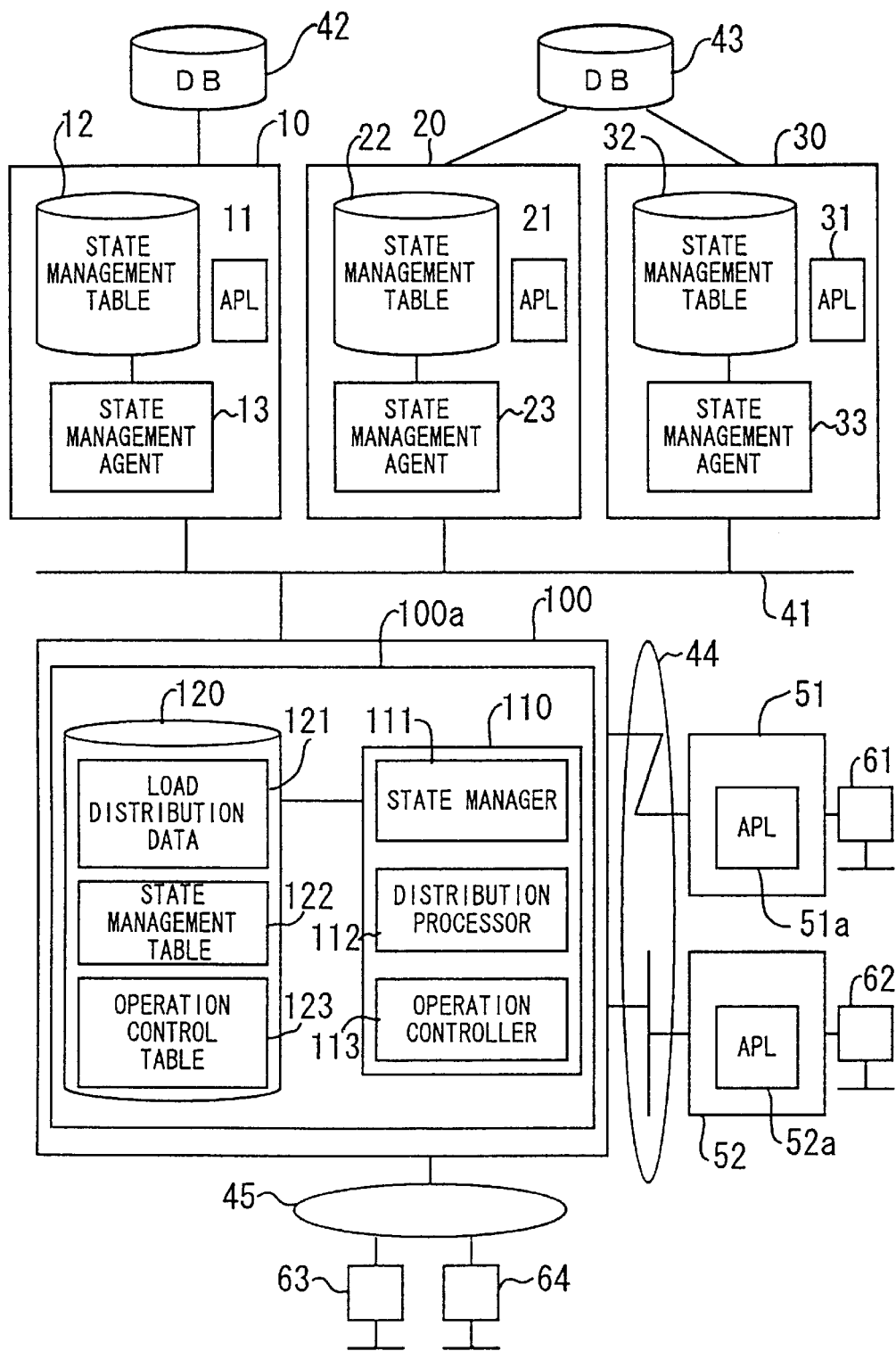
FIG. 2 is a block diagram outlining the structure of a load sharing system according to the present invention.

FIG. 2 is a block diagram outlining the structure of a load sharing system equipped with a single communication controller according to the present invention. The system shown in FIG. 2 includes a local area network (LAN) 41 and two more two networks 44 and 45. A plurality of servers 10, 20, and 30 are located on the LAN 41. While the server 10 has its own database 42, the other servers 20 and 30 commonly use a database 43. With the network 44, a communication controller 100 and two other systems 51 and 52 are interconnected. The systems 51 and 52 have terminals 61 and 62, respectively. The network 45 connects between the communication controller 100 and terminals 63 and 64.

The servers 10, 20, and 30 respectively contain the following elements: applications 11, 21, and 31 for providing various services to the users; state management tables 12, 22, and 32 for storing their own activity status information; and state management agents 13, 23, and 33 for reporting the activity status information to the communication controller 100.

The communication controller 100 is in charge of data communication control for the LAN 41 and other networks 44 and 45. For this purpose, it incorporates a network linkage controller 100a composed of a distribution program 110 and a storage unit 120. The distribution program 110 consists of a state manager 111, a distribution processor 112, and an operation controller 113. The state manager 111 collects status information of the servers 10, 20, and 30 and provides a centralized management of the collected information. The distribution processor 112 distributes requests from the users to relevant servers. The operation controller 113 activates or deactivates parameters to determine how to distribute the requests to the servers. The storage unit 120 saves load distribution data 121 indicative of the actual load of each server, a state management table 122 showing information about the service requests that have been assigned to the servers, and an operation control table 123 containing a plurality of conditions for switching the operation mode of the load sharing system.

The above-described load sharing system with a single communication controller has five major features as follows:

(1) The communication controller 100 and servers 10, 20, and 30 work together as if they were a single server machine. In other words, the servers 10, 20, and 30 hide behind the communication controller 100, and thus they appear to be a unified system from the user's viewpoint. This function will be referred to as the "unified system interface."

(2) The communication controller 100 provides a centralized management of activity status information of the servers 10, 20, and 30, thanks to the state management agents 13, 23, and 33 disposed on the server side.

(3) As a synergistic result of the above two features (1) and (2), the distribution of workload can be optimized by delivering the user requests to the most suitable servers that are determined based on the information collected in the communication controller 100 for server management purposes.

(4) Efficient load distribution is obtained by modifying the operating conditions that activate or deactivate some options for determining the destinations when forwarding the service requests using the above-described feature (3).

(5) When determining the destinations as in (4), the criteria are dynamically changed according to the actual load status in each server.

Figure 3:
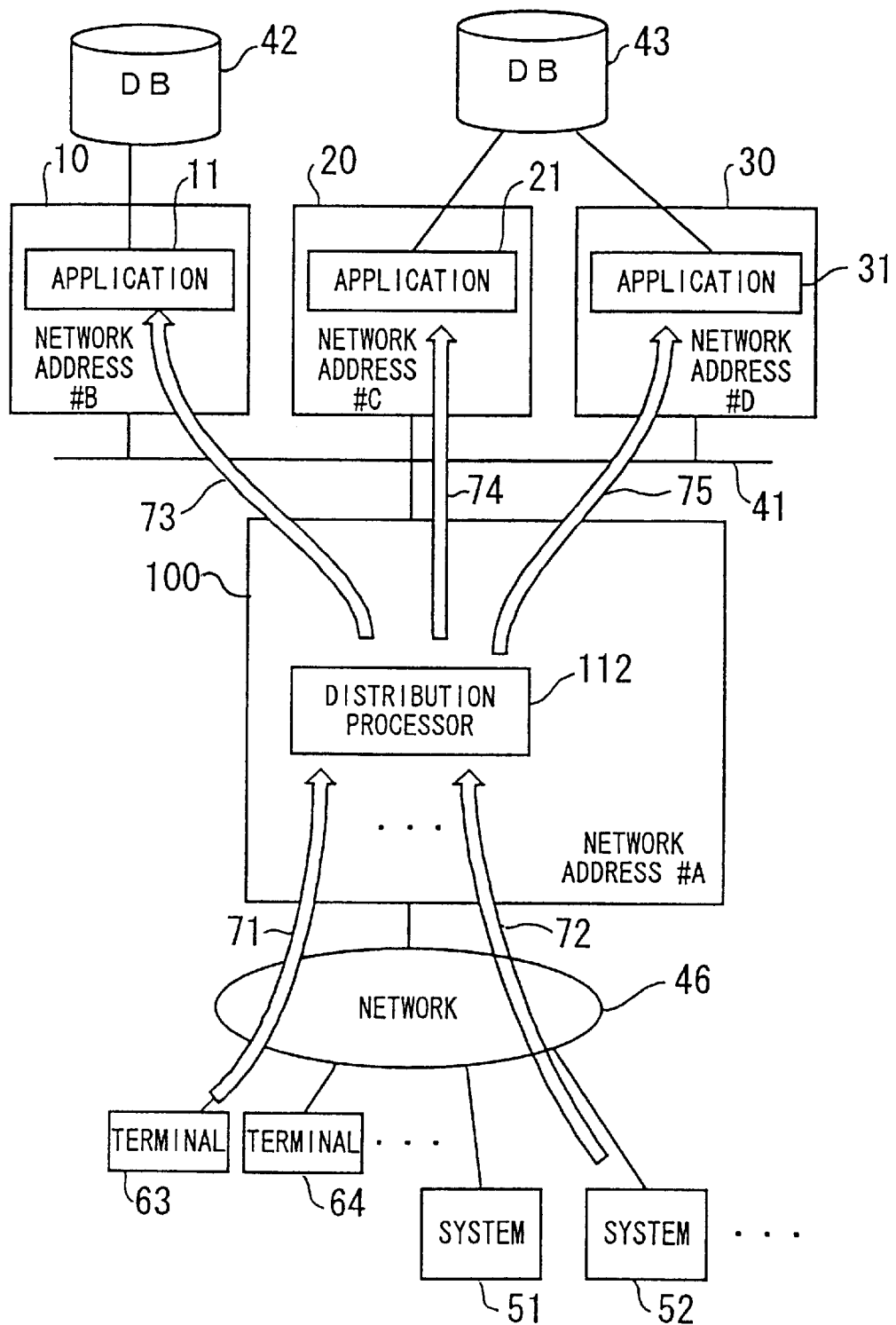
FIG. 3 is a block diagram showing a unified system interface function.

The first feature "system interface" will be described below with reference to a block diagram of FIG. 3. For simplicity of explanation, the two separate networks 44 and 45 in FIG. 2 are now represented as a single network 46 in FIG. 3.

The following description assumes such a situation that the terminals 63 and 64 or other systems 51 and 52 are about to issue some request messages for updating the databases 42 and 43. These request messages 71 and 72 are posted to the network 46 with a network address #A designating the communication controller 100 as the destination. In other words, the address #A is the key address that represents the load sharing system as a whole. Upon reception of the request messages 71 and 72, the distribution processor 112 in the communication controller 100 translates the network address #A into either of other network addresses #B, #C, and #D, which are respectively corresponding to the servers 10, 20, and 30. From the communication controller 100, modified request messages 73, 74, and 75 each having a new address are delivered to the servers 10, 20, and 30 as their respective final destinations. In response to those requests, applications 11, 21, and 31 in the servers will massage the contents of the databases 42 and 43.

As described above, the user terminals 63 and 64 as well as other independent systems 51 and 52 can enjoy the services of the applications by simply sending request messages to the same network address #A assigned to the communication controller 100. That is, the users need not to be aware of the presence of the servers 10, 20, and 30.

Figure 4:
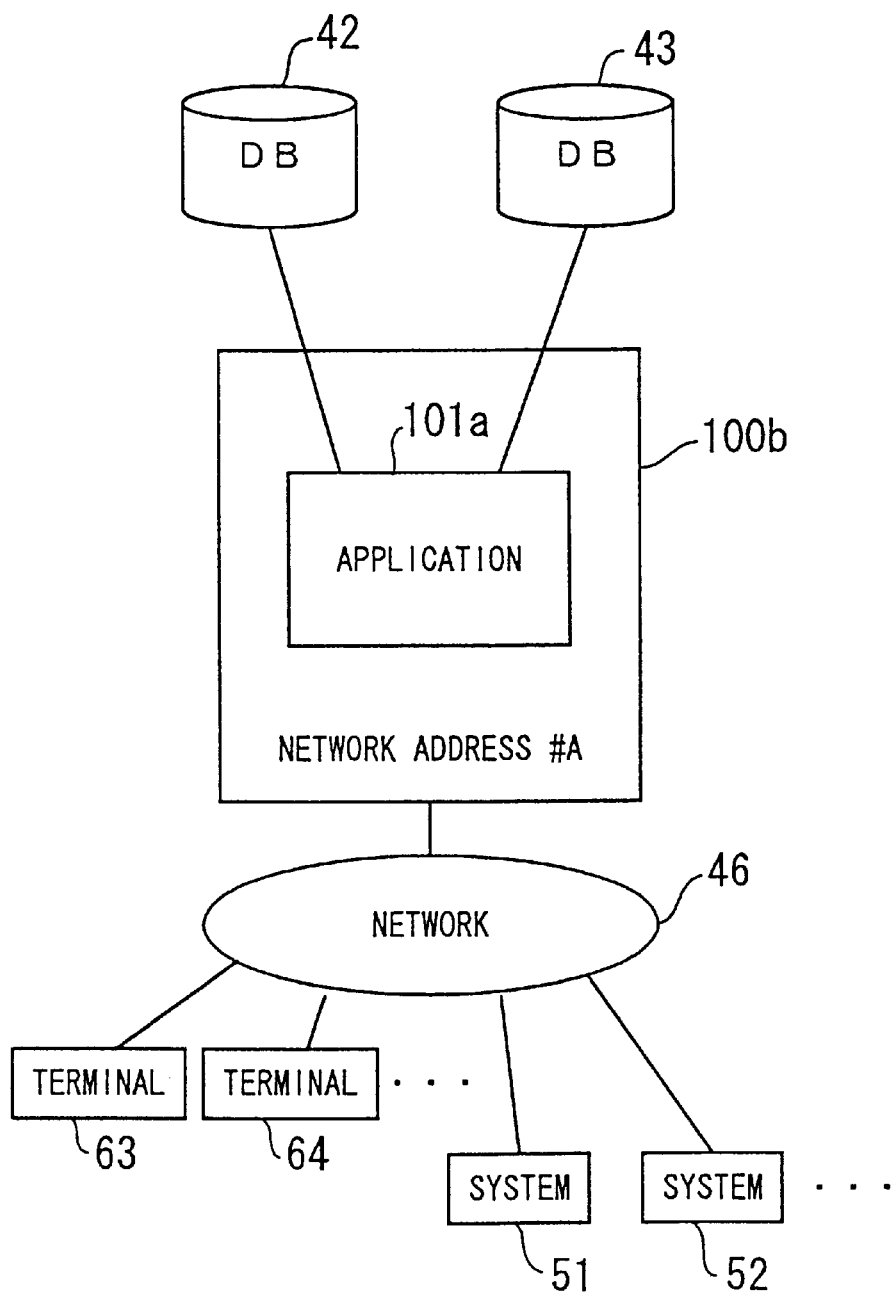
FIG. 4 is a diagram showing an appearance of the network system from the user's viewpoint.

FIG. 4 shows how this network system appears to the users. The users understand that the following equipment is involved in the network 46: terminals 63 and 64, the systems 51 and 52, and a database server 100b for handling the shared databases 42 and 43. In reality, however, this database server 100b is a complex system consisting of the servers 10, 20, and 30 and the communication controller 100.

The communication controller 100 provides logical links between its own network address #A and the other network addresses #B, #C, and #D assigned to the servers 10, 20 and, 30.

Figure 5:
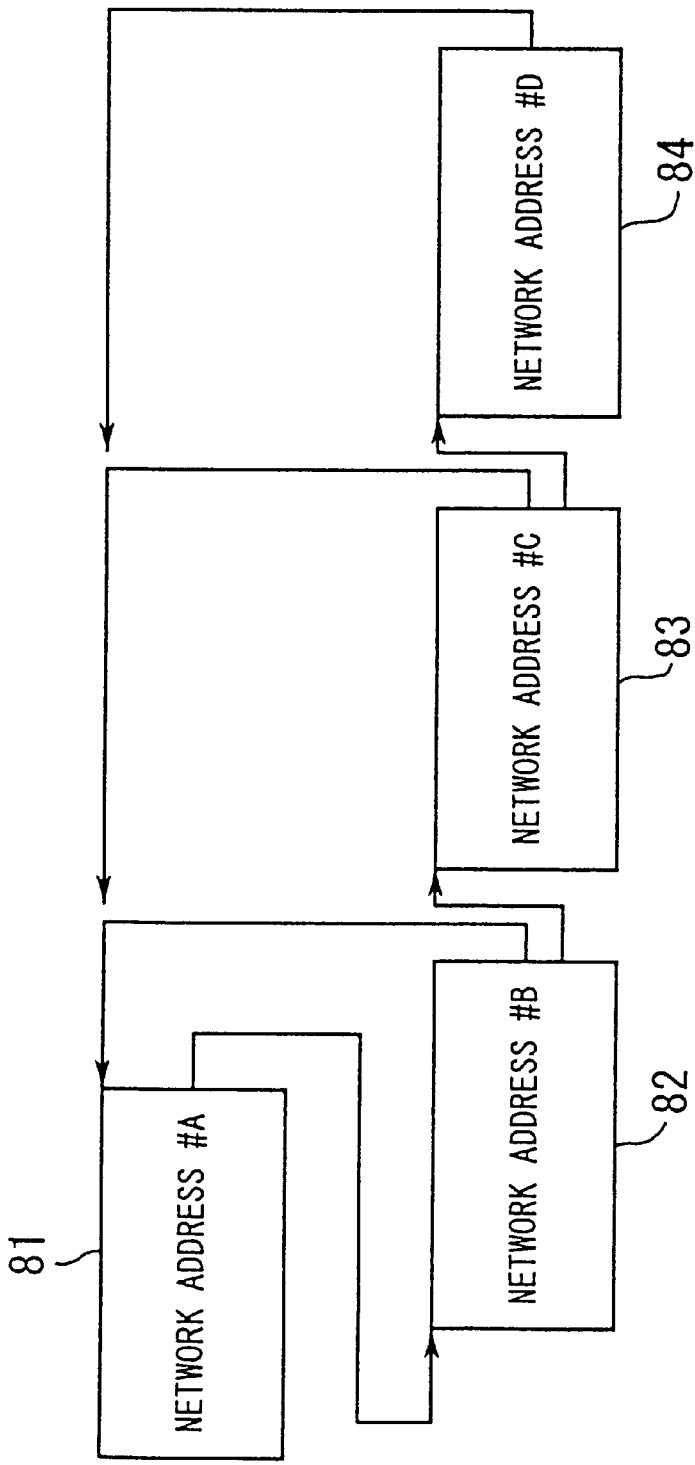
FIG. 5 is a diagram showing network address linkage defined in a communication controller.

FIG. 5 shows how those network addresses are linked with one another in the communication controller 100. The links are disposed asymmetrically depending on the direction of messages. In the direction from users to servers, the network address #A 81 links in series to the network address #B 82, network address #C 83, and then network address #D 84. In the opposite direction, the network addresses #B–#D 82–84 are all linked to the same network address #A 81.

According to this linkage scheme, the distribution processor 112 translates the network address from those of the terminals 63 and 64 as well as of the remote systems 51 and 52 into those of the servers 10, 20, and 30, or vice versa. Now the following will show how the network addresses will be translated.

Figure 6:
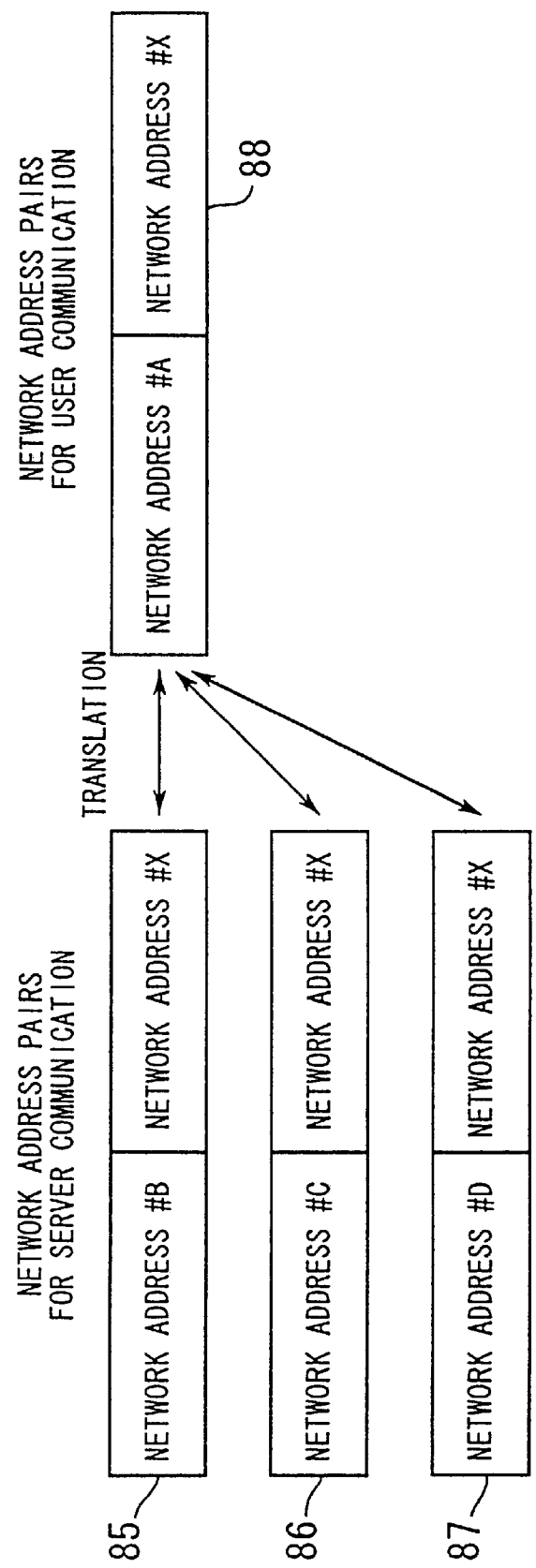
FIG. 6 is a diagram showing a method of network address translation.

FIG. 6 shows a method of network addresses translation. In the network, each message is transferred with a pair of network addresses. The left half of FIG. 6 illustrates network address pairs 85, 86, and 87 which are used for communication between the communication controller 100 and servers 10, 20, and 30. Those network address pairs 85, 86, and 87 are combinations of the network addresses #B, #C, and #D of the servers 10, 20, and 30 and a network address #X of a user terminal, respectively. On the other hand, the right half of FIG. 6 shows another network address pair 88 for communication between the communication controller 100 and the terminals 61–64. This pair 88 consists of the network address #A and a network address #X of the same user terminal.

Upon reception of a message with the network address pair 88 over the network 46, the distribution processor 112 in the communication controller 100 changes the network address #A as part the pair to another address for either of the servers 10, 20, and 30. The message with the changed address pair is then posted to the LAN 41.

Figure 7:
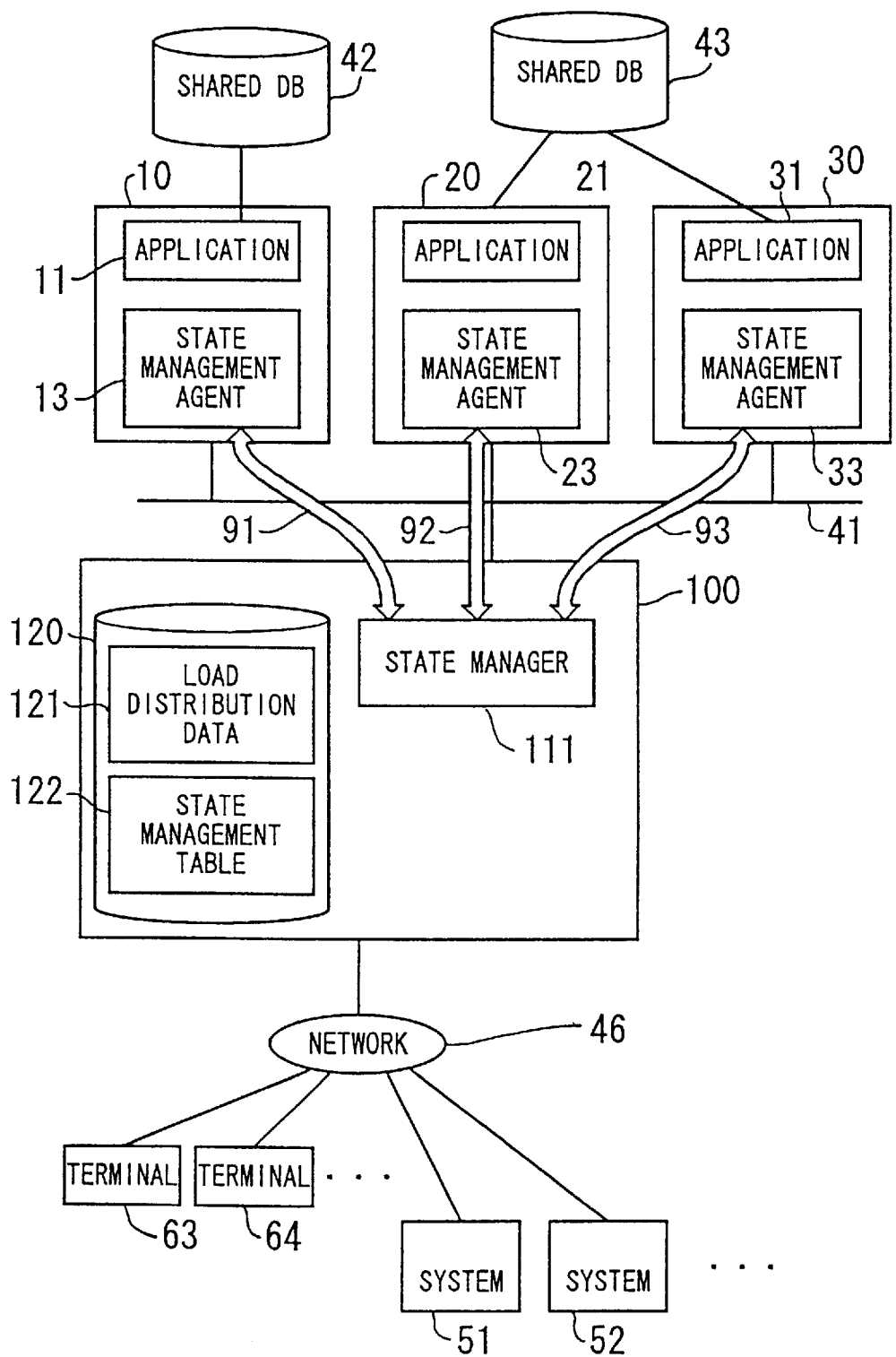
FIG. 7 is a block diagram outlining the structure of a communication controller which provides centralized management of application status information.

The following will now describe about centralized management of application status in the servers by the communication controller 100 as was mentioned before as the second feature of the present invention. FIG. 7 is a block diagram outlining the structure that allows this centralized management of application status information. To realize this function, the state manager 111 in the communication controller 100 first establishes connection paths 91, 92, and 93 to the state management agents 13, 23, and 33 in the servers 10, 20, and 30, respectively. Through these connection paths 91–93 for status management, the state manager 111 sends requests for status information of the applications 11, 21, and 31 to the state management agents 13, 23, and 33. In response to the requests, the state management agents 13, 23, and 33 report to the state manager 111 about the current operating status of the applications 11, 21, and 31. The state manager 111 collects the status information from the state management agents 13, 23, and 33 and stores the collected information into the storage unit 120, where the information is divided into the load distribution data 121 and state management table 122. Hereafter, the term "state management file" refers to the bundled information consisting of the load distribution data 121 and state management table 122, plus job operation status data.

Figure 8:
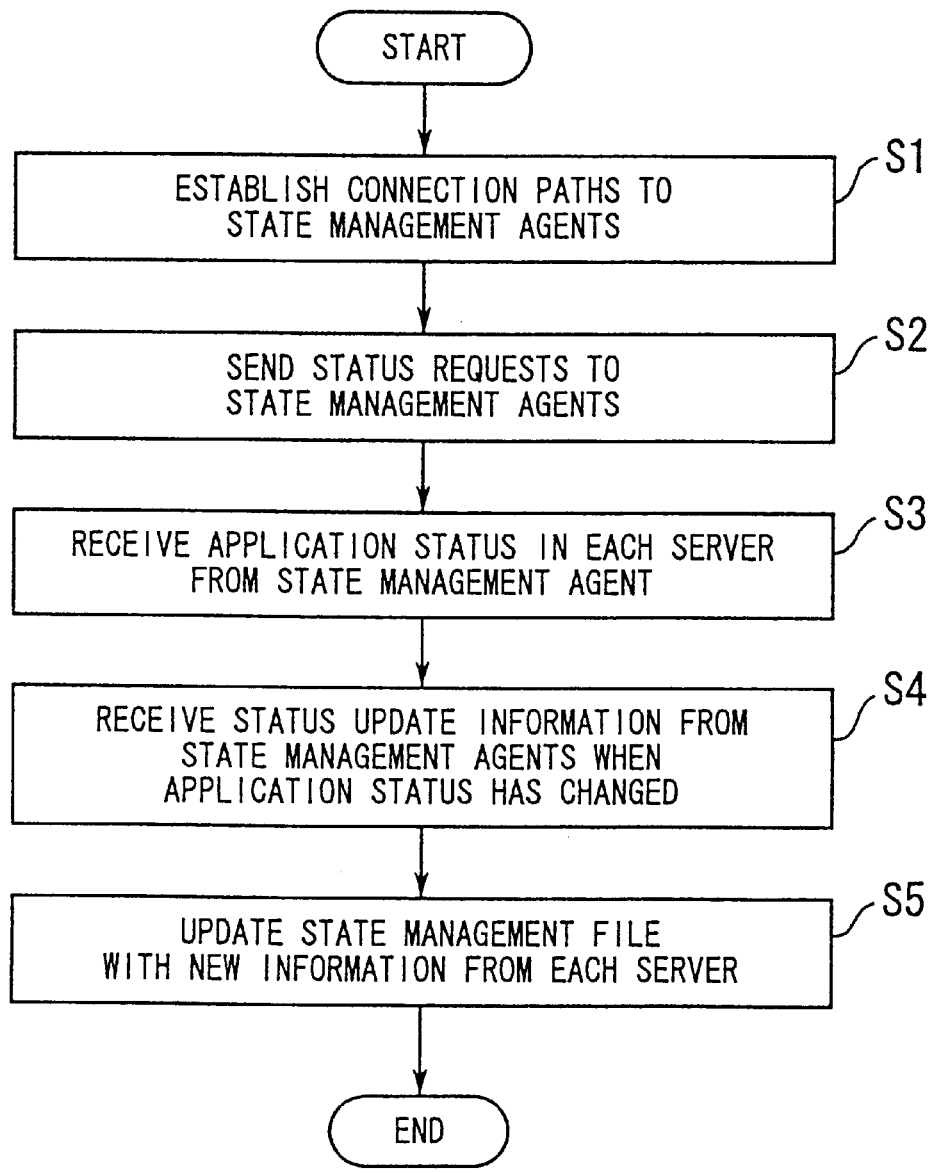
FIG. 8 is a flowchart showing a state management procedure performed by a state manager.

FIG. 8 is a flowchart showing a state management procedure performed by the state manager 111. The procedure takes the following steps.

[S1] The connection paths 91, 92, and 93 are established between the state manager 111 and the state management agents 13, 23, and 33.

[S2] The state manager 111 sends status requests to the state management agents 13, 23, and 33.

[S3] The state manager 111 receives status reports from the state management agents 13, 23, and 33, which indicate operating status of the applications 11, 21, and 31.

[S4] The state manager 111 further receives status update information from the state management agent 13, 23, and 33 when any status change has happened to the application 11, 21, or 31.

[S5] With the received information, the state manager 111 updates the state management file concerning the applications 11, 21, and 31.

Next, the contents of the state management file will be described below with reference to an example shown in FIG. 9. The information managed in this state management file includes: service name, operation status information, application state management information, and load distribution data.

The term "service" stands for a unit of process to be executed by the load sharing system and the service name indicates a specific service subject to management. The operation status information will indicate an "in service" status while the load sharing system continues to provide the requested services. It changes to "stopped (disabled)" when the service is stopped and no longer available.

The application state management information includes several items as: server in connection, application on server, application ID, and application status. The first item "server in connection" indicates a server that each entry (i.e., data in each row) belongs to. The items "application on server" and "application ID" represent the name and identification number of each application loaded on the server. The last item "application status" shows whether the application is ready for service or not.

The application ID is used by the network linkage controller 100a for updating the information therein with new information provided from the state management agents. The use of the application ID allows high-speed search for resources.

The load distribution data includes two items: the number of assigned requests and distribution ratio. The former item means how many requests from the users are assigned to the application concerned. The distribution ratio indicates the ratio (%) of the requests that are currently assigned to each application to the total requests for a specific service that the system has accepted so far but not yet finished, showing how the workload is distributed over the applications.

Figure 10:
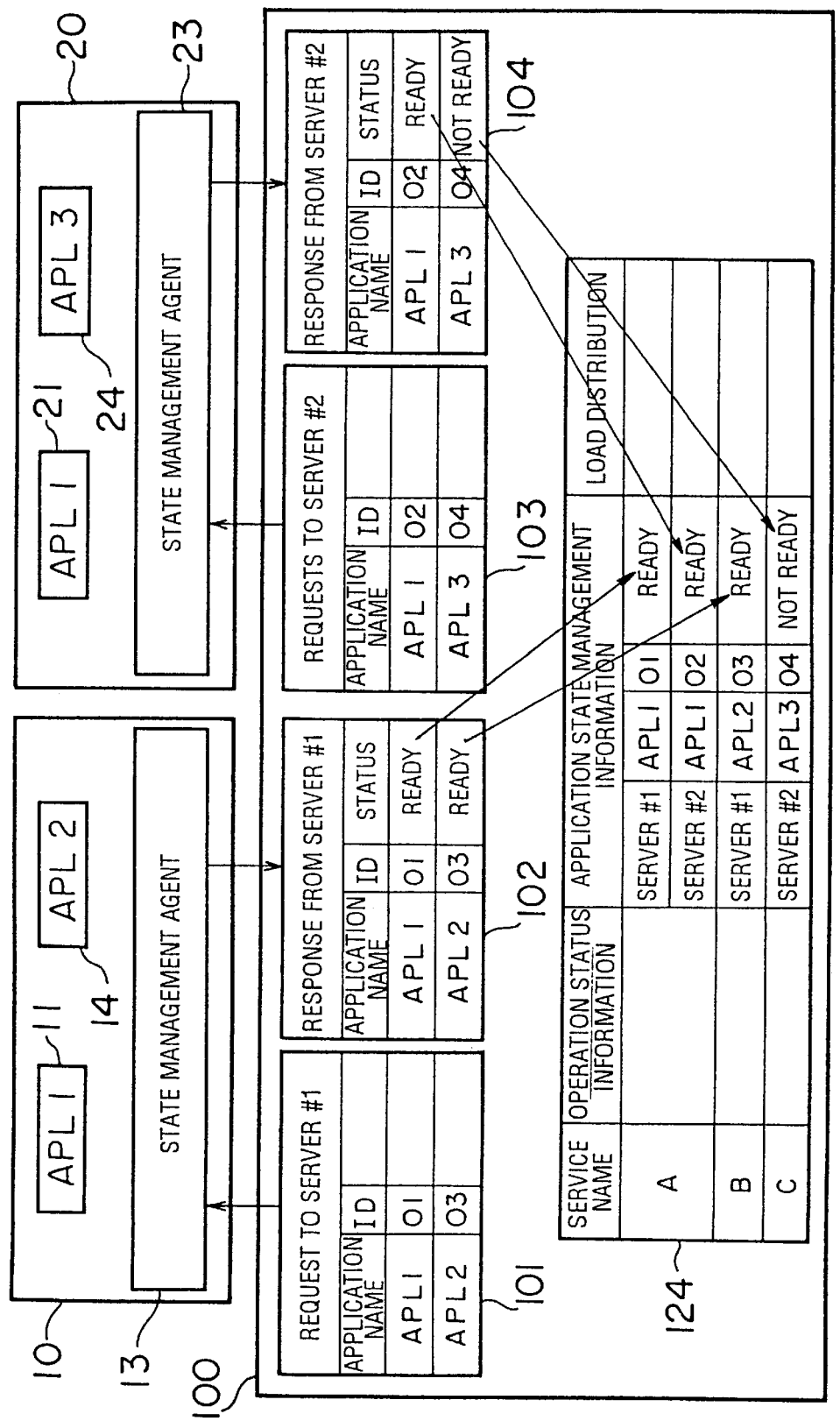
FIG. 10 is a diagram showing a concept of application state management.

FIG. 10 shows a concept of the application state management, illustrating a specific situation of the load sharing system. The server 10 has applications 11 and 14 (APL1 and APL3) and the server 20 has applications 21 and 24 (APL1 and APL3). The application 11 (APL1) and 21 (APL2) provide the same service for the users. The contents of a state management file 124 in FIG. 10 are exactly what is shown in FIG. 9. While the applications 11, 14, and 21 (APL1 and APL2) are running, the application 24 (APL3) is stopped.

In the above situation, the state manager 111 in the communication controller 100 assembles queries 101 and 103 and sends them to the servers 10 and 20 as status request messages. The state management agents 13 and 23 in the servers 10 and 20 send back responses 102 and 104 in reply to those request messages. The state manager 111 receives the responses and updates the (state management file 124.)

Figure 11:
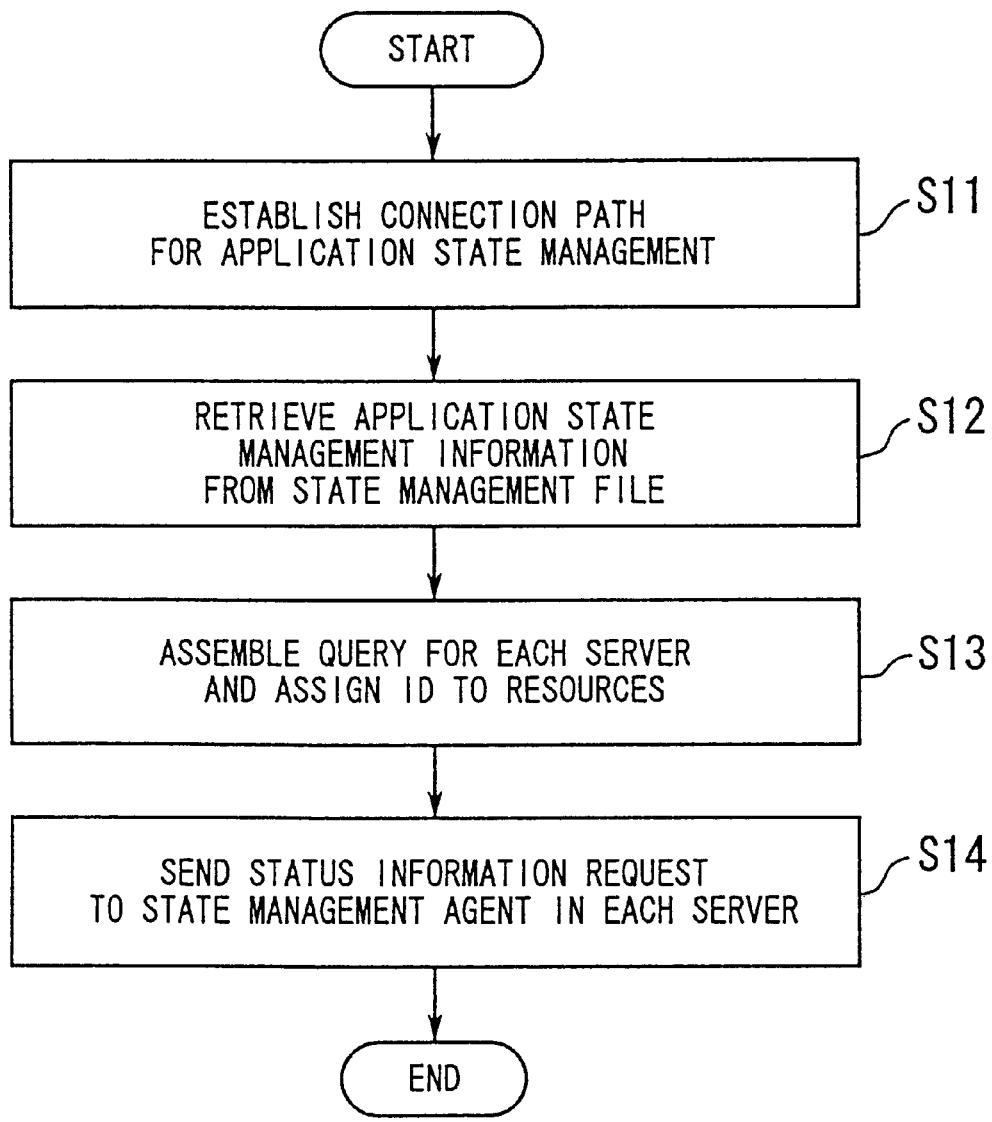
FIG. 11 is a flowchart showing a procedure for requesting status information by the communication controller.

FIG. 11 is a flowchart showing a status requesting procedure, which will be performed by the state manager 111 in the communication controller 100. The procedure takes the following steps.

[S11] A connection path is established to reach each state management agent for application state management.

[S12] The state manager 111 retrieves application state management information from the state management file.

[S13] The state manager 111 assembles a query for each server including assignment of an ID for each resource (i.e., each application). [S14] The state manager 111 sends a status information request to the state management agent in each server.

Figure 12:
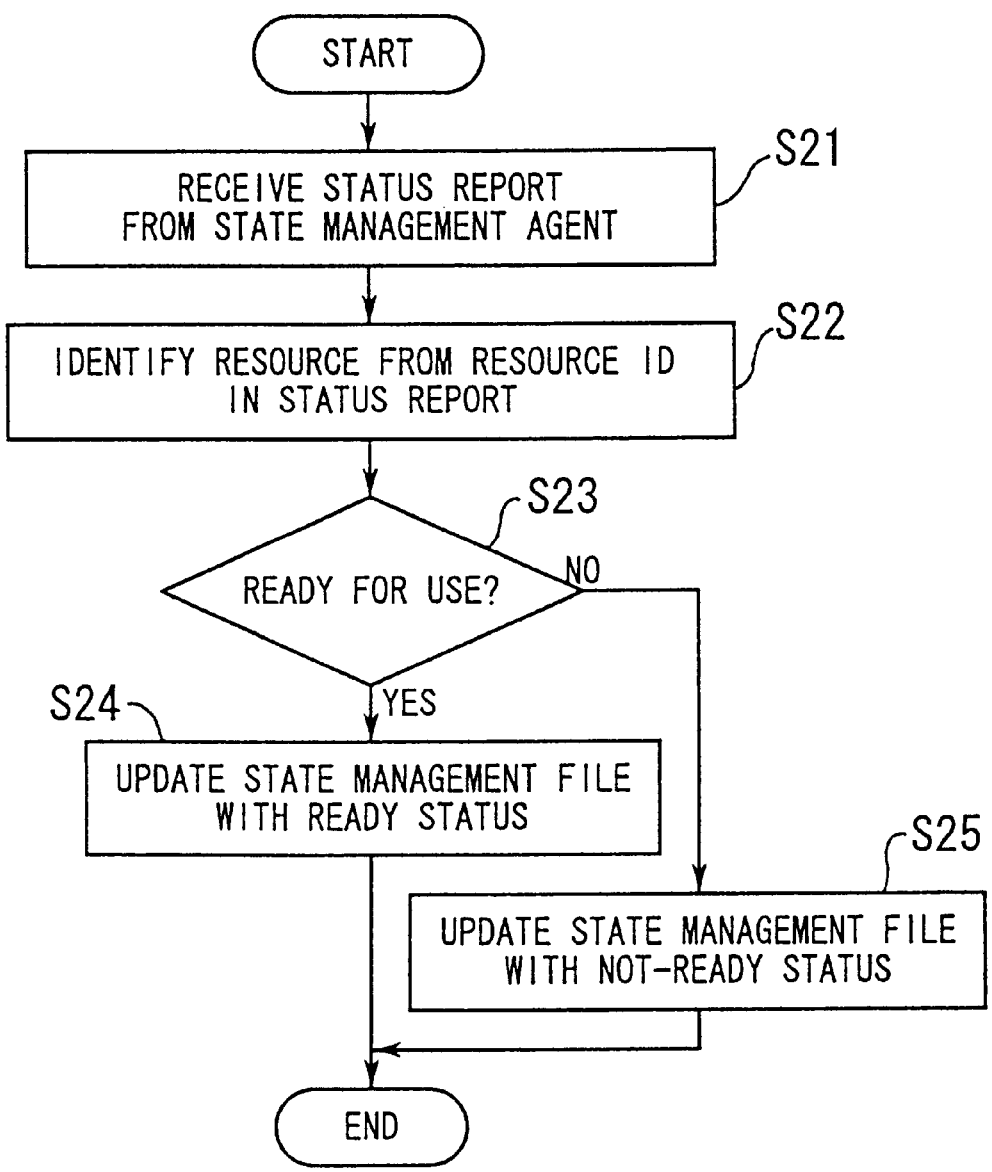
FIG. 12 is a flowchart showing a procedure executed when the communication controller receives a status report.

FIG. 12 is a flowchart showing a procedure executed by the state manager 111 when the communication controller 100 receives status reports. This procedure takes the following steps.

[S21] The state manager 111 receives a status report from a state management agent.

[S22] The resource is identified based on the resource ID contained in the received status report.

[S23] It is determined whether the identified resource is ready for use or not. The procedure proceeds to step S24 if it is found ready. Otherwise, it goes to step S25.

[S24] Updating the state management file with the ready status.

[S25] Updating the state management file with the not-ready status.

While the communication controller executes the procedures shown in FIGS. 11 and 12, the state management agent in each server performs the following processes.

Figure 13:
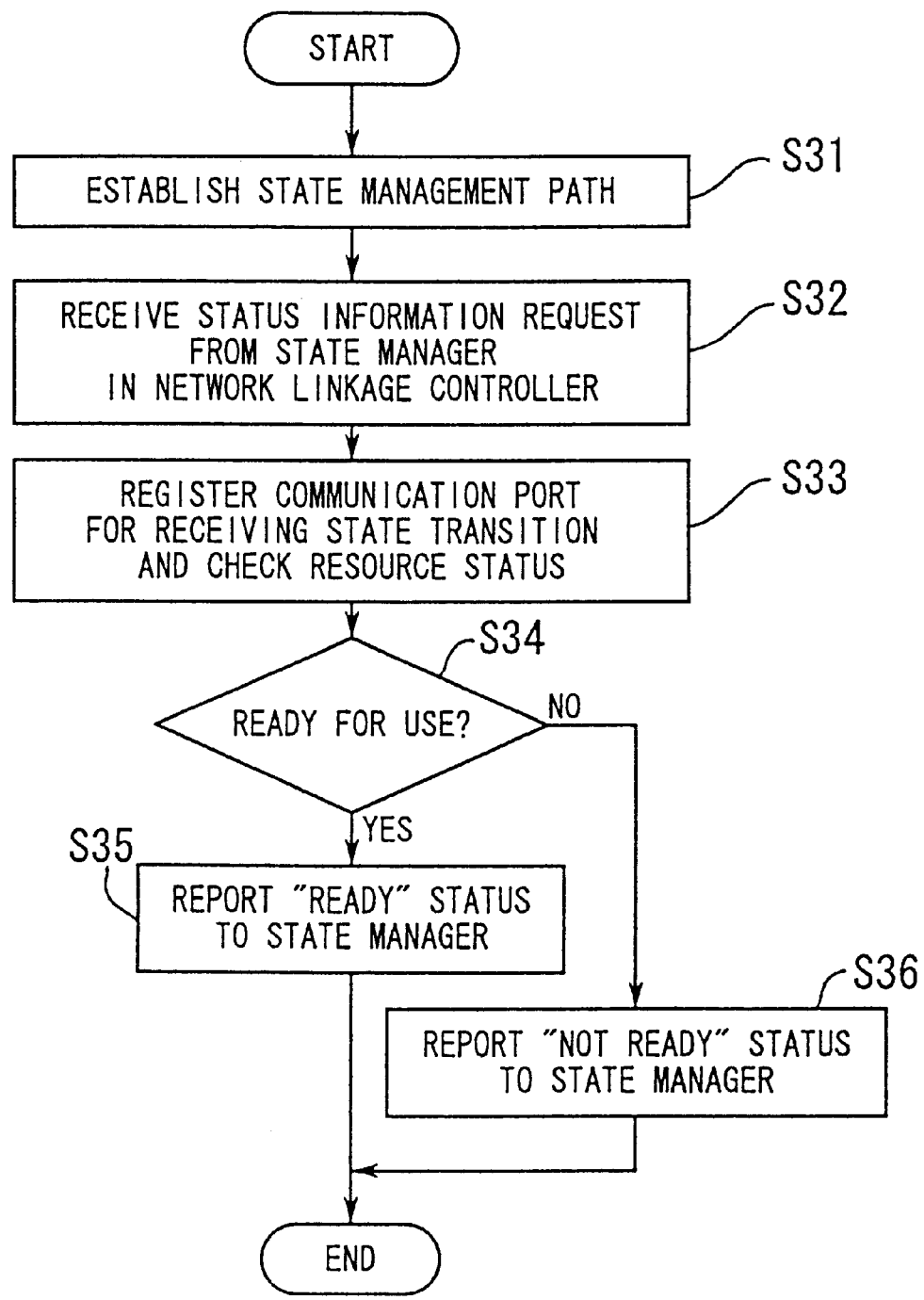
FIG. 13 is a flowchart showing a status reporting procedure performed by a state management agent in response to the status request from the communication controller.

FIG. 13 is a flowchart showing a status reporting procedure performed by the state management agent of each server in response to the status request from the communication controller.

[S31] A state management is established between the state management agent and the communication controller.

[S32] The state management agent receives a status information request concerning a specific resource from the state manager in the network linkage controller.

[S33] Confirming the current state of the subordinate resources, the state management agent registers a communication port to be used for notifying of state transition. The port serves as an entrance through which the state management agent can receive resource status information from another monitor program that is watching the applications in the server. Once registered to the state management agent, the port will allow the agent to obtain application status information.

[S34] It is determined whether the resource specified by the status information request is ready for use or not. If it is found ready, the procedure proceeds to step S35, and if not, it branches to step S36.

[S35] The state management agent reports to the state manager that the specified resource is ready for use.

[S36] The state management agent reports to the state manager that the specified resource is not ready for use.

Figure 14:
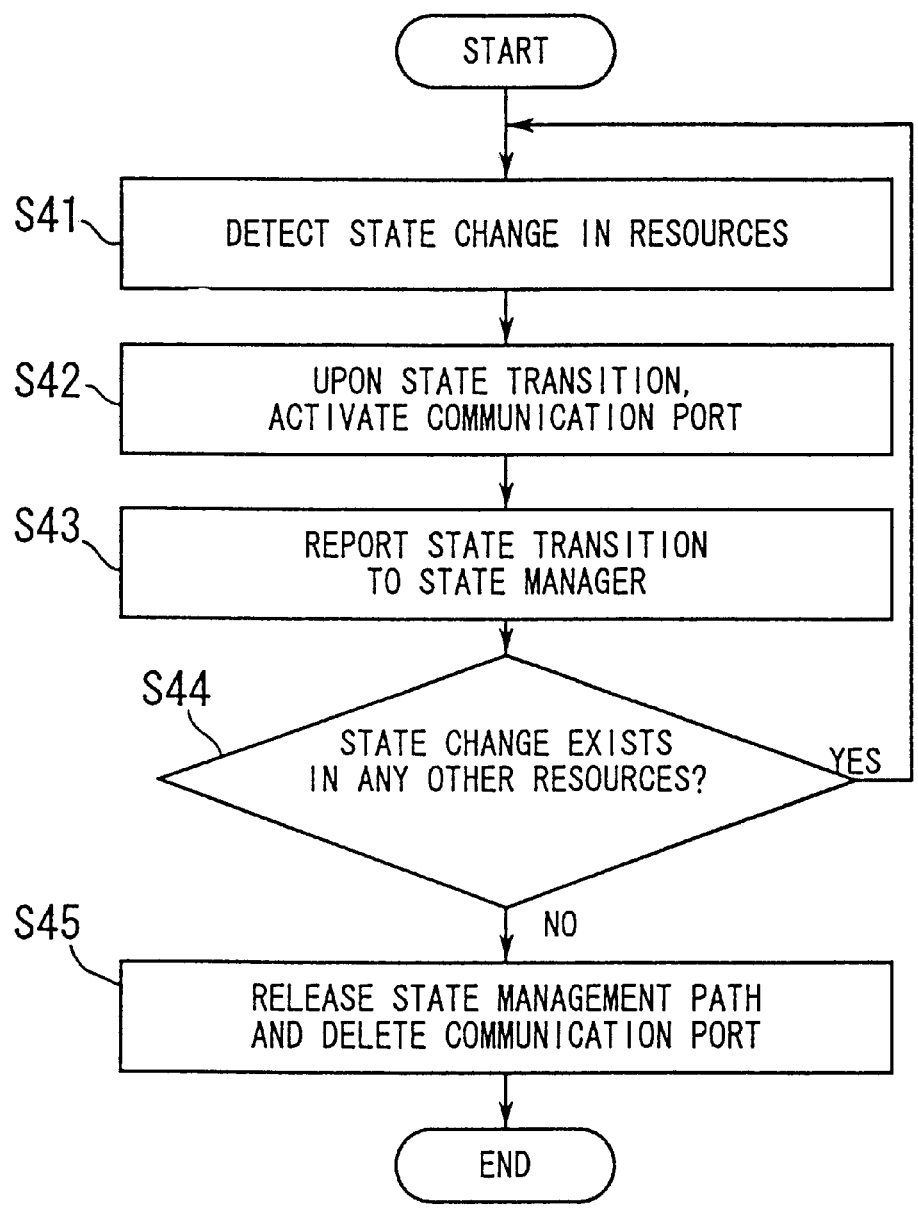
FIG. 14 is a flowchart showing a status reporting procedure executed by a state management agent when a change of resource status is detected.

FIG. 14 is a flowchart showing a status reporting procedure performed by the state management agent when a change of resource status is detected. The procedure takes the following steps.

[S41] A status change in a certain resource is detected.

[S42] The detected state transition activates the communication port that has been set up for reporting the state transition.

[S43] The state management agent receives the details of the state transition through the communication port and reports them to the state manager.

[S44] It is tested whether any other resource has changed or not. If there is such a resource, the procedure goes back to step S41. Otherwise, the procedure proceeds to step S45.

[S45] The state management agent releases the state management path, and deletes the communication port.

In the way described above, the application status information in every server is concentrated in the communication controller 100, thus enabling it to provide a centralized management thereof. According to this system, the communication controller 100 can locate the relevant server applications by using the application IDs registered in the state management file, while the servers can employ their suitable state management agent. As a result, the communication controller 100 will be able to manage the applications regardless of the types of server systems. The servers may not be necessarily homogeneous but can involve a large-scale host computer and UNIX workstations, for instance.

Furthermore, thanks to the ID-oriented addressing and application-specific state management agents, the communication controller 100 can work independently of communication protocols that the applications may use.

The following description will now be devoted to the optimum load distributing function, which has been introduced as the third feature derived from the first and second features of the present embodiment. The communication controller 100 tries to optimize the load distribution by delivering user requests to the most relevant servers selected in accordance with the server status information managed by itself.

Figure 15:
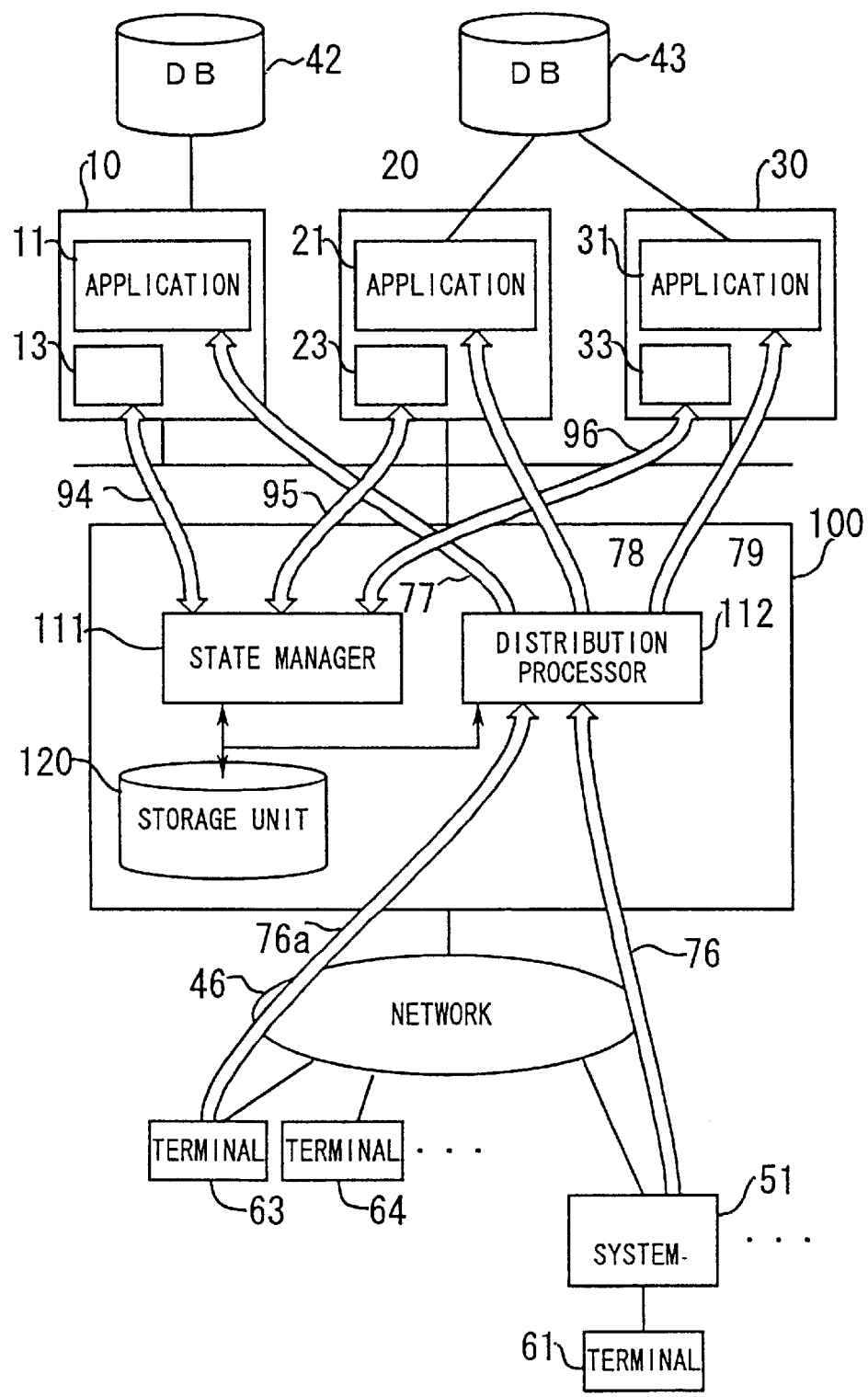
FIG. 15 is a conceptual view of a process to distribute user requests according to centralized management information.

FIG. 15 shows a concept of such a distribution process. Connection paths 94, 95, and 96 have been established between the state manager 111 and the state management agents 13, 23, and 33. The applications 11, 21, and 31 are running on the servers 10, 20, and 30, and their activity status information is collected by the state manager 111 through the connection paths. The collected information is saved in the storage unit 120 in the form of state management file.

Requests 76 and 76a, which are issued by the user terminals 61, 63, and 64 for access to the databases 42 and 43, will first arrive at the distribution processor 112 via the network 46. The distribution processor 112 retrieves the latest status information on the applications 11, 21, and 31, and it determines by which application the respective requests should be executed, taking the retrieved information into account for obtaining appropriate load distribution. The distribution processor 112 then outputs service requests 77–79 to the determined applications for performing the requested database access. Then the applications provide the requested services with the databases 42 and 43.

In the above sequence of operations, the distribution processor 112 uses a part of each user request message as a search key. The search keys, candidates for the target server corresponding to the keys, and their respective addresses are all under the control of the state manager 111.

Figure 16:
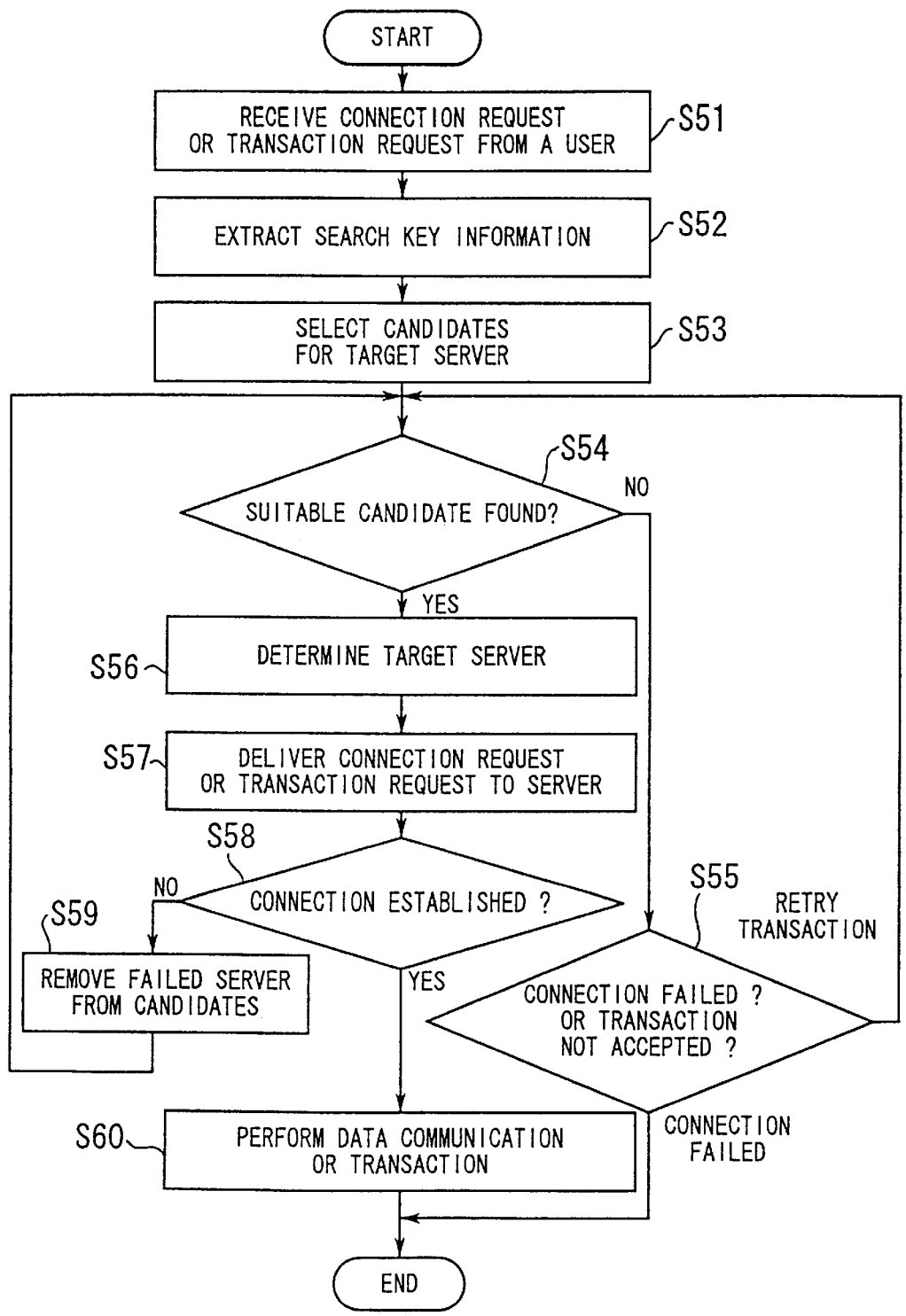
FIG. 16 is a flowchart showing a distribution control process.

FIG. 16 is a flowchart showing the distribution control process. Note here that the user requests may contain either a request for establishing a connection or a request for a transaction, and the following process covers both types. Steps S51–S59 are performed by the distribution processor 112. Step S60 is executed by an application in the case of transaction request or by both of an application and user terminal in the case of connection request.

[S51] A request message arrives from a network user for establishing a connection or starting a transaction.

[S52] The distribution processor 112 extracts a search key out of the received request message.

[S53] With the extracted key, the distribution processor 112 selects some candidate servers that would be possible to receive the request.

[S54] The distribution processor 112 decides whether there is a suitable candidate or not, by investigating the current status of each candidate. If such a candidate is successfully found, the process proceeds to step S56, and otherwise, the process goes to step S55.

[S55] Now that no candidate is available, what to do at this stage depends on the context of the present request. If the user is requesting connection establishment, this request simply fails and thus the process should be terminated. If the request is a transaction, the distribution processor 112 holds the request and waits for a predetermined time. Upon expiration of this wait time, the process restarts from step S54.

[S56] Since the valid candidates are available, the distribution processor 112 determines one of the candidates as a target server (i.e., the destination) for the present request.

[S57] The distribution processor 112 requests the target server to establish the connection or to receive the request for a transaction.

[S58] The distribution processor 112 confirms whether the connection has been successfully established or not. If it has been established, the process goes to step S60. If it is found that the connection has failed, the process proceeds to step S59. Note that the process skips this step S58 and proceeds to step S60 in the case of a transaction request.

[S59] Now that the connection has been failed, the distribution processor 112 removes that server from the list of candidates. The process then restarts from step S54.

[S60] Since the connection has been established, both the user and server can perform data communication or transaction.

Figure 17:
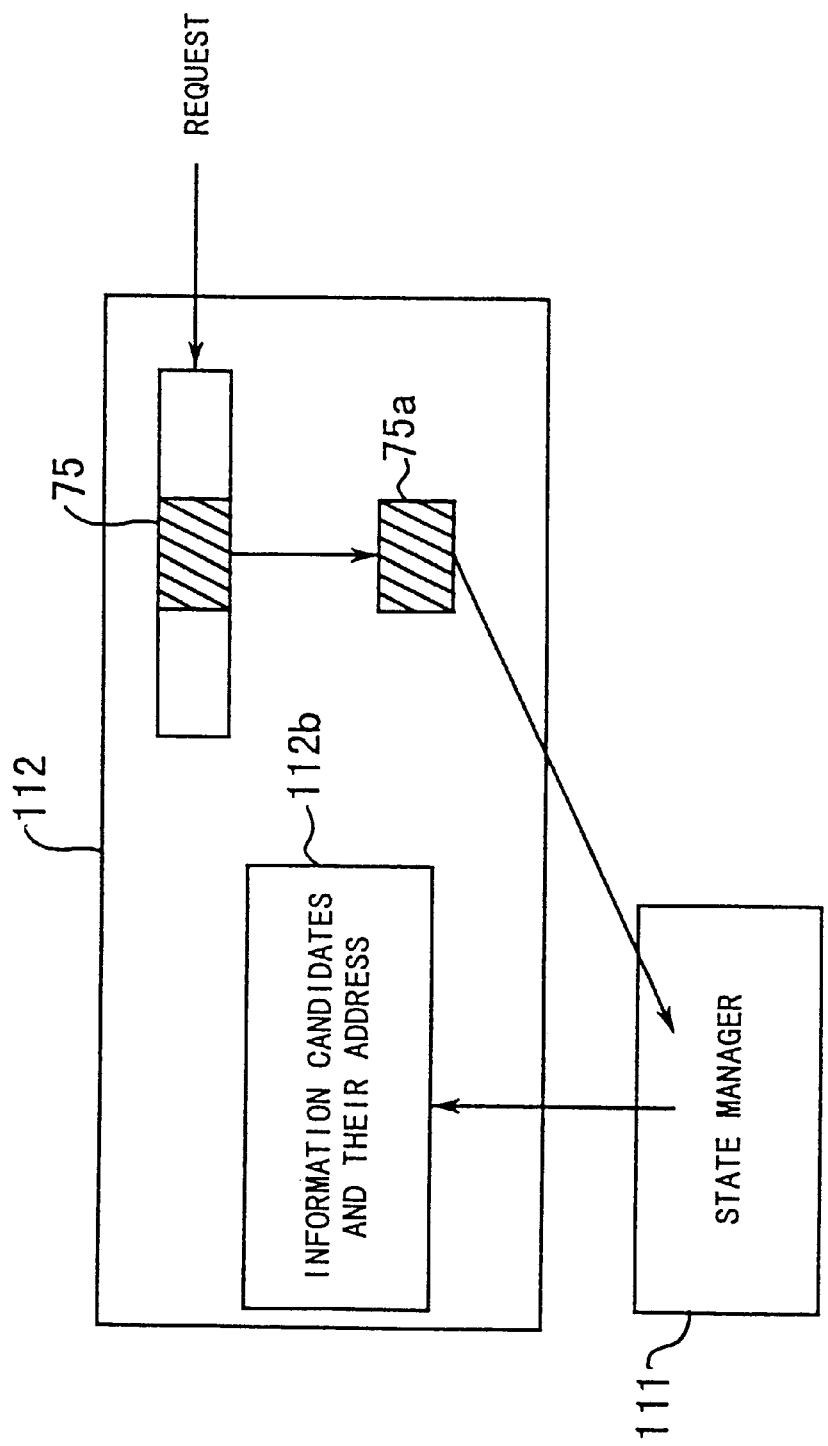
FIG. 17 is a diagram showing how to obtain a search key.

The following will show the details of acquisition of the search key mentioned in the above step S52. FIG. 17 illustrates how the search key will be obtained. The state manager 111, coupled to the distribution processor 112, manages information about candidates for the target server and their respective addresses, with classification according to the search key.

A request 75 is first entered to the distribution processor 112, where a search key 75*a* is extracted therefrom. The extracted search key 75*a* is then sent to the state manager 111. Using the key 75*a*, the state manager 111 retrieves information 112*b* descriptive of the candidates for the target server and their respective addresses and sends it back to the distribution processor 112. With the information 112*b*, the distribution processor 112 determines where to send the request.

The search key described above is a simple character string as part of the request message, however, it may be further combined with the name of the requesting user terminal or extracted from other data related to the network user or from the service names.

As such, the search key is extracted from each request message that comes from a user when establishing connection or starting a transaction. Which part to be extracted depends on what type of communication protocol is used and/or what is to be distributed. The following description will provide more details about this issue.

When the request is a connection request and the communication protocol is based on the Fujitsu network architecture (FNA), the search key will be composed of a destination address of the request (or service name) and the name of a requesting user. In detail, it can take either of the following combinations: logical service name and terminal name (or terminal group name); logical service name, terminal name, and system address that the terminal belongs to; or logical service name, terminal name, and any data in user data field.

When the request is a connection request and the protocol conforms to the open system interconnection (OSI) reference model, the search key will be composed of a destination and source addresses. The former is the transport service access point (TSAP) address, which is provided by the transport layer in the OSI model. The latter is the network service access point (NSAP) address, which is provided by the network layer in the OSI model.

When the request is a connection request and the protocol used is the TCP/IP protocol, the search key will be composed of a port number on a communication controller established by a client and the name of a requesting network user.

When the request is a transaction request, a service name of the requested transaction and contents of a message initiating the transaction will be extracted as a search key.

Further, the search key may be assembled with some further data associated with access types (i.e., exclusive, shared, inquiry, update, etc.). The use of this kind of enhanced search keys will improve the system performance and reduce the workload in database access.

In the above-described search key assembling, the necessary information may not be always at hand. This problem will happen when the search key demands some higher level information that is not contained in the connection request to the server. That is, the necessary information is only available in somewhere above the transport layer. In such a case, the distribution processor cannot respond immediately to the user's request for the transport connection, because it is unable to determine where to deliver the request. Accordingly, it cannot follow the usual procedure that the terminal and server first establish a transport connection and then proceed to upper-layer communications. The present invention will solve this problem in the following manner.

Figure 18:
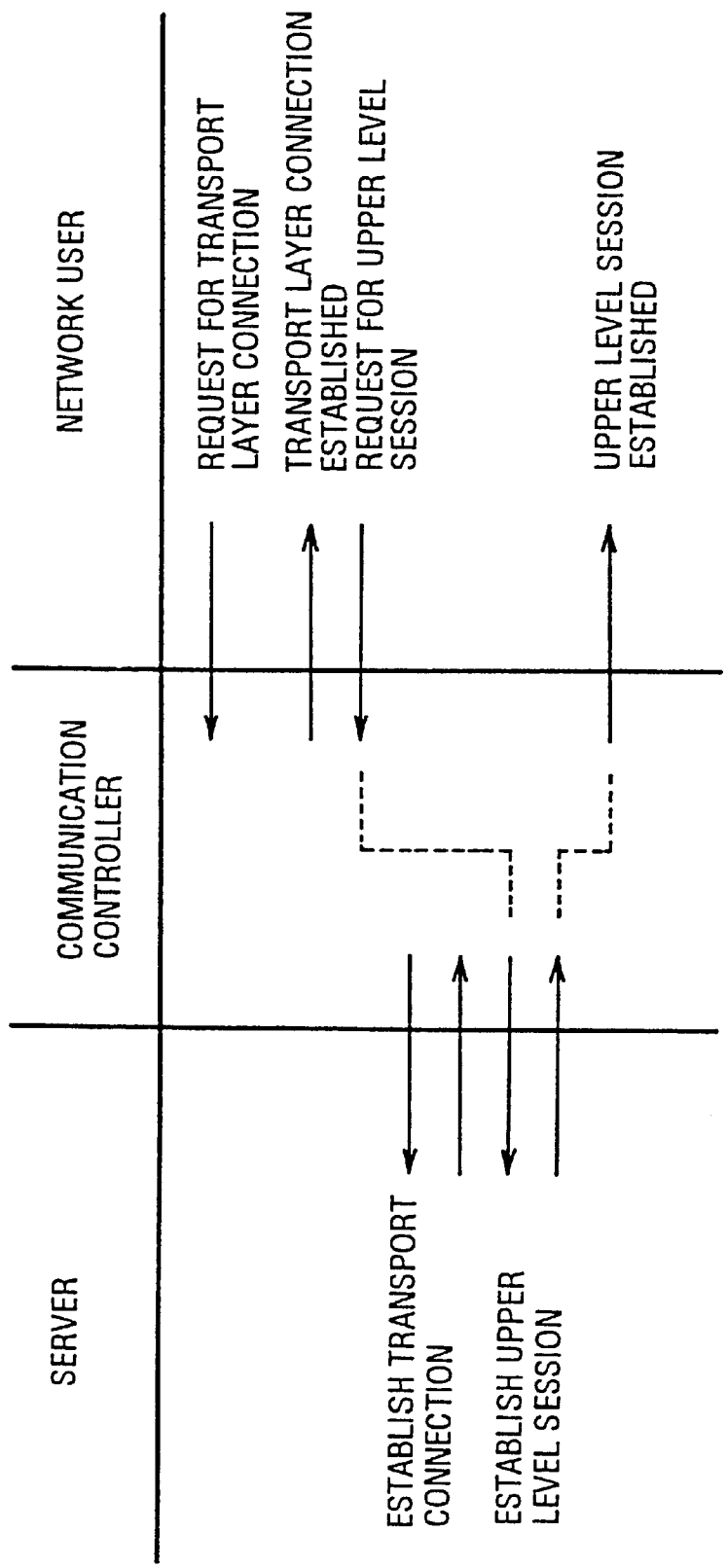
FIG. 18 is a diagram showing a connection establishment procedure performed with a key obtained from an upper layer request message.

FIG. 18 shows a connection establishment procedure using a search key obtained from upper-layer information.

First, a transport connection request is submitted from a user terminal. The communication controller establishes the requested transport connection with the user terminal, however, it suspends the further connection to a server. Subsequently to the transport connection, the user terminal tries to make an upper-layer connection by sending a second request to the communication controller. The communication controller extracts key information from the second request and thereby determines the target server. Now that the target server is determined, the communication controller sequentially sets up transport and upper-layer connections with the target server. Lastly, the controller establishes an upper-layer connection with the user terminal, thus making the data communication possible between the server and terminal.

As such, by temporarily withholding the transport connection with the target server, the communication controller can select a server to distribute the request based on more detailed information contained in the upper-layer request message. This method will improve the reliability of load distributing operations.

Figure 19:
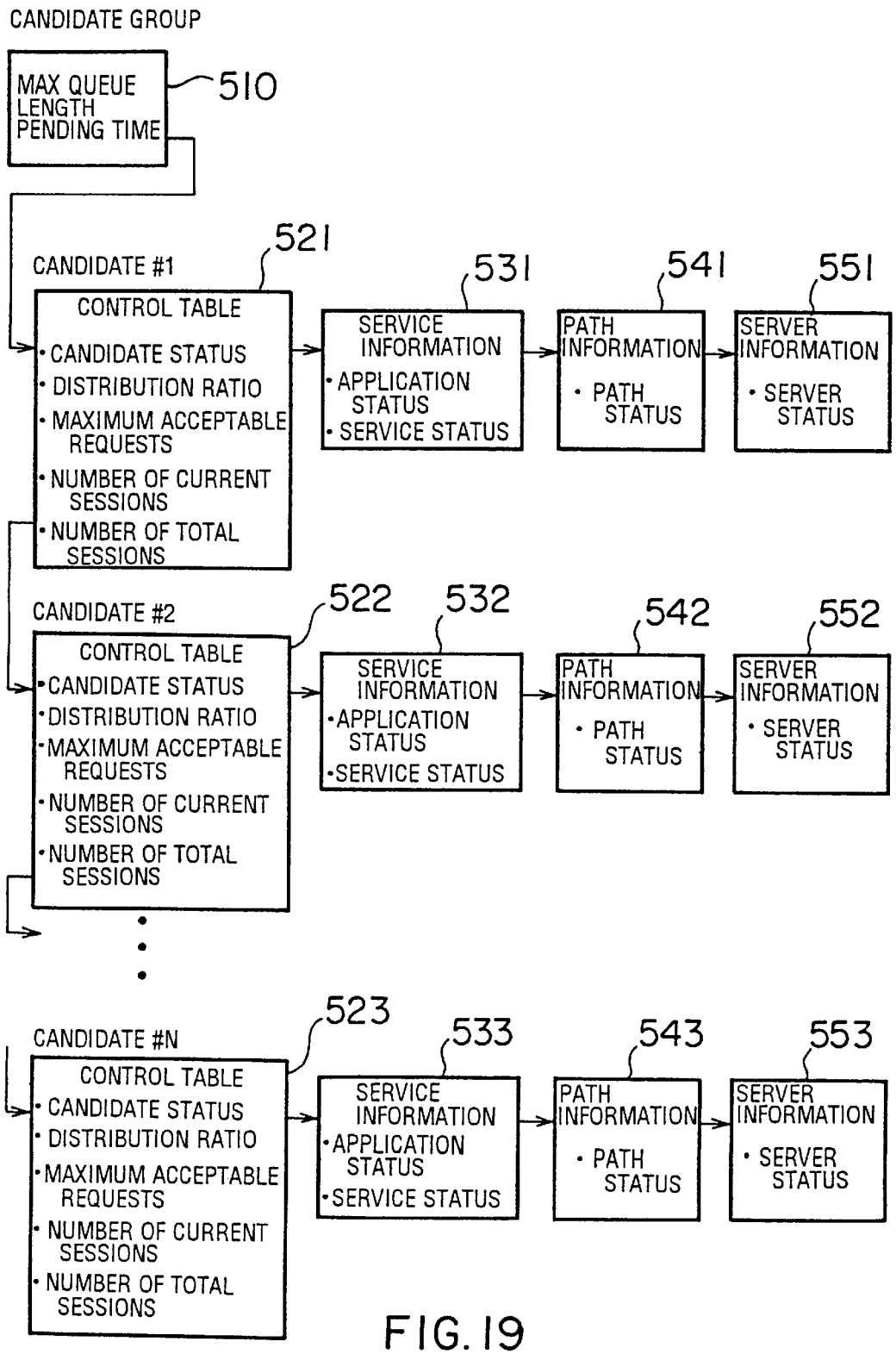
FIG. 19 is a diagram showing linkage among candidate information for selection of a target server.

Next, the details of candidate selection will be described. FIG. 19 shows data linkage among various sets of information about the candidates. The link starts from a candidate group pointer 510 and it reaches a main data table for a candidate #1 521. The link extends from the candidate #1 521 to the next candidate #2 522, and continues up to the final candidate #n 523. All those candidate data have their respective branch links that provide some classified information including service information 531–533, path information 541–543, and server information 551–553.

To determine the target server, the communication controller searches the candidate information link shown in FIG. 19 to select one of the candidates that satisfies all the following conditions:

(1) Candidate status in the main data table of each candidate is not indicating a "disabled (stopped)" state.

(2) The number of current sessions has not yet reached the maximum acceptable sessions.

(3) Path status in the path information is not indicating a "disabled (stopped)" state.

(4) Service status in the service information is not indicating a "disabled (stopped)" state.

(5) Application status in the service information is not indicating an "inactive" state.

The candidate information link of FIG. 19 has status flags in every classified information branch. These status flags show whether each entity is "disabled" or not or whether each application is "active" or "inactive," for example. In the present invention, the status flags are prepared for any class of allocatable resources such as service, path, and server, allowing the communication controller to disable the allocation to the corresponding resources. For instance, the controller can temporarily disable a particular service or can totally disable allocation of a server as a whole.

The following description will now explain the method of determining the target server. From among the nominated candidates, the communication controller will select a server exhibiting the smallest value for the following factor:

$$\{(TCn+1)/Rn\} \times 100 \tag{1}$$

where TCn is the number of sessions currently assigned to the n-th candidate server and Rn is a distribution ratio (%) predefined for the n-th candidate server.

When two or more candidates have the same value for the expression (1), they will be further discriminated under the following criteria. First, when the user request is a connection request, the distribution processor selects a candidate server linked next to the server that was selected in the last connection. Second, when the user request is a transaction request, the controller investigates the number of past transactions assigned to each candidate server and then selects a server that shows the least achievement. This algorithm allows all the servers to receive service requests even when the incoming session and transaction requests are fewer than the candidate servers and the system is operating in a specific mode that repeats frequent session establishment and termination.

An exceptional load sharing algorithm may be required when a plurality of sessions are set up at a time between the same combination of a client and server (or an application running on a server). In this case, the distribution processor will not follow the above-described rules but assign all new sessions to the same server that received the first request. Selection of that special combination may be implemented in a communication protocol or simply given by some prior definitions. This exceptional operation will serve well for a client who submits a set of closely-related services that must be processed at the same time.

The distribution processor may hold transaction requests when no candidate server is found at that moment. More specifically, when it has failed to find candidates, or when there are some candidates but their current loads have reached their respective allowable limits, new transaction requests will be held for a predetermined wait time. It is possible to set a different wait time for each transaction, but there is a limitation for the number of transactions that can be held by the distribution processor.

The above function enables the load sharing system to prevent overloads from happening when a large number of transaction requests rushed into the servers within a short time period. It also saves the system from failing to accept transaction requests when switching the system configuration in a hot standby scheme to be described later on.

The following will now describe about techniques for efficient load sharing across the servers by adaptively modifying the operation mode of the system, which is mentioned before as the fourth feature of the present invention. This feature requires definitions of various operating conditions to be entered into the distribution processor 112 shown in FIG. 2. A set of distribution control conditions that dominate load distribution to the server applications will form a condition group, and a plurality of condition groups will form a distribution definition list, where all the possible patterns of load distribution are collected for easy management by the communication controller.

Each condition group has a flag named as "activity state." The distribution processor 112 controls the pattern of load distribution by setting this parameter. More specifically, when selecting a particular condition group for executing a certain service, the distribution processor 112 sets an activity state flag relevant to that condition group to "ACTIVE" and resets those for the non-selected condition groups related to the same service to "INACTIVE." Selection of a particular condition group means selection of a particular operation mode of the system.

Figure 20:
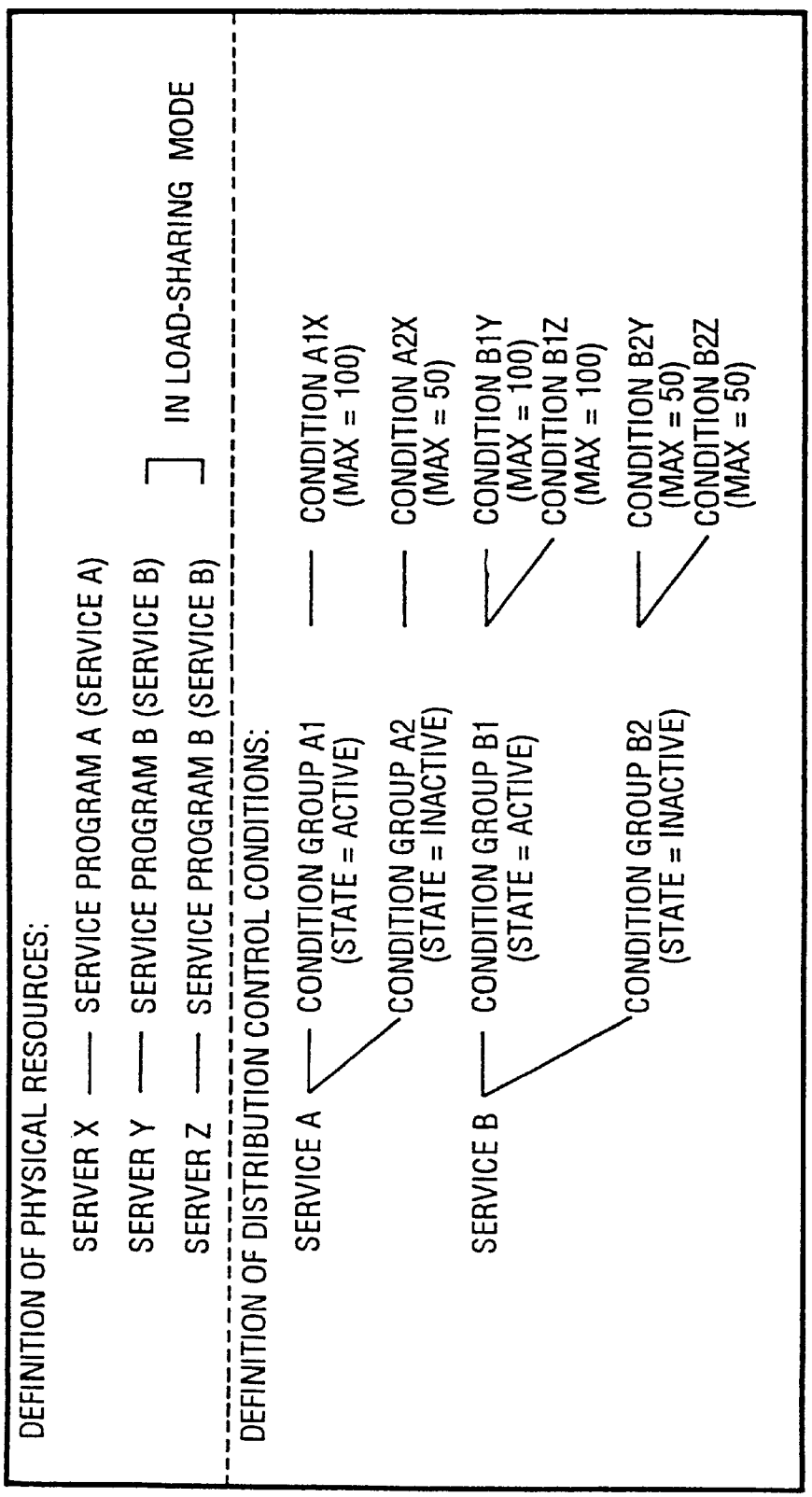
FIG. 20 is a diagram exemplifying distribution definitions to be entered to a distribution processor.

FIG. 20 shows an example definition of distribution control conditions to be entered to the distribution processor 112. In this example, a list of physical resources is first defined, where the servers 10, 20, and 30 are named as "SERVER X," "SERVER Y," and "SERVER Z," and the applications 11, 21, and 31 running on these servers are named as "SERVICE PROGRAM A (SERVICE A)," "SERVICE PROGRAM B (SERVICE B)," and "SERVICE PROGRAM B (SERVICE B)," respectively. The servers 20 and 30 provide the same "SERVICE B," working in a load-sharing mode.

In the definition of distribution control conditions, the upper half defines the conditions for "SERVICE A" including two alternative condition groups A1 and A2, whose activity status ("STATE=") are currently set to "ACTIVE" and "INACTIVE" states, respectively. The condition group A1 includes a primitive condition A1X prescribing the maximum number of requests "MAX=100," which means that the "SERVER X" can accept up to 100 service requests distributed from the communication controller. Similarly, the condition group A2 includes a primitive condition A2X prescribing "MAX=50." The lower half defines the conditions for "SERVICE B" including two alternative condition groups B1 and B2, which are currently set to "ACTIVE" and "INACTIVE" states, respectively. The condition group B1 includes two primitive conditions B1Y and B1Z both prescribing "MAX=100," while the other condition group B2 includes two primitive conditions B2Y and B2Z both prescribing "MAX 50."

An alphabetic character affixed to the end of each primitive condition identifies the server that shares workload for the service, and the number "MAX" shows the maximum capacity of that server to accept the requests.

The distribution processor 112 determines the destination of each request (i.e., the target server) according to the primitive conditions that belong to the active condition group. The operation mode of the system can be changed over by first deactivating the active condition group and then activating another condition group suitable for the new operation mode.

Figure 21:
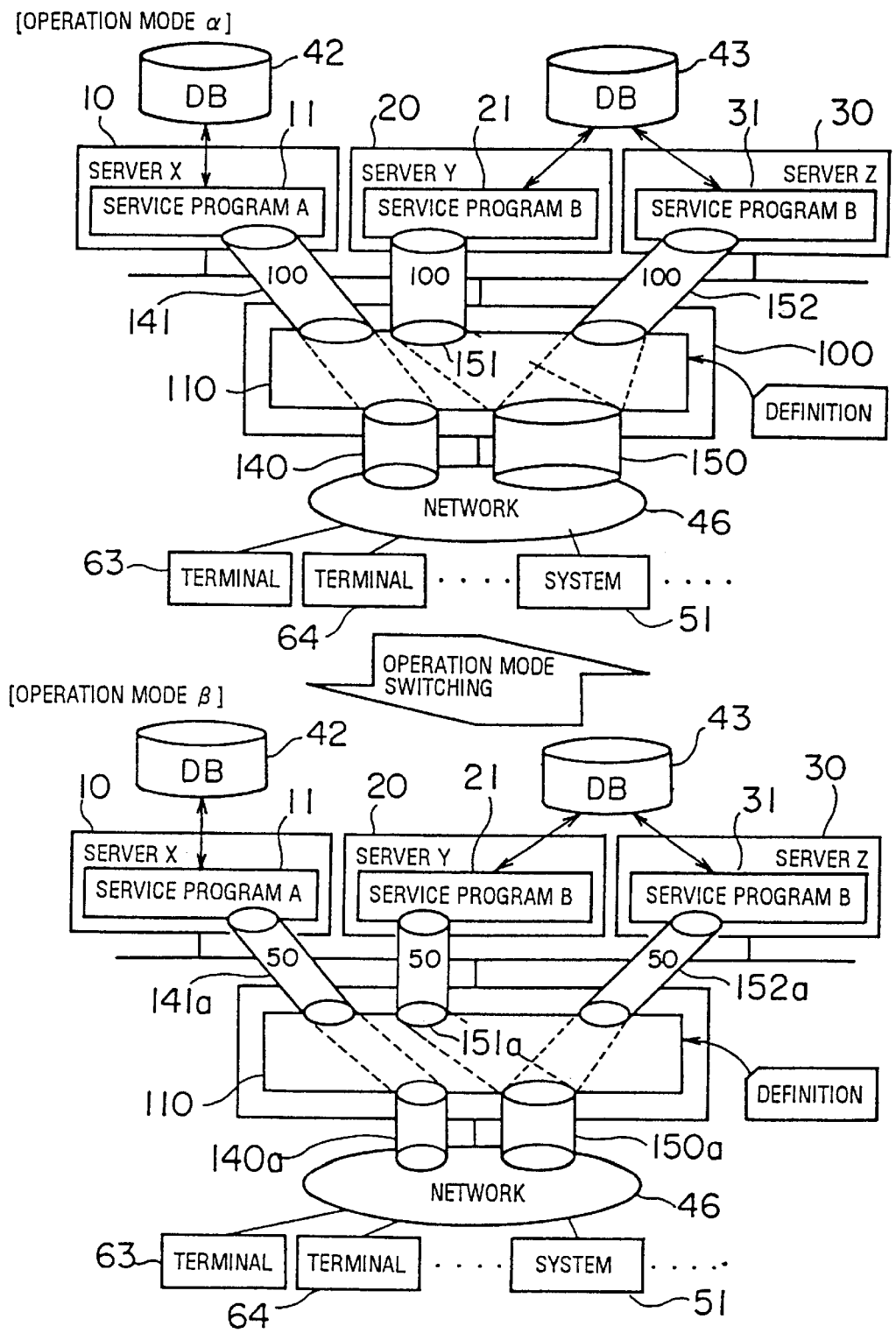
FIG. 21 is a diagram showing how to change the operation mode of the system by using the distribution definitions shown in FIG. 20.

FIG. 21 shows how to change the operation mode using the distribution definition list shown in FIG. 20. It should be noted here that the servers 10, 20, and 30 and applications 11, 21, and 31 are now renamed according to the definitions in the list, thus having more specific labels that are different from those having been used so far. This kind of renaming will also happen in some later sections to explain about methods of changing the operation mode, as will be seen in FIGS. 24, 26, 28, 30, and 34.

The upper half of FIG. 21 shows an operation mode in which the condition groups A1 and B1 are activated. In this mode, "SERVICE A" requests 140 submitted from terminals 63, 64, and the like are all delivered to the server 10 as service requests 141, whose maximum capacity is 100. On the other hand, "SERVICE B" requests 150 are distributed to the servers 20 and 30 as service requests 151 and 152, where each server can accept 100 requests at maximum.

By activating the condition groups A2 and B2 (and deactivating A1 and B1), the operation mode of this system will change to another one as shown in the lower half of FIG. 21. In this new mode, "SERVICE A" requests 140a are sent to the server 10 as service requests 141a, but the capacity of this path is now reduced to 50 requests at most. "SERVICE B" requests 150a are distributed to the servers 20 and 30 as service requests 151a and 152a, whose maximum capacity is also cut down to 50 requests for each.

In the above method, the operation mode is changed by setting the activity state flags of each condition group to "ACTIVE" or "INACTIVE," however, there will be another method to obtain the same effect in a simpler way. This method predefines association between the activity state of each condition group and the operation mode of the load sharing system.

Figure 22:
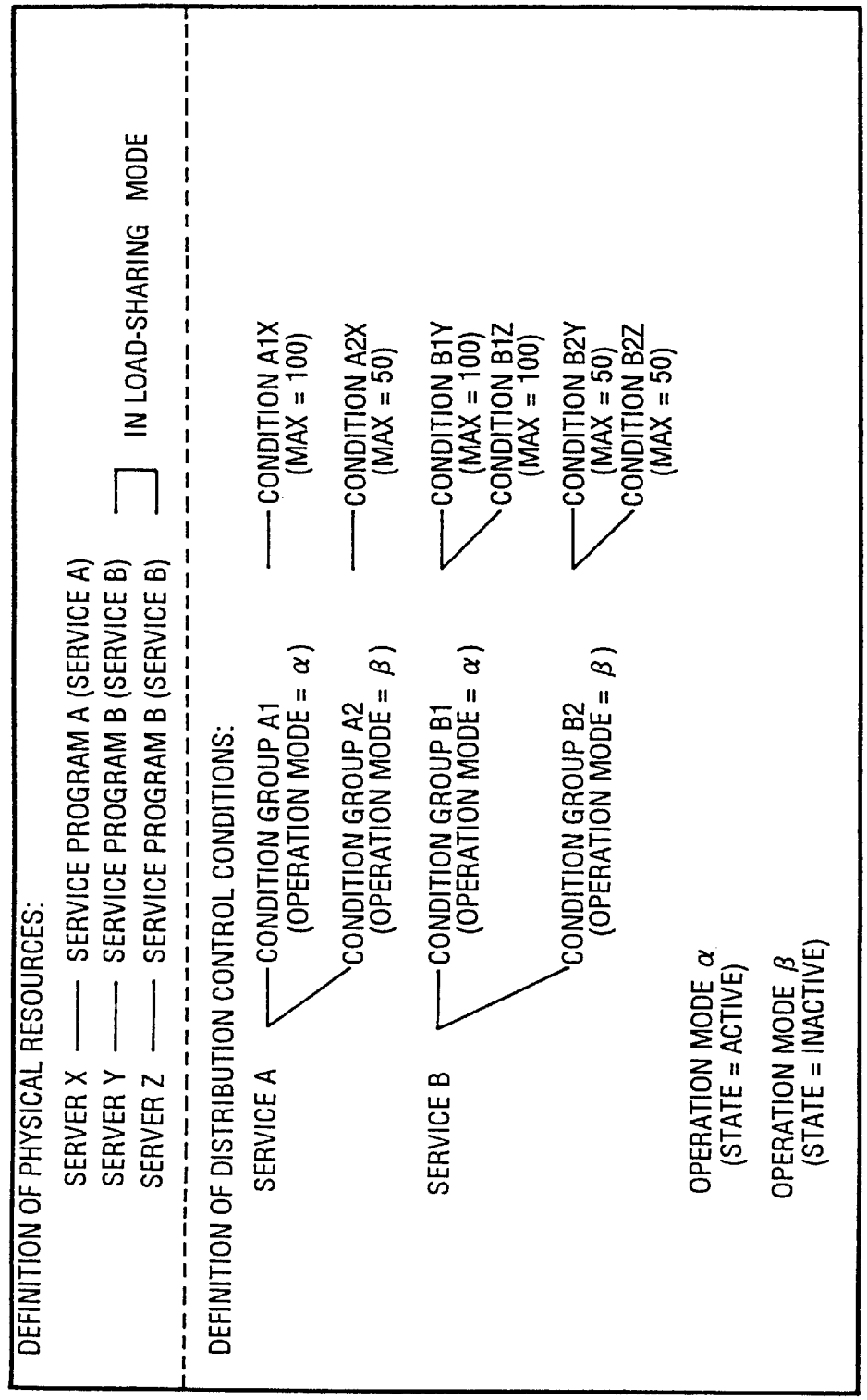
FIG. 22 is a diagram exemplifying distribution definitions in which distribution control conditions are associated with operation modes of the system.

FIG. 22 illustrates a distribution definition list prepared for this method. Since the definitions shown in this example list are similar to those in FIG. 20, the following description will focus on the distinctive points only.

Recall that each condition group in FIG. 20 had a definition of its activity state. In contrast to this, the condition groups in FIG. 22 have parameters to specify the operation mode associated therewith. Specifically, the condition groups A1 and B1 are associated with a first operation mode $\alpha$, while the condition groups A2 and B2 are associated with a second operation mode $\beta$. The distribution definition list of FIG. 22 has some additional definitions, i.e., activity state definitions for respective operation modes. FIG. 22 shows that the current operation mode $\alpha$ is active and the operation mode $\beta$ is inactive.

The distribution processor 112 controls the operation mode of the system by alternating only two activity state definitions, instead of changing the activity state flags for all the four condition groups. As such, this method enables simplified mode control in comparison with the former method.

The following will present yet another method in which a new parameter is added to each condition group to specify network users, or a particular user group, as part of the distribution control conditions. For this user specification, it will be possible to designate a terminal name of a specific network user, a wild card character, or a user group name assigned to a group of terminals. A wild card character "*" specifies "all users," implying that no user qualification is to be applied. Optionally, a keyword may be used to qualify the user requests. When a keyword is designated as part of the user specifications, the corresponding condition groups will be applied only to the requests having the designated keyword.

Figure 23:
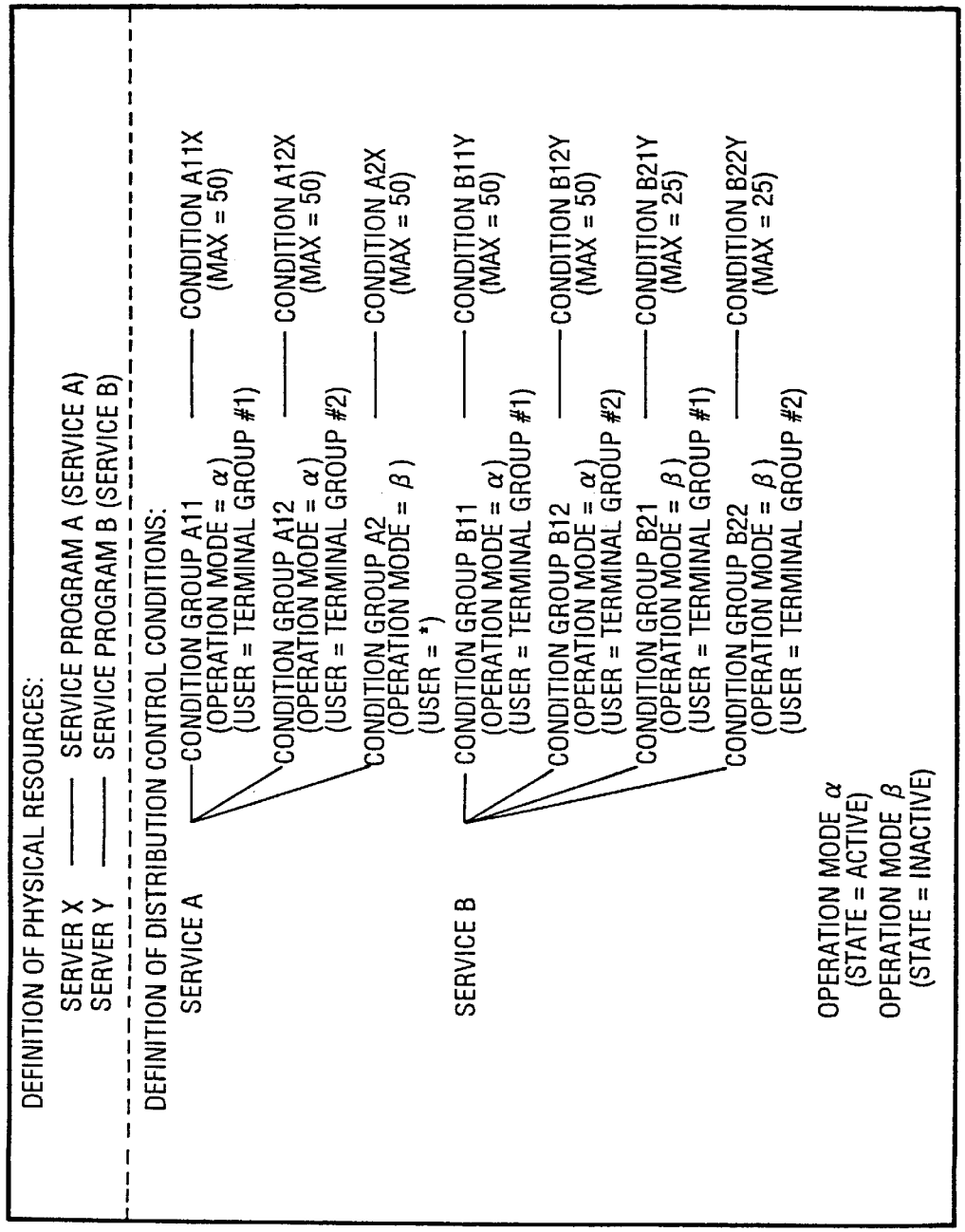
FIG. 23 is a diagram showing distribution definitions with user group specifications.

FIG. 23 shows an example of a distribution definition list with such user specifications. For simplicity, the list in FIG. 23 has definitions for only two servers.

In the definition of physical resources, the servers 10 and 20 are defined as "SERVER X" and "SERVER Y" serving as platforms for the applications 11 and 21, which are now defined as "SERVICE PROGRAM A" and "SERVICE PROGRAM B," respectively.

In the definition of distribution control conditions, the upper half defines the conditions for "SERVICE A" including three alternative condition groups A11, A12 and A2. The condition group A11, accompanied by two parameter definitions "OPERATION MODE" and "USER" that respectively specify the operation mode $\alpha$ and a terminal group #1, has a primitive condition A11X prescribing the maximum number of requests "MAX=50." It also Likewise, the condition group A12, applicable to the operation mode $\alpha$ and a terminal group #2, includes a primitive condition A12X prescribing "MAX=50." The condition group A2 applicable to the operation mode $\beta$ includes a primitive condition A2X prescribing "MAX=50," however, it does not discriminate specific users or terminals from others.

The lower half of the list defines the conditions for "SERVICE B" including four condition groups B11, B12, B21, and B22. The condition group B11, applicable to the operation mode $\alpha$ and a terminal group #1, includes a primitive condition B11Y with a limitation "MAX=50." Likewise, the condition group B12, applicable to the operation mode $\alpha$ and the terminal group #2, has a primitive condition B12Y with a limitation "MAX=50." The condition group B21, applicable to the operation mode $\beta$ and the terminal group #1, includes a primitive condition B21Y with a limitation "MAX=25," while the condition group B22, applicable to the operation mode $\beta$ and the terminal group #2, has a primitive condition B22Y with a limitation "MAX=25."

At the bottom of the list, it is stated that the operation mode $\alpha$ is active, while the operation mode $\beta$ is inactive.

The distribution processor 112 determines the destination of each user request by comparing user information and other items contained in the request with the activated distribution control conditions. By alternating the activity state definitions for the predefined operation modes, the distribution processor 112 can control the operation mode of the system.

Figure 24:
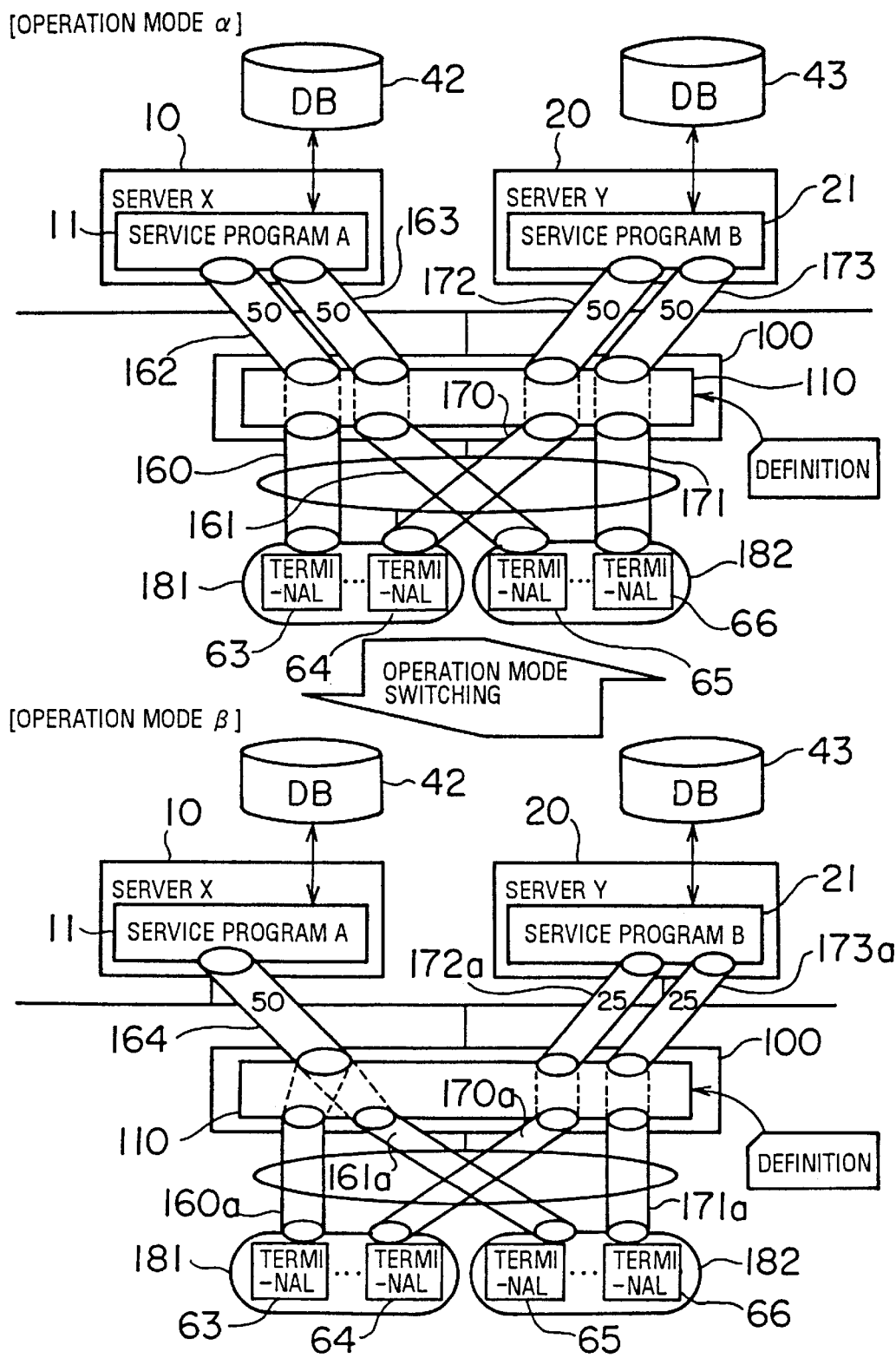
FIG. 24 is a diagram showing how to change the operation mode by using the distribution definitions with user group specifications.

FIG. 24 illustrates how to change the operation mode by using the above-described distribution definitions with user group specifications. Two terminal groups are shown in FIG. 24; a first terminal group 181 includes terminals 63 and 64, and a second terminal group 182 includes terminals 65 and 66.

When the load sharing system is operating in the mode α, "SERVICE A" requests 160 submitted from the first terminal group 181 are all delivered to the server 10 as service requests 162 with the maximum capacity of 50 requests. Similarly, "SERVICE B" requests 170 are all directed to the server 20 as service requests 172, where the server 20 accepts up to 50 requests. "SERVICE A" requests 161 submitted from the second terminal group 182 are all delivered to the server 10 as service requests 163 with the maximum capacity of 50 requests. "SERVICE B" requests 171 are all directed to the server 20 as service requests 173, where the server 20 accepts up to 50 requests.

Upon switching the operation mode to the mode β, "SERVICE A" requests 160a from the first terminal group 181 and "SERVICE A" requests 161a from the second terminal group 182 are sent to the server 10 as service requests 164 without regarding which terminal group has issued those requests. Note here that the capacity for the "SERVICE A" requests from both terminal groups are now only 50 in total. On the other hand, "SERVICE B" requests 170a from the first terminal group 181 are directed to the servers 20 as service requests 172a with a new limitation of 25 requests at maximum. Further "SERVICE B" requests 171a from the second terminal group 182 are sent to the servers 20 as service requests 173a having a separate account up to 25 requests.

Frequencies of service requests may sometimes be biased depending on the location of users. According to the load sharing system explained in the above example, the operation mode definition includes the parameters for user specification, and thus the operation mode can be selected so as to suit itself to such location-dependent service requests.

Next, the following description will explain about dynamic switching of the distribution control conditions according to the actual workload in each server, which was once mentioned as the fifth feature of the present invention. This function can be implemented in the operation manager 113, so that it will control the operation mode depending upon the status information managed by the state manager 111. The distribution control conditions will have a parameter to define the activity of each application. This parameter will be set to an "ACTIVE" state when the application can accept user requests and reset to an "INACTIVE" state when it cannot.

Figure 25:
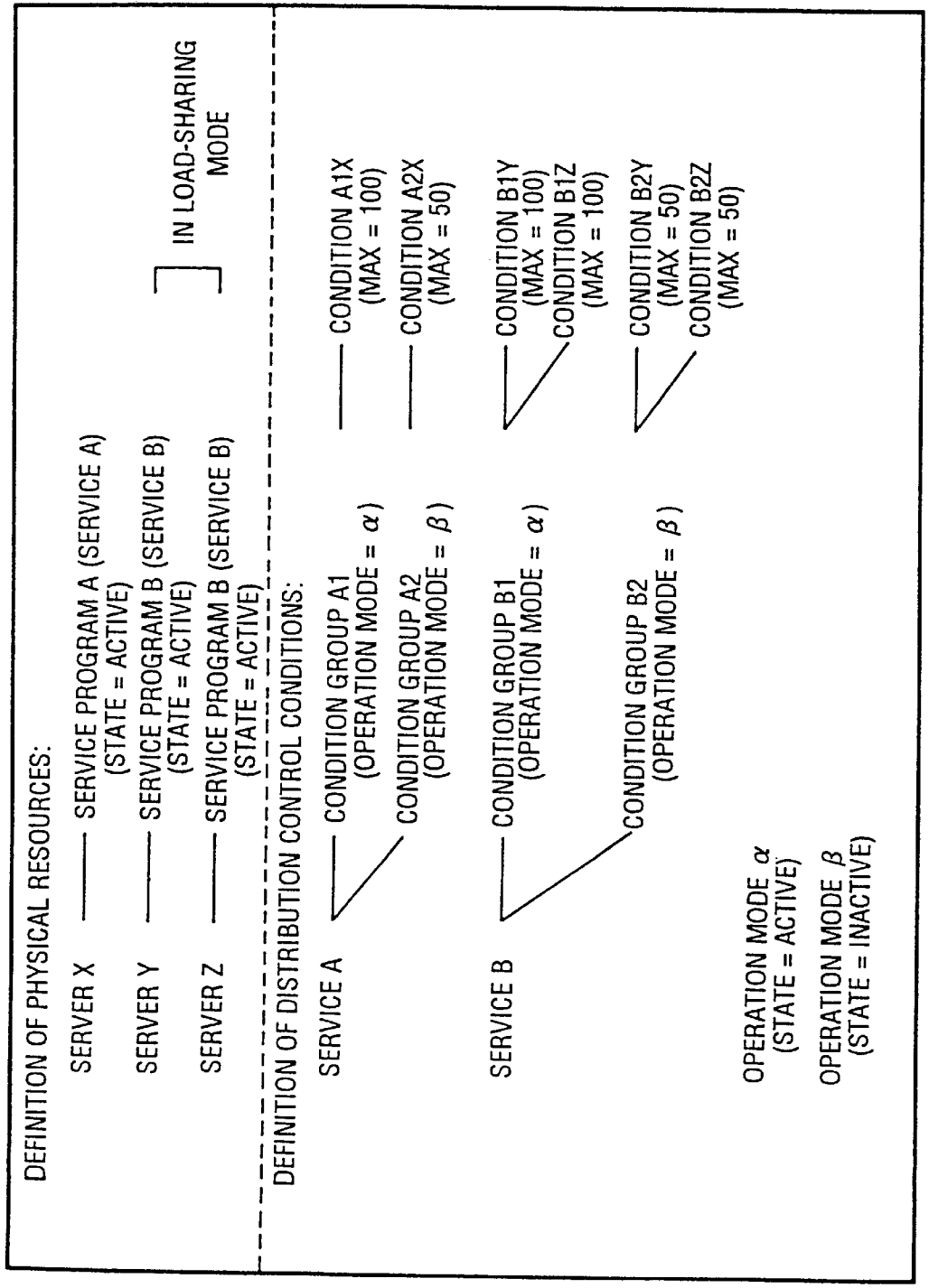
FIG. 25 is a diagram showing distribution definitions with application status specifications.

FIG. 25 shows an example of a distribution definition list with such application activity specifications. In the definition of physical resources, three servers 10, 20, and 30 are named as "SERVER X," "SERVER Y," and "SERVER Z," and the applications 11, 21, and 31 running on these servers are defined as "SERVICE PROGRAM A (SERVICE A)," "SERVICE PROGRAM B (SERVICE B)," and "SERVICE PROGRAM B (SERVICE B)," respectively. The applications 11, 21, and 31 have their respective activity state flags, which are all set to "ACTIVE" in FIG. 25. The detailed definition of distribution control conditions are identical with the example shown in FIG. 22.

When a trouble happened in an application running in one of the servers working in a load-sharing mode, the state management agent employed in the server would inform the state manager 111 of the trouble in the application. In response to this information, the state manager 111 disables the application by resetting the activity parameter to "INACTIVE."

Figure 26:
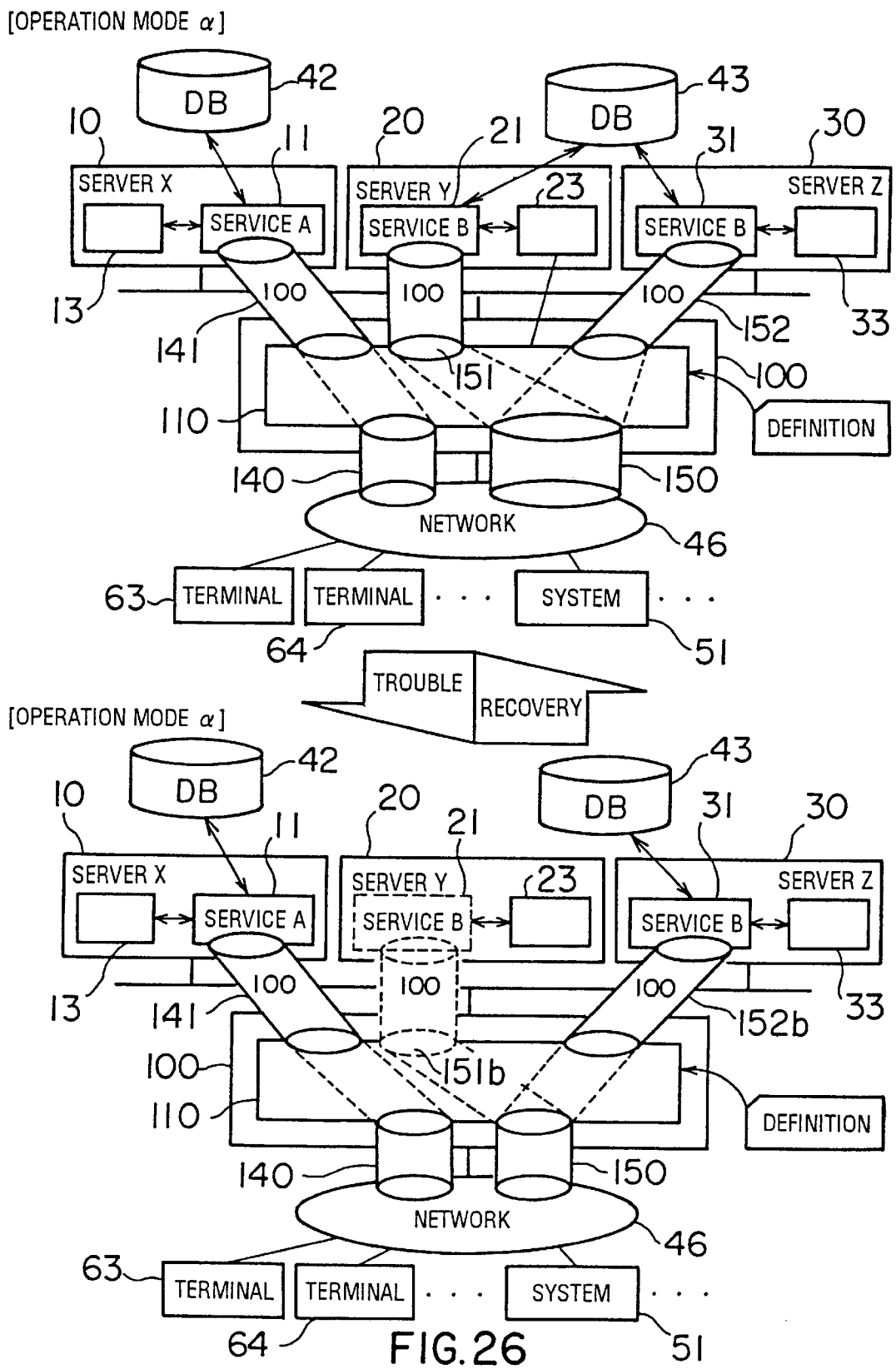
FIG. 26 is a diagram illustrating how the system will deal with a trouble in the load sharing mode.

FIG. 26 illustrates how the system will deal with such a trouble in the load sharing mode. The upper part of FIG. 26 represents a normal situation before trouble happens, which is identical with the one shown in the upper half of FIG. 21 except for the presence of state management agents 13, 23, and 33, which are explicitly shown in FIG. 26 as part of the servers 10, 20, and 30. Assume here that the server 20 has failed due to some trouble. Then the state management agent 23 disposed in the server 20 will send a message to the state manager 111 in the communication controller 100 to report that the application 21 is no longer operational. The state manager 111 resets the corresponding activity state flag to "INACTIVE," thus inhibiting further user requests for "SERVICE B" from being distributed to the application 21.

In the lower half of FIG. 26 showing the situation after the trouble, all the "SERVICE B" requests 150 are transferred to the server 30 as service requests 152b. If the application 21 in the server 20 regains its functionality after some efforts of maintenance, the state management agent 23 will inform to the state manager 111 of recovery of the application 21. The state manager 111 sets the activity state flag of th application 21 to "ACTIVE" again, thus restarting distribution of the requests thereto.

As described above, the distribution definitions in the present load sharing system have an activity state flag for each application to allow the distribution processor 112 to determine the destination of each request from among the "ACTIVE" applications, thus enabling the system to operate without interruption during maintenance of applications.

Next, the system's behavior in case of a server trouble will be described below.

The following will now present a method to continue the system operation even when one of the servers has failed. For this fault-tolerant function, each server definition will have a control parameter to make it "ACTIVE" or "INACTIVE" in accordance with the actual state of each server.

Figure 27:
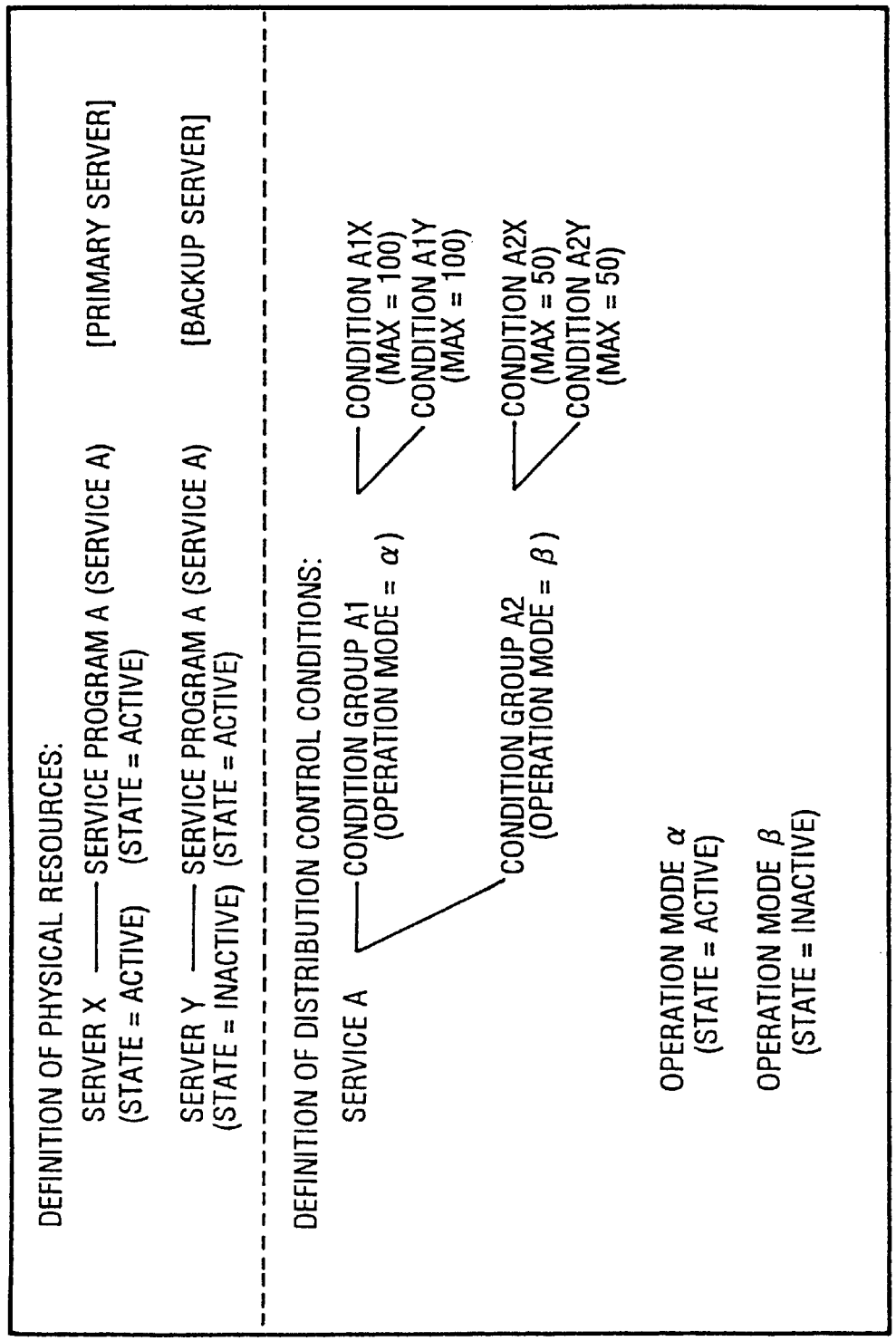
FIG. 27 is a diagram showing distribution definitions which allows a hot-standby function.

FIG. 27 shows the distribution definition which allows a hot-standby function. According to this example definition, two servers 20 and 30, having a shared database, are configured so that the former will work as a primary server and the latter will play a roll as a backup server. In the definition of physical resources, those two servers are defined as "SERVER X" and "SERVER Y," and their respective applications 21 and 31 have the same "SERVICE A" definition.

In the definition of distribution control conditions, the condition for "SERVICE A" consists of two condition groups Al and A2 for operation modes α and β.

The condition group Al includes two primitive conditions, A1X prescribing "MAX=100" and A1Y prescribing "MAX=100." Similarly, the condition group A2 includes two primitive conditions, A2X prescribing "MAX=50" and A2Y prescribing "MAX=50." The operating mode α is now activated, while the other mode β stays inactive.

Figure 28:
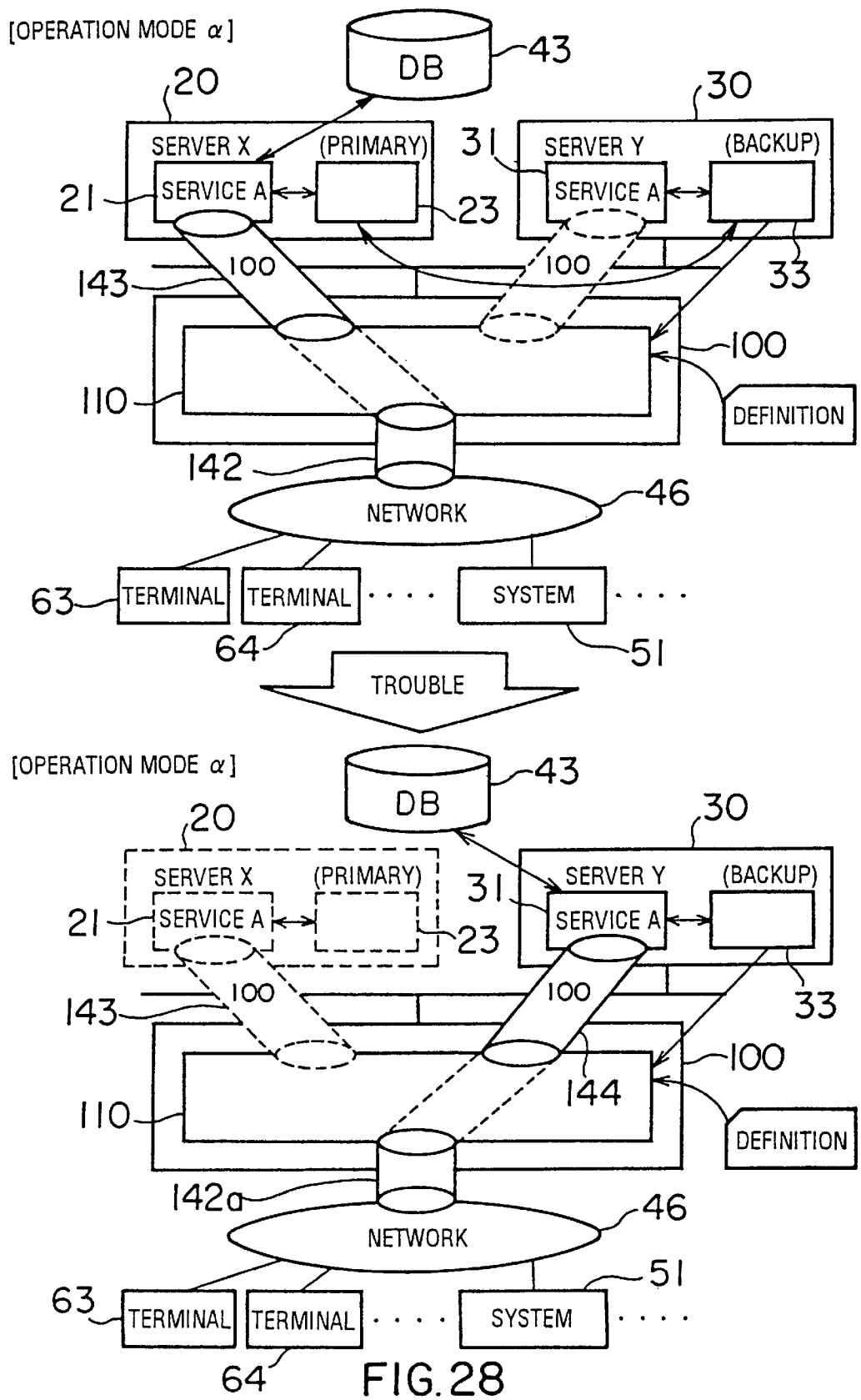
FIG. 28 is a diagram showing how a backup server takes over the failed server.

FIG. 28 shows how this hot-standby system will work. The upper half of FIG. 28 shows a normal situation where two servers 20 and 30 are running without problem. At this stage, the communication controller 100 receives user requests 142 from the terminals 63 and 64 as well as from the system 51, and assigns them to the primary server 20 as service request 143. The state management agents 23 and 33 in the two servers periodically exchange messages for monitoring each other. Therefore, a failure in one server will be detected by the state management agent in the other server.

In the event of failure in the primary server 20, the state management agent 33 in the backup server 30 will learn that failure from the absence of messages from the server 20. The state management agent 33 then reports the fact to the communication controller 100 over the connection path to the state manager 111. Upon arrival of this report at the state manager 111, the operation manager 113 will clear the activity control parameter for the server 20 to "INACTIVE" state and then set the same for the server 30 to "ACTIVE" state, thereby activating the backup server 30 for working as a new primary server. The user request from the terminals 63, 64, etc. are now directed to the server 30 as service requests 144.

In the way described above, the load sharing system with a hot standby scheme can seamlessly switch its operations to the backup unit by promptly manipulating the activity control parameters for the servers involved.

The following description will discuss about some other factors to determine the destinations of user requests. As already described in some earlier explanations, the maximum number of requests, MAX, indicates how many requests the destination entity can accept. In other words, the parameter MAX means a capacity of the destination entity and it provides an upper limit for the distribution operation of user requests to that entity. There is another factor that affects the distribution operation. In the case that a plurality of servers are sharing workload for a certain service by separately executing the same application, the new factor determines how much load will be imposed on each server. Since it gives not an absolute value but only a relative index, this factor is called a "relative loading factor." For example, when two servers have their respective relative loading factors of 3 and 1, the received user requests will be distributed to them at the ratio of 3:1.

The above-described two factors, i.e., the maximum number of requests and relative loading factors, are used to determine the target servers to process incoming user requests. Besides being defined in advance, they can be modified even in the middle of operations without doing any harm to the users. The distribution processor 112 can maintain an optimum load distribution by dynamically changing those two factors.

Figure 29:
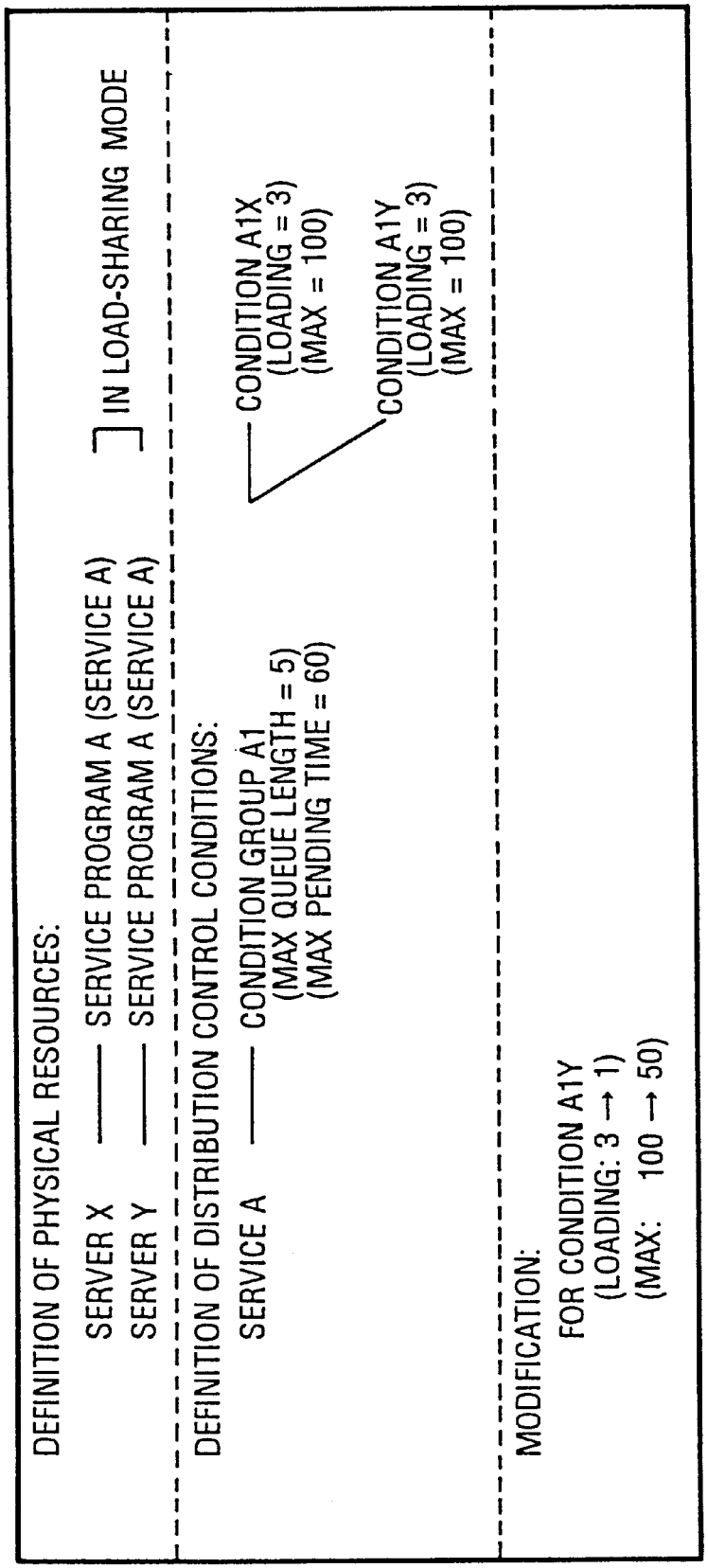
FIG. 29 is a diagram exemplifying distribution definitions which enables dynamic control of load distribution ratios.

FIG. 29 exemplifies a distribution definition list which enables dynamic control of load distribution ratios. In the definition of physical resources of this example, the servers 20 and 30 are defined as "SERVER X" and "SERVER Y" and the applications 21 and 31 on these servers are both devoted to "SERVICE A." Thus the two servers 20 and 30 run in a load-sharing mode.

The distribution definition contains a condition group A1 defined for managing "SERVICE A" requests, which includes two parameter definitions "MAX QUEUE LENGTH=5" and "MAX PENDING TIME=60" to be described later on. The condition group A1 consists of two primitive conditions A1X and A1Y, both having definitions of the above-described relative loading factor expressed as "LOADING=3" and maximum number of requests expressed as "MAX=100."

The distribution definition is followed by a description of modification saying that the relative loading factor (LOADING) of the condition A1Y should be changed from 3 to 1, and the maximum number of requests (MAX) should be reduced from 100 to 50.

Figure 30:
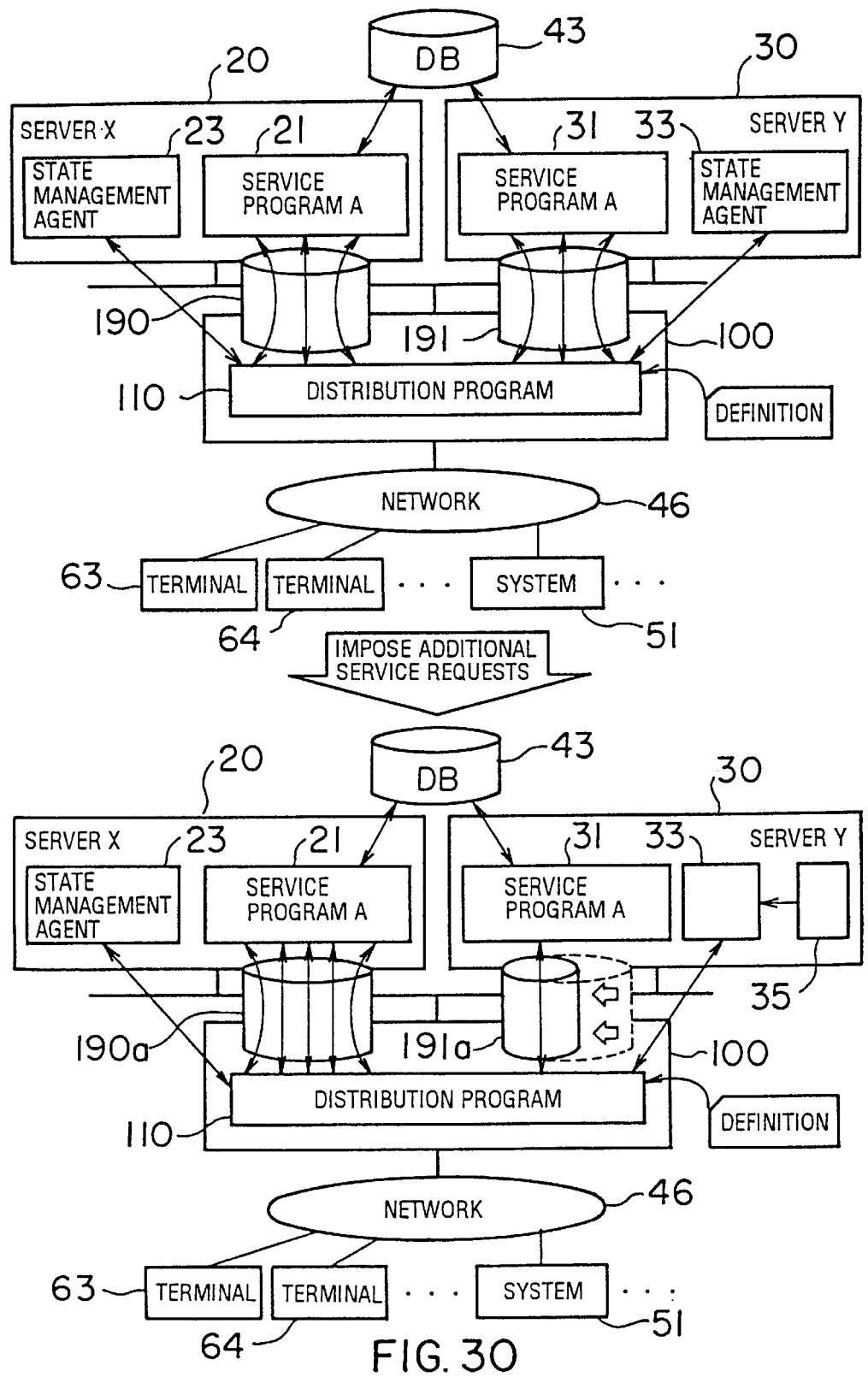
FIG. 30 is a diagram showing how to perform the dynamic control of load distribution ratios.

FIG. 30 shows how the system performs this dynamic control of load distribution ratios. The upper half of FIG. 30 shows the normal operation mode, where user requests are distributed equally (i.e., with the ratio of 3:3) to the two applications 21 and 31 represented as requests 190 and 191. When temporary services 35 are produced inside the server 30, the relative loading factor of the application 31 will be changed from 3 to 1, thus reducing its loading ratio to one third. Two request flows 190a and 191a in the lower half of FIG. 30 illustrates that the user requests directed to the application 31 is now one third of those directed to the application 21.

Returning to FIG. 29, the condition group A1 has two parameters "MAX QUEUE LENGTH" and "MAX PENDING TIME" as mentioned before. When a plurality of servers are sharing workload for a certain service by separately executing the same application, the maximum total number of user requests that the system can accept is calculated by summing up the parameters of maximum acceptable requests for all the servers involved. This number, in other words, is the maximum processing capacity of the load sharing system as a whole. When actual user requests are about to exceed this capacity of the system, the distribution processor 112 will hold new requests in its internal queue until any of the servers regains room to accept them. This queuing function, however, would cause too much consumption of resources in the communication controller or could make user terminals hang up, if it allowed the pending requests to stay in the queue unlimitedly.

To solve these problems, each condition group can specify a maximum request queue length (MAX QUEUE LENGTH) and a maximum pending time (MAX PENDING TIME) for defining the upper limit of queuing of user requests. If the actual queue length exceeds the MAX QUEUE LENGTH or any entries in the queue stay longer than the MAX PENDING TIME, the distribution processor 112 will alert the users to its inability to provide further services due to the overload and will reject their requests.

That concludes the description for various features provided by the load sharing system with multiple servers shown in FIG. 2. The following will now clarify the internal structure of the distribution program 110 in the communication controller 100 and state management agent in each server.

Figure 31:
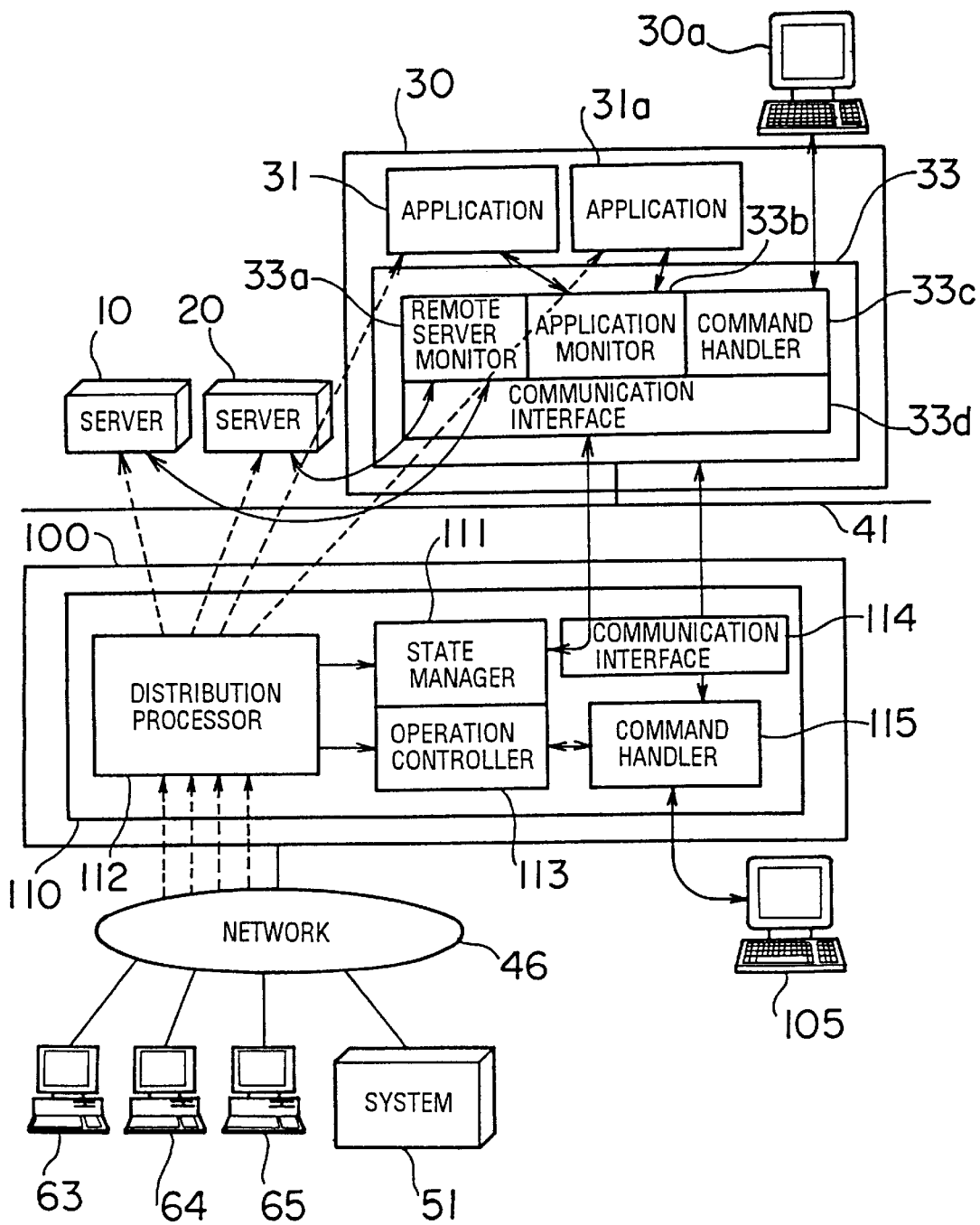
FIG. 31 is a block diagram showing an internal structure of a distribution program and state management agent.

FIG. 31 is a block diagram showing detailed internal structure of the distribution program and state management agent. The state management agent 33 in the server 30 employs a remote server monitor 33a, an application monitor 33b, a command handler 33c, and a communication interface 33d. The remote server monitor 33a communicates with the counterparts located in the other servers 10 and 20 to perform a mutual health checkup. The application monitor 33b watches the activity of applications 31 and 31a. The command handler 33c deals with command inputs from an operation console 30a and submits various internal instructions. The communication interface 33d controls communications over the local area network 41.

In addition to the state manager 111, distribution processor 112, and operation manager 113 shown in FIG. 2, the distribution program 110 employs a communication interface 114 and a command handler 115. The communication interface 114 controls communications over the local area network 41. According to command inputs from an operation console 105, the command handler 115 submits status information requests to the servers. It also sends an instruction to the operation manager 113 to change over the operation mode of the system, in response to inputs via the operation console 105. The operation manager 113 executes the instruction to switch the current operation mode to another one with reference to the aforementioned distribution control conditions.

While the above description has disclosed load sharing systems with a single communication controller, the following description will present some load sharing systems equipped with two communication controllers.

Figure 32:
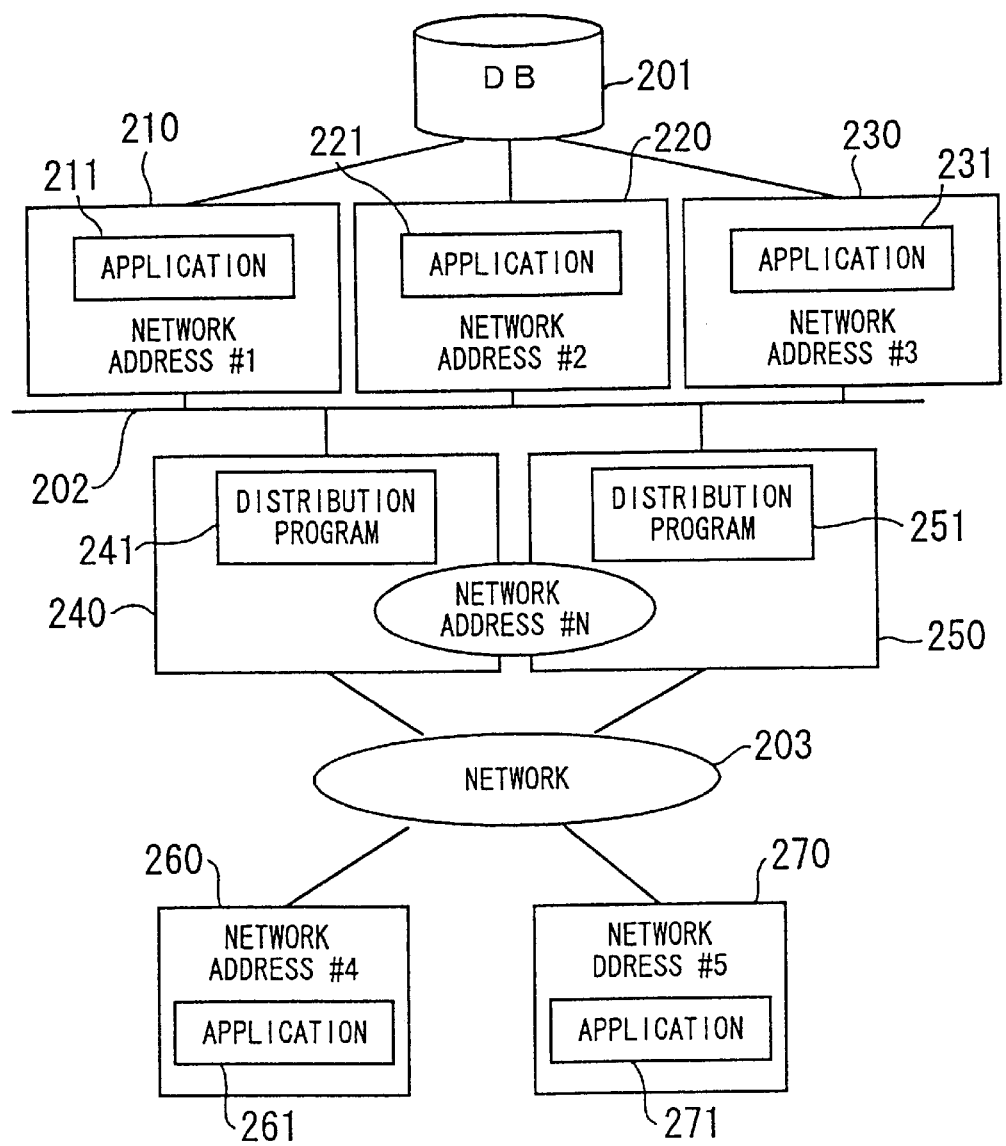
FIG. 32 is a diagram showing a multiple server system including two communication controllers.

FIG. 32 shows a multiple-server load sharing system including two communication controllers. The feature of unified system interface can be also realized in this dual controller configuration. The system is organized by three servers 210, 220, and 230 and two communication controllers 240 and 250, which are interconnected with a local area network 202. The communication controllers 240 and 250 have further connections to remote systems 260 and 270 via another network medium 203.

Applications 211, 221, and 231 to provide the same services are running on the servers 210, 220, and 230, while sharing a common database (DB) 201. The servers 210, 220, and 230 have their individual communication addresses #1–#3, however, the two communication controllers 240 and 250 share a single address #N. The communication controllers 240 and 250 contain distribution programs 241 and 251, respectively. The remote systems 260 and 270 are clients who receive services from the load sharing system, and applications 261 and 271 are running as network entities.

In the above-described system configuration, the application 261 in the remote system 260 will communicate with the applications 211, 221, and 231 in the servers 210, 220, and 230 through a distribution function.

Once an interlayer connection is established between the application 261 with address #4 and the communication controllers with address #N, it is possible to set up a plurality of upper-layer connections over the established lower-layer connection. Since the two controller share the common address #N, those upper-layer connections must be distinguishable from each other by using identifiers that are uniquely assigned to the upper-layer communication resources.

Assume here that the two communication controllers 240 and 250 assigned by ill chance the same identifier "10" to their respective upper-layer connections. This would cause a problem because the remote system 260 is unable to ascertain either connection.

In order to avoid the above problem, the communication controllers 240 and 250 are required to manage the ranges of their respective upper-layer resources not to overlap with each other. Practically, there are three methods to realize this kind of management.

The first method is to predefine the ranges for individual controllers. The communication controllers 240 and 250 only have to manage the resources within their respective ranges defined in advance as being properly separated from each other.

For instance, the protocol data unit definition of transport layer includes a 16-bit reference for every different NSAP address, thus providing connection endpoint identifiers ranging from 1 to 65535. These reference values are divided into, say, four sets, and the communication controllers 240 and 250 take two sets out of the four, while the remaining two sets may be reserved for future use.

The second method is to assign the ranges by program. In this method, a resource management program provide a divided range for each communication controller on demand, thus making a dynamic allocation.

Figure 33:
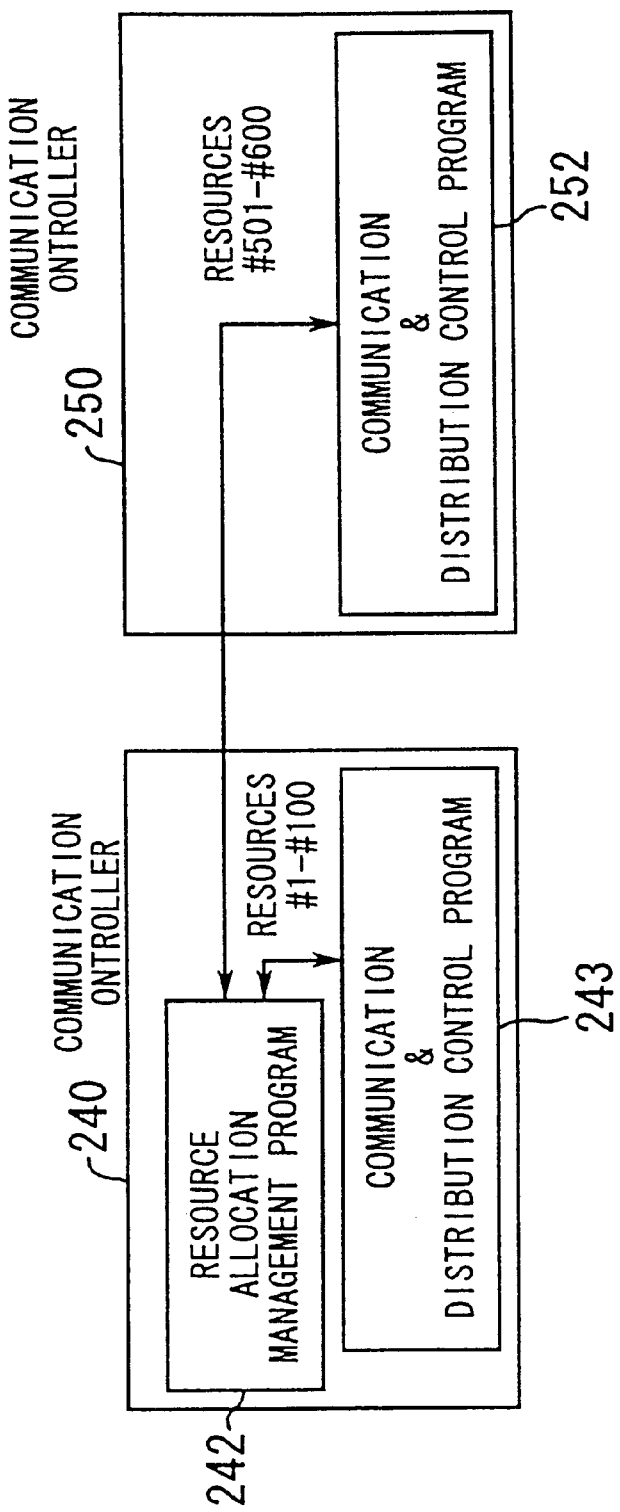
FIG. 33 is a diagram showing how communication resources is distributed by control programs.

FIG. 33 shows this resource allocation scheme. The communication controller 240 has a resource allocation management program 242 and a communication & distribution control program 243, while the communication controller 250 has a communication & distribution control program 252.

When starting up the system or when establishing an upper-layer connection, the communication & distribution control programs 243 and 252 obtain a divided range of resources from the resource allocation management program 242. FIG. 33 shows that resources #1–#100 and #501–#600 are assigned to the communication & distribution control programs 243 and 252, respectively.

The third method is to allocate resources when establishing a connection. In this method, when an upper-layer connection is established, resources are provided by a program for managing upper-layer resources, which is equivalent to the resource allocation management program 242 in FIG. 33.

The allocation management can be realized with one of the above-described methods.

Figure 34:
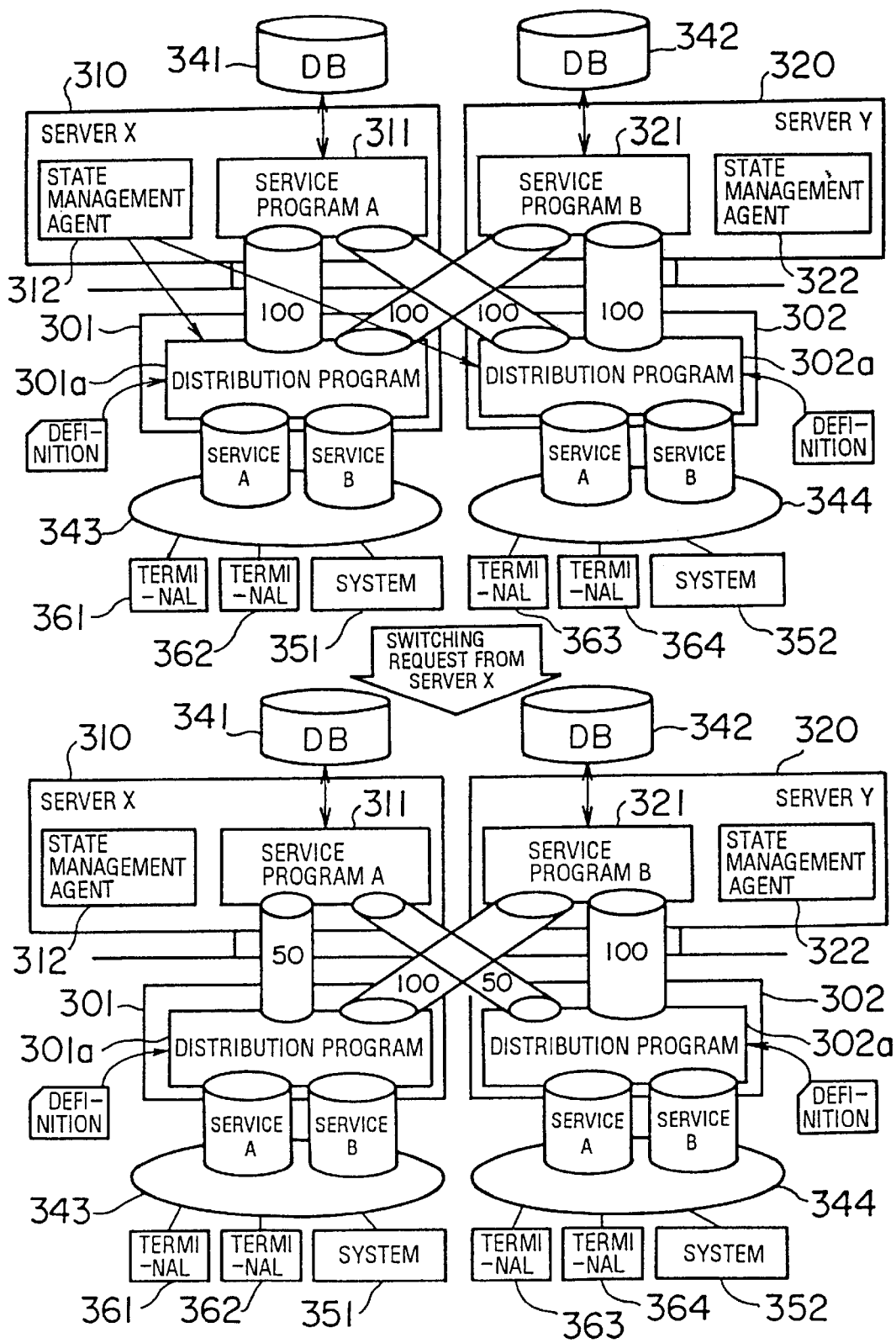
FIG. 34 is a diagram showing how to switch the operation mode in response to a request from a server in case that the system employs two communication controllers.

In the dual controller configuration, transition of operating status of each server is reported from a state management agent to both communication controllers. FIG. 34 shows how to switch the operation mode in response to a request from a server. In this system, two servers 310 and 320 (SERVER X and SERVER Y) and two communication controllers 301 and 302 are interconnected by a local area network. The communication controllers 301 and 302 have their dedicated networks 343 and 344, where terminals 361–364 and remote systems 351 and 352 are located.

The server 310 contains an application (service program A) 311 and a state management agent 312, while the server 320 has an application (service program B) 321 and a state management agent 322. Distribution programs 301a and 302a are running in the communication controllers 301 and 302, respectively.

Before changing over the operation mode, as shown in the upper half of FIG. 34, requests for the services A and B sent over the network 343 are forwarded to the servers 310 and 320, respectively. The maximum number of acceptable requests, MAX, in these two paths is defined as 100. Likewise, requests for the services A and B from the other network 344 are delivered to the servers 10 and 20 with a limitation of the maximum number of acceptable requests, "MAX=100."

In the event of detection of decreasing use of the service program A, the information is sent from the state management agent 312 to the communication controllers 301 and 302 as indicated by two arrows in FIG. 34. The distribution programs 301a and 302a then reduce the parameter MAX for both request paths. The lower half of FIG. 34 specifically shows the reduction from 100 to 50.

Now, the following will explain about another embodiment of the present invention, which intends to solve the problem in an active service operation from the system to the users.

Figure 35:
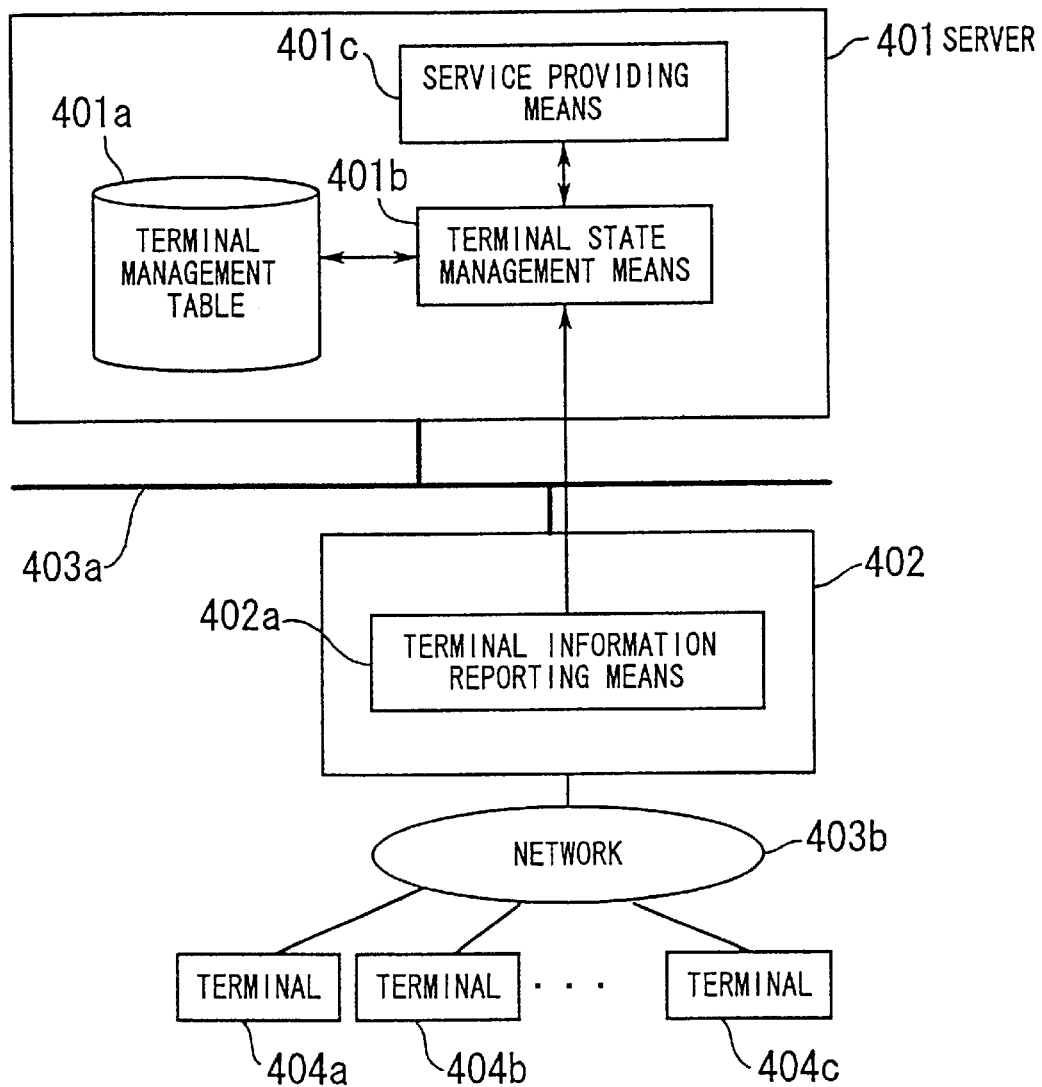
FIG. 35 is another conceptual view of the present invention.

FIG. 35 is another conceptual view of a load sharing system designed so as to reduce a workload imposed on a server for terminal management. The system is organized by a server 401 and a communication controller 402, which are interconnected via a network medium 403a.

A large number of terminals 404a–404c are linked to the communication controller 402 via another network medium 403b. Terminal information reporting means 402a is responsible for detecting a change of the connection status of each terminal, and upon detection, it sends the information to the server 401.

The server 401 has a control table 401a for storing information of the terminals 404a–404c, which is under the control of terminal state management means 401b. Upon reception of terminal information from the communication controller 402 over the network medium 403a, the terminal state management means 401b updates the contents of the terminal management table 401a. The terminal state management means 401b in turn retrieves the information in the terminal management table 401a for responding to a query from service providing means 401c.

This service providing means 401c, disposed in the server 401, offers active services to the terminals 404a–404c as outputs of the processes in progress. Note here that the term "active service" means a service that is provided by the server, not in response to a request from a terminal but with its clear intention to do so. When such an active service to the terminals 404a–404c is produced, the service providing means 401c obtains the terminal information saved in the terminal management table 401a by using the terminal state management means 401b. With the retrieved information, the terminal state management means 401b discriminates the relevant terminals and supplies them with the service.

In operation of this load sharing system, any state change in the communication between the communication controller 402 and the terminals 404a–404c is detected and reported as terminal information from the terminal information reporting means 402a to the terminal state management means 401b in the server 401. The terminal state management means 401b updates the contents of the terminal management table 401a with the received terminal information, thus keeping the up-to-date information in the table 401a.

When offering a service to the terminals 404a–404c, the service providing means 401c first acquires the relevant terminal information from the terminal state management means 401b. This terminal information indicates which terminal and which communication controller are ready to communicate with each other. Now that the readiness of each terminal is known, the service providing means 401c can selectively provide the service only to the ready terminals.

As such, the service providing means 401c is released from the tasks to maintain the terminal information for itself, thus resulting in reduction of its workload. This advantage is also true or rather enhanced in case that the server has a plurality of service providing means 401c. Since there is no need for them to manage the terminal status separately, the workload disposed on the server 401 will be greatly reduced.

Figure 36:
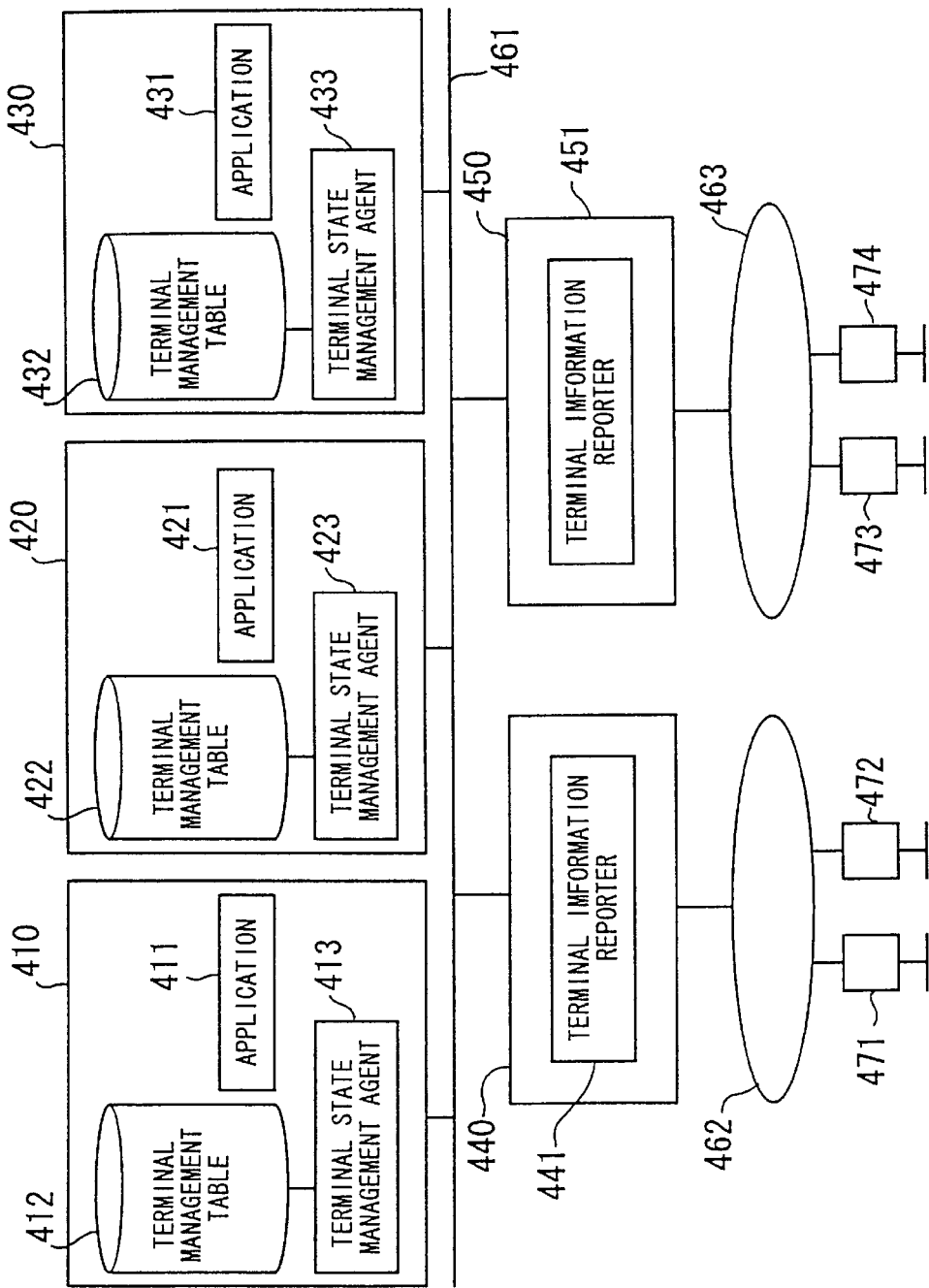
FIG. 36 is a diagram outlining the structure of a load sharing system according to the present invention.

FIG. 36 outlines the structure of such a load sharing system according to the present invention. This multi-server and multi-controller system employs three servers 410, 420, and 430 and two controllers 440 and 450. Those servers and controllers are interconnected by a local area network 461.

The communication controller 440 is linked to workstations 471 and 472 via another network 462. Similarly, the communication controller 450 is linked to workstations 473 and 474 via yet another network 463. Those workstations 471–474 in FIG. 36 corresponds to the terminals 404a–404c in FIG. 35. Terminal information reporters 441 and 451, integrated in the communication controllers 440 and 450, are always monitoring the status of communication channels and thus detect establishment and termination of sessions between the terminals and their corresponding controllers and the like. The terminal information reporters 441 and 451 will try to send the detected change to the servers through state management paths. If there are established paths, the status change information will be sent to the destinations. If a new path is established, the terminal information reporters 441 and 451 will send the whole terminal information on every workstation having an active session. The term "session" means a logical connection that is set up by a workstation and a communication controller in order to enable data communication therebetween.

In the servers 410, 420, and 430, the terminal state management agents 413, 423, and 433 maintain the data in the terminal management tables 412, 422, and 432 according to the terminal information supplied by the communication controllers 440 and 450. From the viewpoint of applications 411, 421, and 431, those terminal state management agents are regarded as part of each server system, because they are implemented in the system programs of the servers 410, 420, and 430.

The applications 411, 421, and 431 provides some active services to the workstations 471–474. Those services include a transmission of emergency messages when any of the servers 410, 420, and 430 failed due to some serious hardware problems. The messages should be sent to the workstations 471–474 that are currently in session. For this purpose, the applications 411, 421, and 431 first locate the communication controller that each of the workstations 471–474 is controlled and investigate the session status between that communication controller and the workstation of interest. Based on the information on the location and session status, the applications 411, 421, and 431 find the destinations of the emergency messages from among the workstations 471–474.

In the above-described load sharing system, the applications 411, 421, and 431 trying to provide active services first must set up state management paths, or connection paths for status information management, toward the communication controllers 440 and 450. Those state management paths enable the terminal information reporters 441 and 451 to pass the terminal information to the terminal state management agents 413, 423, and 433. Separately from the state management paths, the applications 411, 421, and 431 should establish further connection paths to the communication controllers for providing services to the workstations.

Figure 37:
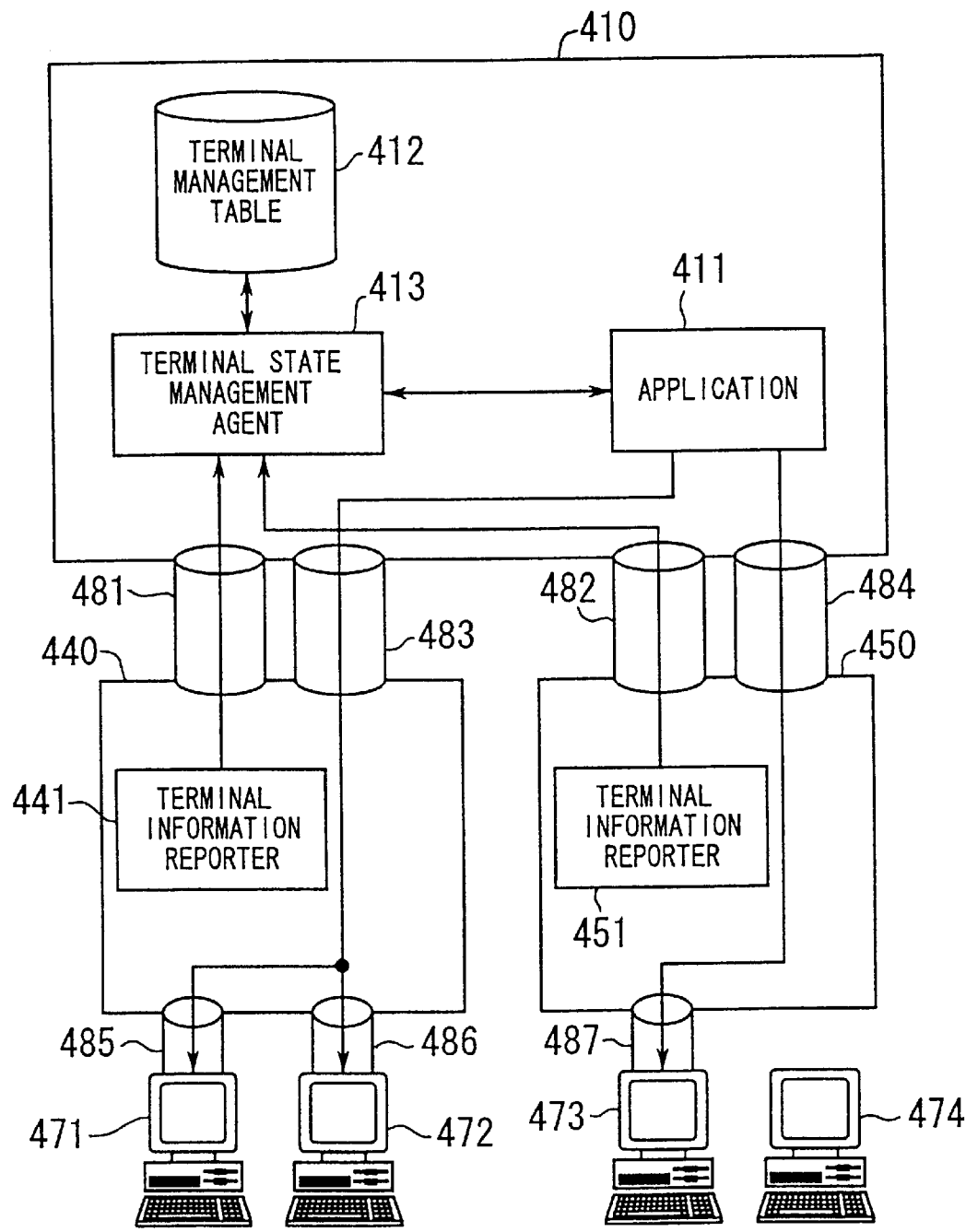
FIG. 37 is a diagram showing a flow of various information relating to the present invention.

FIG. 37 shows the flow of various information relating to the present invention. For illustration, FIG. 37 only presents a simplified system with a single server 410 and two communication controllers 440 and 450, which is a subset of the system in FIG. 36. This example assumes that sessions 485–487 are established between the communication controller 440 and workstations 471 and 472 as well as between the communication controller 450 and workstation 473. However, there is no session between the communication controller 450 and workstation 474.

In the illustrated situation, when the application 411 needs to provide an active service to the workstations 471–474, the server 410 will set up state management paths 481 and 482 reaching the communication controllers 440 and 450. The terminal information reporter 441 and 451 use these paths to transmit terminal information of the workstations 471–473 having a session with the communication controller 440 or 450. The terminal state management agent 413 receives the terminal information from the communication controllers 440 and 450 and saves them into the terminal management table 412.

From the terminal state management agent 413, the application 411 obtains information about the workstations 471–473 in session with the communication controller 440 or 450. With this information, the application 411 learns about every available combination of a communication controller and its subordinate workstation, as well as understanding that the workstation 474 has no session. The application 411 then sets up connection paths 483 and 484 to the communication controllers 440 and 450 and provides services to workstations 471–473 through the paths 483 and 484.

When a new session is established between the workstation 474 and the communication controller 450, the terminal information reporter 451 sends terminal information on the workstation 474. Upon reception of the terminal information, the terminal state management agent 413 updates the terminal management table 412.

Figure 38:
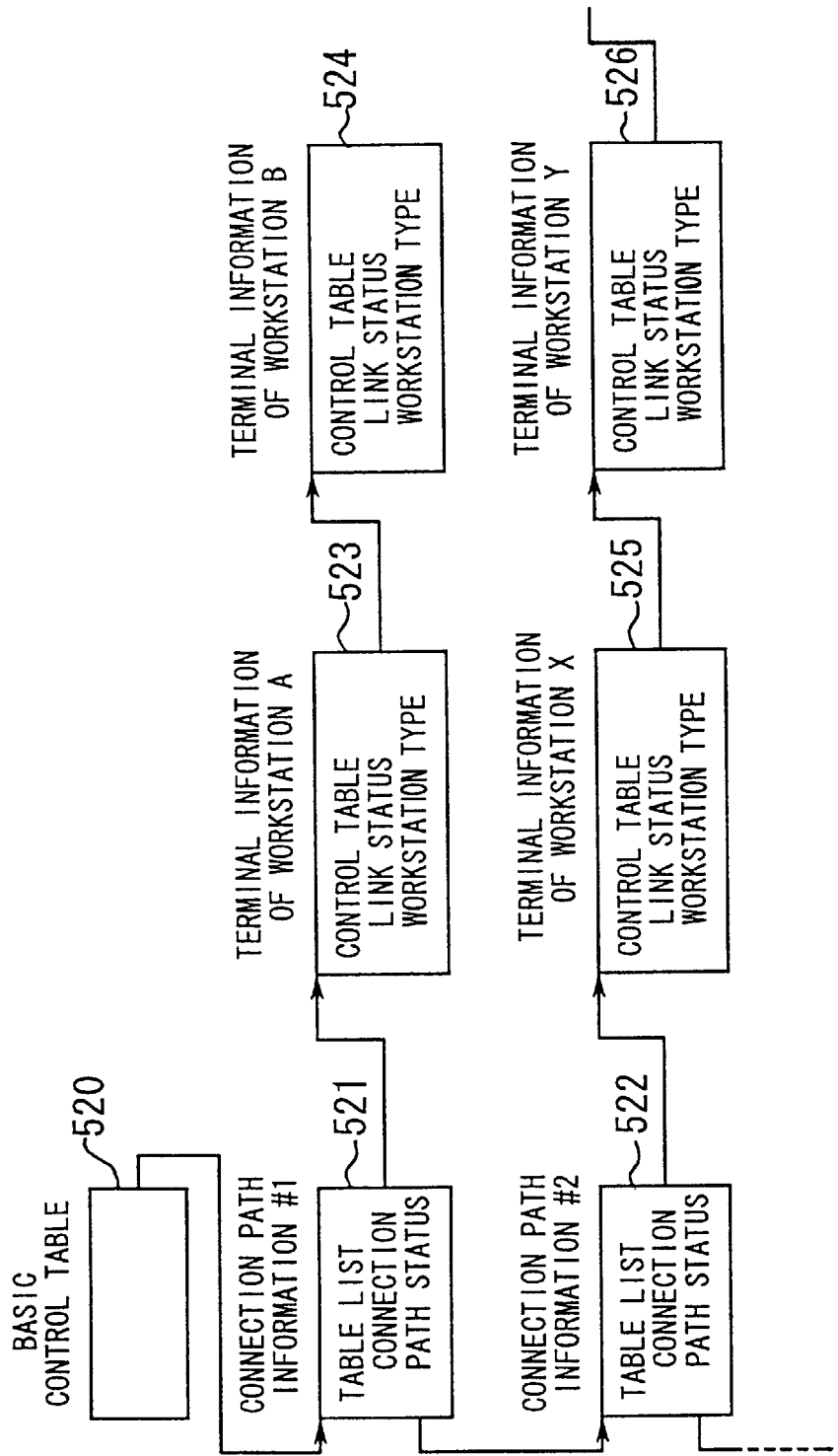
FIG. 38 is a diagram showing data structure of a terminal management table.

FIG. 38 shows the data structure of the terminal management table. A basic control table 520 is the root of the data structure, where two sets of connection path information 521 and 522 descriptive of state management paths that are named as "CONNECTION PATH #1" and "CONNECTION PATH #2." The current status of those two connection paths is indicated in the connection path information 521 and 522 as "CONNECTION PATH STATUS."

Further, the connection path information 521 has links to terminal information 523 and 524 describing about the workstations related to the connection path #1. Likewise, the connection path information 522 has links to terminal information 525 and 526 describing about the workstations related to the connection path #2. The terminal information 523–526 contains information on workstations A, B, X, and Y, respectively. Each terminal information is represented as a table that contains indicators for "CONNECTION STATUS" and "WORKSTATION TYPE." The link status indicator shows whether the workstation of interest is "CONNECTED" or "DISCONNECTED."

As such, the terminal information is managed in the terminal management table, being classified according to the connection path associated with each group of workstations. The connection path information is registered for the first time when a state management path is established between a server and a communication controller.

The terminal state management agent 413 variously processes the data stored in the terminal management table 412. The following will explain about what the terminal state management agent 413 applies to the terminal management table 412.

Figure 39:
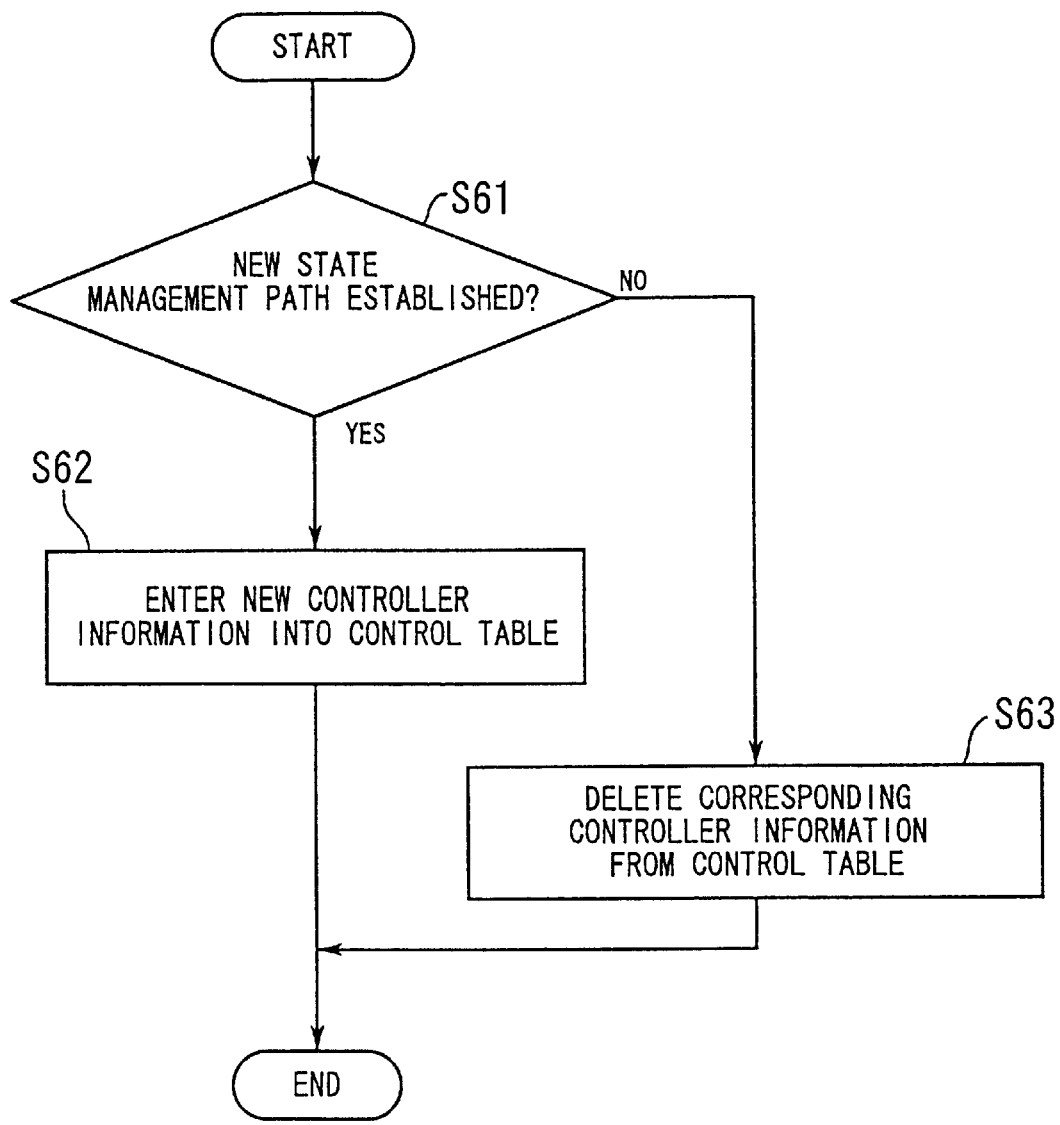
FIG. 39 is a flowchart showing a process to follow a change of communication paths between a communication controller and servers.

FIG. 39 is a flowchart showing a process that follows a state change detected in the state management paths established to communication controllers. Upon detection of a state change, the process take the following steps.

[S61] It is checked whether or not it is an indication of establishment of a new state management path to a certain communication controller. If it is, the process proceeds to step S62. If not, the process goes to step S63.

[S62] The terminal state management agent enters the information on the communication controller into the terminal management table 412 as a new connection path information.

[S63] The terminal state management agent removes a connection path information corresponding to the communication controller from the terminal management table. This results in deletion of all the terminal information linked to the connection path information. Namely, the terminal information of all the workstations that are under the control of the communication controller will be deleted.

In that way, connection path information related to each communication controller will be registered in the terminal management table.

Figure 40:
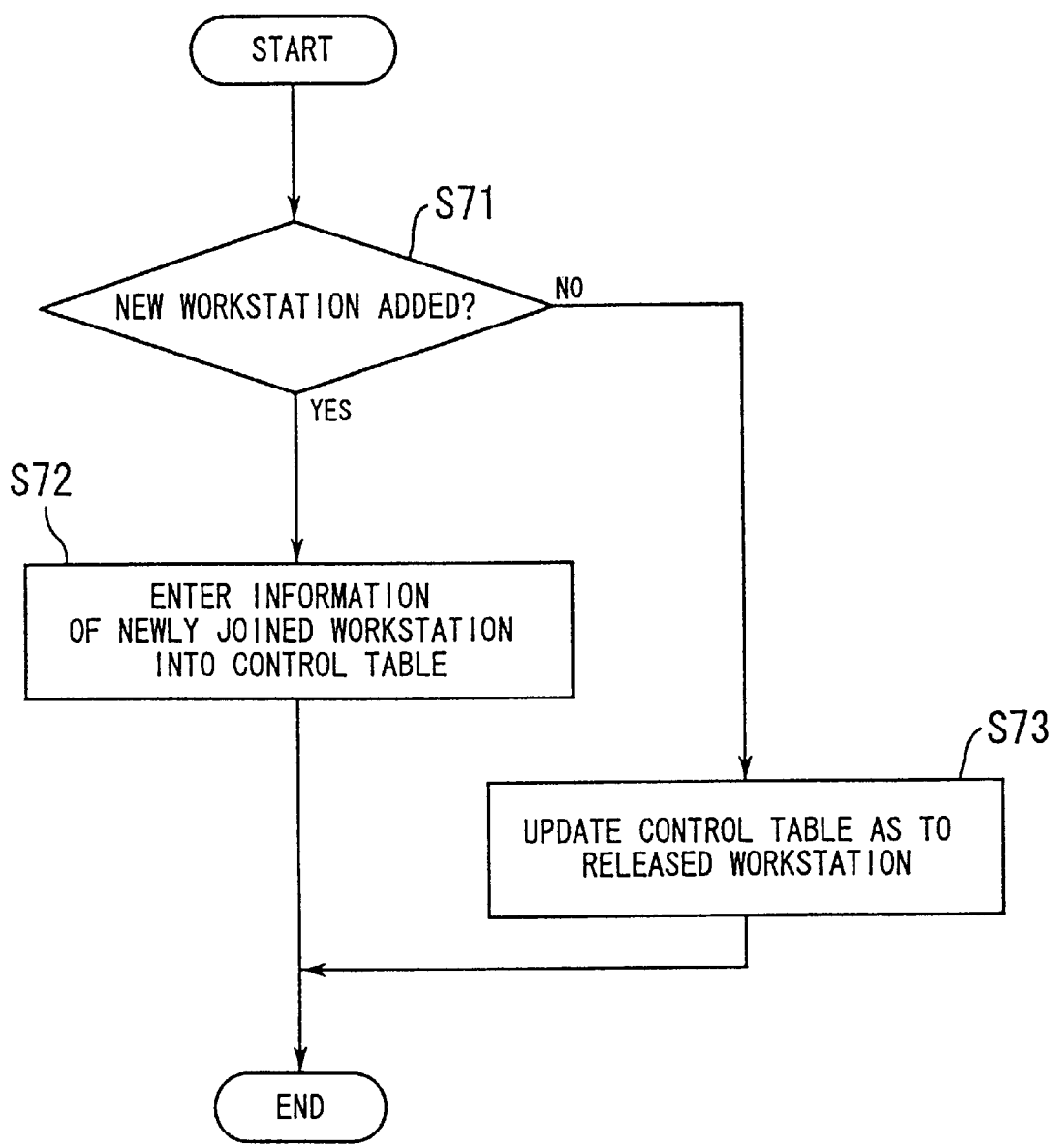
FIG. 40 is a flowchart showing a procedure performed when a terminal has received terminal information from a terminal information reporter.

FIG. 40 is a flowchart showing a procedure performed by the terminal state management agent 413 upon reception of terminal information from a terminal information reporter.

[S71] It is determined whether the terminal information is indicating a connection or disconnection of a workstation. If it is a connection, the process advances to step S72. If it is a disconnection, the process proceeds to step S73.

[S72] The workstation is regarded as being subordinate to the communication controller that has sent the terminal information. The terminal state management agent registers information on the workstation into the terminal management table. More specifically, the aforementioned connection status indicator in the terminal information is set to "CONNECTED".

[S73] The terminal state management agent updates the terminal management table so that it will reflect the disconnection of the workstation.

In the way described above, upon detection of a session established between a workstation and a communication controller, information on the workstation will be registered to the terminal management table. When the session is lost, the disconnection of the workstation will in turn be registered to the table.

The terminal state management agent performs the above-described procedures each time the state management paths change or the communication conditions between workstations and communication controllers vary, thus keeping the contents of the terminal management table up to date. When providing services to the workstations 471–474, each application inquires of the terminal state management agent in what condition the terminal is. The following will describe about the process to be executed at this stage by the terminal state management agent.

Figure 41:
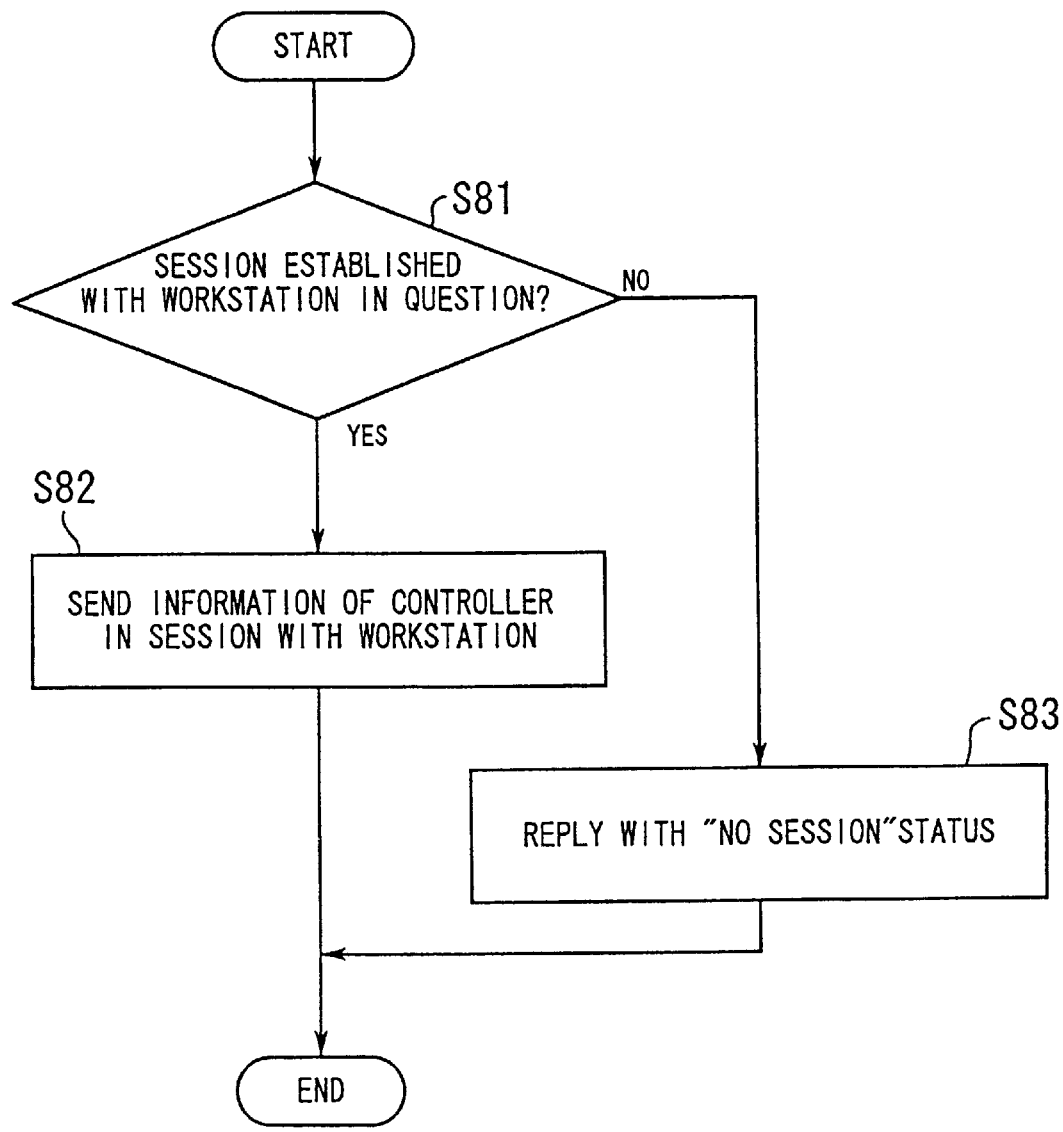
FIG. 41 is a flowchart showing a procedure in response to a query from an application.

FIG. 41 is a flowchart showing a procedure to be taken in response to a query from an application.

[S81] The terminal state management agent retrieves information for the workstation in question from the terminal management table and examines whether the workstation has a session with the system or not. If it has, the process advances to step S82. If not, the process proceeds to step S83.

[S82] The terminal state management agent provides the application with information about the communication controller in session with the workstation.

[S83] The terminal state management agent notifies the application that the workstation in question has not been connected. The application learns that it cannot provide services to the intended workstation.

Figure 42:
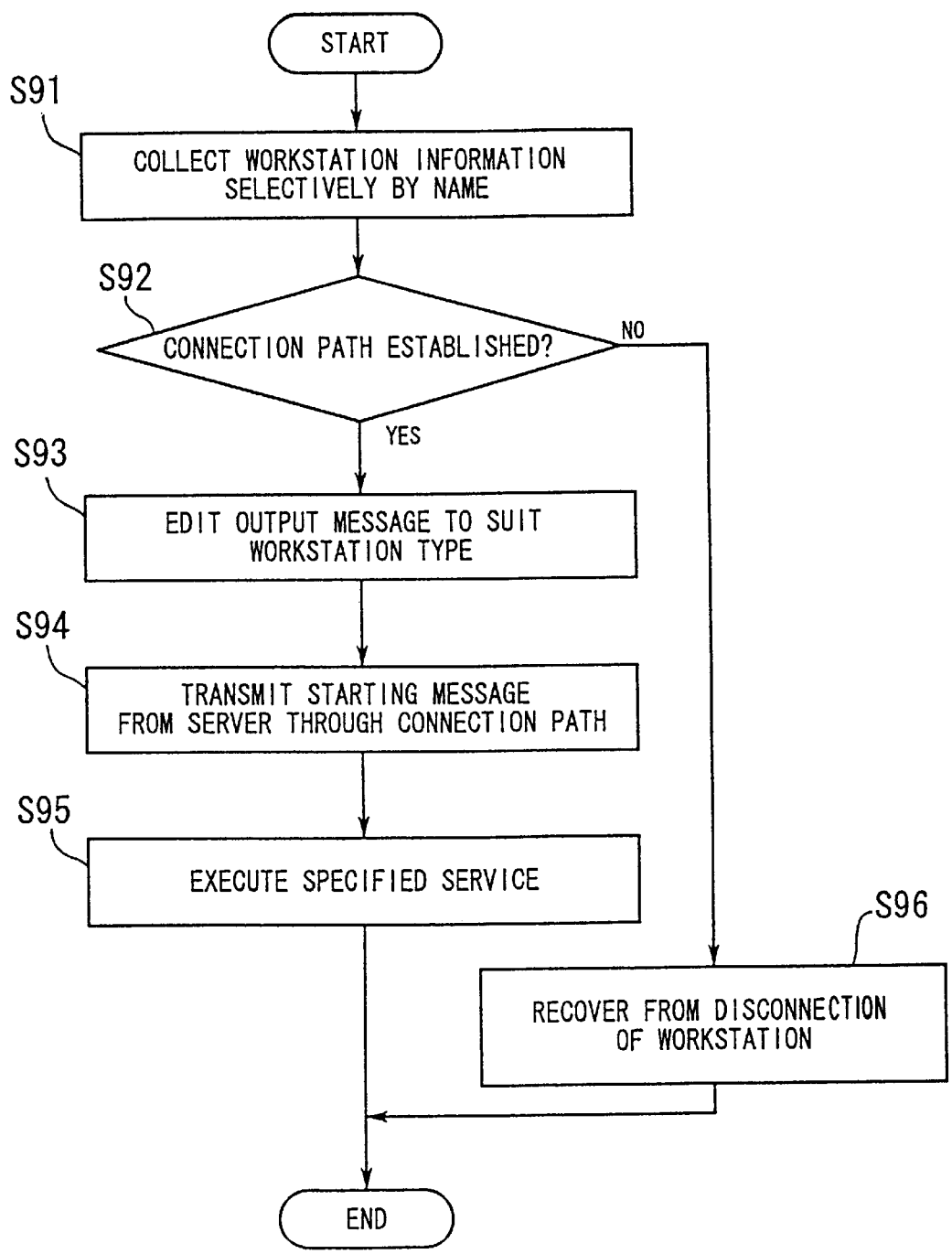
FIG. 42 is a flowchart showing a procedure to be executed when an application provides services to the users.

FIG. 42 is a flowchart showing a procedure to be executed by an application when it provides services.

[S91] The application selectively collects information on the target workstation by specifying its name.

[S92] It is checked whether there is a connection path to reach the workstation or not. If such a connection path is found, the process proceeds to step S93. Otherwise, the process branches to step S96. What is meant by the expression "a connection path to reach the workstation" is a logical path between the workstation and a server that is set up with a session between the workstation and a communication controller.

[S93] The application edits its output message to suit the type of the target workstation.

[S94] Through the connection path taught by the terminal state management agent, the application transmits a service starting message to the workstation.

[S95] After confirmation of the acknowledgment from the workstation, the application executes the intended service.

[S96] A recover process is invoked with regard to the disconnected workstation. For example, the application informs the user who asked the service of its inability to achieve the specified service.

In the way described above, the applications can obtain necessary information on workstations from the terminal state management agent, and from the obtained information, they can easily recognize which workstations to communicate with for providing their services. The applications can concentrate on their duty, because there is no need for them to separately manage the information about the workstations. As a result, the applications can work more efficiently and the total load imposed on the servers will be reduced.

The above discussion will be summarized as follows. According to the present invention, a communication controller receives requests from user terminals and distributes them to appropriate servers. Therefore, it is not necessary for the users to know the address of each server. In other words, the system looks as if it were a single multi-function server, although the real system is composed of a plurality of servers that are functionally distributed. Besides reducing the burden imposed on the users, this configuration enables centralized control of the load distribution among the servers.

Status management agent means disposed in each server sends status information of each server to state management means in the communication controller. Thus the state management means can collect every information regarding the server activities in a timely manner and can manage the information without concerning the communication protocol of each server.

The operation mode of the load sharing system can be changed over by activating or deactivating parameters that govern control conditions for distributing the user requests. This provides easy switching of the operation mode to modify the scheme of load distribution among the servers.

When any trouble happened to a server, the other server will detect it and reports to the communication controller. Without being noticed by the users, the communication controller can add or remove a server from the system while maintaining availability of services. This feature makes the system scaleable.

A change in the communication between terminals and a communication controller invokes transmission of terminal information from terminal information reporting means in the communication controller. Based on the received terminal information, terminal state management means in each server recognizes status and configuration of the terminals. Applications running on the servers can learn about the terminals from the terminal state management means. This eliminates separate management of such information by individual applications, thus reducing the total loads imposed on the servers.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A load sharing system which performs functionally-distributed processing with a plurality of processors, comprising:
    a first network;
    a plurality of servers each coupled to said first network, each said server having
        service providing means for processing service requests received over said first network, and
        state management agent means for managing an activity status of said server by registering a communication port responsive to a status information request indicating a specified resource and by activating the registered communication port for receiving status information for a state transition of the specified resource when the status transition is detected;
    a second network; and
    a communication controller coupled to said first network and further coupled to said second network, said communication controller establishing a connection path on said first network to reach each of said state management agent means, receiving management information indicating a state of said plurality of servers from state management agent means in respective ones of said plurality of servers, performing a centralized management of the state of said plurality of servers, and sending a service request over said first network to a server selected from said plurality of servers, said communication controller thereby providing a client coupled to said second network with a unified system interface for access to a service provided by said plurality of servers coupled to said first network.

2. A load sharing system according to claim 1, wherein said service providing means in said respective servers share a common database.

3. A load sharing system according to claim 1, said communication controller further comprising distribution means for receiving a user request from a user terminal over another network, determining a target server according to the management information managed by said state management means, and sending the service request produced from the user request to the target server via the first-mentioned network.

4. A load sharing system according to claim 1, wherein said state management agent means sends information on said service providing means to said state management means upon receipt of a state monitoring request from said state management means.

5. A load sharing system according to claim 1, wherein said state management agent means sends information on said service providing means to said state management means upon status change of said service providing means.

6. A load sharing system according to claim 3, wherein said distribution means produces the service request by translating a destination address of the user request from an address of said communication controller to an address of the selected server.

7. A load sharing system according to claim 3, wherein said distribution means holds information on said service providing means in association with a predetermined key, extracts the key from the service request upon reception thereof, and selects said service providing means in one of said plurality of servers as a candidate for the target server.

8. A load sharing system according to claim 3, wherein said distribution means obtains a loading condition of each of said plurality of servers from said state management means and determines the target server according to the loading condition.

9. A load sharing system according to claim 3, wherein said communication controller further comprises operation control means for activating distribution control conditions that govern distributing of the user request to said service providing means, and said distribution means determines the target server according to the activated parameters and distributes the service request to the target server.

10. A load sharing system according to claim 9, wherein said operation control means defines a plurality of operation modes respectively associated with multiple sets of the distribution control conditions and switches among the multiple sets of the distribution control conditions by activating one of the operation modes.

11. A load sharing system according to claim 9, wherein said service request sent by said distribution means is originated by a user qualified with a user classification specification included in the distribution control conditions for said service providing means.

12. A load sharing system according to claim 9, wherein said operation control means activates the distribution control conditions in accordance with information that said state management means has received from said state management agent means.

13. A load sharing system according to claim 1, wherein said state management agent means of one server monitors activities of the other servers and notifies said state management means upon detection of stoppage of any of the other servers.

14. A load sharing system according to claim 13, wherein said state management means classifies each of said plurality of servers as either a primary server or a backup server for management purposes, and when notified of stoppage of the primary server, said state management means deactivates distribution of the service request to the primary server and activates distribution of the service request to the backup server.

* * * * *